(12) United States Patent
Hasegawa

(10) Patent No.: US 6,493,561 B1
(45) Date of Patent: Dec. 10, 2002

(54) MOBILE COMMUNICATION SYSTEM ENABLING EFFICIENT USE OF SMALL-ZONE BASE STATIONS

(75) Inventor: Hajime Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/880,665

(22) Filed: Jun. 23, 1997

(30) Foreign Application Priority Data

Jun. 24, 1996 (JP) ............................................. 8-163330
Jun. 12, 1997 (JP) ............................................. 9-155286

(51) Int. Cl.$^7$ ............................ H04B 7/00; H04Q 7/20
(52) U.S. Cl. ........................ 455/512; 455/422; 455/436; 370/331
(58) Field of Search ................................ 455/422, 426, 455/424, 436, 443, 444, 445, 450, 452, 453, 509, 512, 524, 525, 449, 440, 435, 513; 370/229, 230, 329, 331

(56) References Cited

U.S. PATENT DOCUMENTS

| 5,093,924 | A | * | 3/1992 | Toshiyuki et al. | .......... 455/450 |
|---|---|---|---|---|---|
| 5,189,734 | A | * | 2/1993 | Bailey et al. | ................ 455/422 |
| 5,349,632 | A | * | 9/1994 | Nagashima | .................. 455/422 |
| 5,603,081 | A | * | 2/1997 | Raith et al. | .................. 455/435 |
| 5,673,031 | A | * | 9/1997 | Meier | .......................... 455/436 |
| 5,832,368 | A | * | 11/1998 | Nakano et al. | ................ 455/63 |
| 5,845,212 | A | * | 12/1998 | Tanaka | ........................ 455/436 |
| 5,873,047 | A | * | 2/1999 | Nakano et al. | .............. 455/561 |
| 5,878,038 | A | * | 3/1999 | Willey | .......................... 370/335 |
| 5,893,033 | A | * | 4/1999 | Keskitalo et al. | ............ 455/437 |
| 5,930,710 | A | * | 7/1999 | Sawyer et al. | ............... 455/436 |

* cited by examiner

Primary Examiner—William Trost
Assistant Examiner—Simon Nguyen
(74) Attorney, Agent, or Firm—Katten Muchin Zavis Roseman

(57) ABSTRACT

A mobile communication system includes a plurality of radio base stations forming respective radio zones and a mobile station selecting a wait zone and a base station to which a request for a message channel is to be issued. Each of the plurality of radio base stations is assigned an order of priority. Information relating to the order of priority is used by the mobile station to select a wait zone and a base station to which a request for a message channel is to be issued.

36 Claims, 32 Drawing Sheets

FIG. 2
PRIOR ART

| MESSAGE TYPE |
|---|
| NETWORK CODE |
| RESTRICTION INFORMATION |
| CONTROL CHANNEL CONFIGURATION INFORMATION |
| MOBILE STATION TRANSMISSION POWER SPECIFICATION |
| WAIT ENABLED LEVEL |
| WAIT DISABLED LEVEL |
| LOCATION REGISTERED AREA MULTIPLEX LEVEL |
| LOCATION CODE 1 |
| ⋮ |
| LOCATION CODE N |
| MAXIMUM REPORTED NUMBER OF CHANNELS |
| ⋮ |

| INFORMATION ENTRY | DIRECTION | REMARKS |
|---|---|---|
| MESSAGE TYPE | DOWNSTREAM | |
| NETWORK CODE | | |
| RESTRICTION INFORMATION | | |
| CONTROL CHANNEL CONFIGURATION INFORMATION | | |
| MOBILE STATION TRANSMISSION POWER SPECIFICATION | | FOR CONTROL CHANNEL |
| INFORMATION INDICATING THE ORDER OF PRIORITY | | SOURCE STATION |
| WAIT ENABLED LEVEL | | |
| WAIT DISABLED LEVEL | | |
| LOCATION REGISTERED AREA MULTIPLEX LEVEL (N) | | 1,2,4,8 OR 16 |
| LOCATION CODE | | 1st |
| ~ | | ~ |
| LOCATION CODE | | nth |
| MAXIMUM REPORTED NUMBER OF CHANNELS | | 0~M |
| NUMBER OF PERCH CHANNELS TO BE SEARCHED FOR DETERMINATION OF A ZONE (M) | | 0~20 |
| PERCH CHANNEL CODE | | 1st |
| ~ | | ~ |
| PERCH CHANNEL CODE | | Mth |
| LOCATION REGISTRATION TIMER | | |
| ADDITIONAL INFORMATION ENTRY (K) | | 0~127 |
| ADDITIONAL INFORMATION ENTRY | ↓ | OPERATOR OPTION |

FIG. 22

| INFORMATION ENTRY | DIRECTION | REMARKS |
|---|---|---|
| MESSAGE CODE | DOWNSTREAM | |
| NETWORK CODE | | |
| RESTRICTION INFORMATION | | |
| CONTROL CHANNEL CONFIGURATION INFORMATION | | |
| MOBILE STATION TRANSMISSION POWER SPECIFICATION | | FOR CONTROL CHANNEL |
| WAIT ENABLED LEVEL | | |
| WAIT DISABLED LEVEL | | |
| LOCATION REGISTERED AREA MULTIPLEX LEVEL (N) | | 1,2,4,8 OR 16 |
| LOCATION CODE | | 1st |
| ~ | | ~ |
| LOCATION CODE | | nth |
| MAXIMUM REPORTED NUMBER OF CHANNELS | | 0~M |
| NUMBER OF PERCH CHANNELS TO BE SEARCHED FOR DETERMINATION OF A ZONE (M) | | 0~20 |
| PERCH CHANNEL CODE | | 1st (TRANSMITTED IN THE DESCENDING ORDER OF PRIORITY) |
| ~ | | ~ |
| PERCH CHANNEL CODE | | Mth |
| LOCATION REGISTRATION TIMER | | |
| ADDITIONAL INFORMATION ENTRY (K) | | 0~127 |
| ADDITIONAL INFORMATION ENTRY | ▼ | OPERATOR OPTION |

FIG. 23

| INFORMATION ENTRY | DIRECTION | REMARKS |
|---|---|---|
| MESSAGE TYPE | DOWNSTREAM | |
| NETWORK CODE | | |
| RESTRICTION INFORMATION | | |
| CONTROL CHANNEL CONFIGURATION INFORMATION | | |
| MOBILE STATION TRANSMISSION POWER SPECIFICATION | | FOR CONTROL CHANNEL |
| WAIT ENABLED LEVEL | | |
| WAIT DISABLED LEVEL | | |
| LOCATION REGISTERED AREA MULTIPLEX LEVEL (N) | | 1,2,4,8 OR 16 |
| LOCATION CODE | | 1st |
| ~ | | ~ |
| LOCATION CODE | | nth |
| MAXIMUM REPORTED NUMBER OF CHANNELS | | 0~M |
| NUMBER OF PERCH CHANNELS TO BE SEARCHED FOR DETERMINATION OF A ZONE (M) | | 0~20 |
| PERCH CHANNEL CODE | | 1st |
| INFORMATION INDICATING THE ORDER OF PRIORITY | | INFORMATION INDICATING THE ORDER OF PRIORITY OF THE 1st PERCH CHANNEL |
| ~ | | ~ |
| PERCH CHANNEL CODE | | Mth |
| INFORMATION INDICATING THE ORDER OF PRIORITY | | INFORMATION INDICATING THE ORDER OF PRIORITY OF THE Mth PERCH CHANNEL |
| LOCATION REGISTRATION TIMER | | |
| ADDITIONAL INFORMATION ENTRY (K) | | 0~127 |
| ADDITIONAL INFORMATION ENTRY | ▼ | OPERATOR OPTION |

FIG. 24

MOBILE COMMUNICATION SYSTEM ENABLING EFFICIENT USE OF SMALL-ZONE BASE STATIONS

BACKGROUND OF THE INVENTION

1. Field of the Invention

The present invention generally relates to mobile communication systems and mobile station apparatuses, and, more particularly, to a mobile communication system in which a radio zone where a mobile station is to enter a wait state is determined by the electric field intensity of a received radio wave that arrives from a radio base station, and to a mobile station apparatus that receives communication service by accessing such a mobile communication system.

The present invention also relates to a mobile communication system wherein a mobile station selects a base station to which a request for a message channel is to be issued, based on announcement information from the base station.

2. Description of the Related Art

Recently, a variety of mobile stations including an automobile mobile station and a portable mobile station access a mobile communication system. With a competition between a plurality of carriers as a background, the number of mobile stations is increasing.

A mobile communication system may have a large-zone construction in which a base station covers a relatively wide service area or a small-zone construction in which a plurality of base stations cover a service area.

In a mobile communication system, radio base stations operated on a small transmission power and forming microcells or picocells are provided at the center of a big city characterized by a particularly large volume of traffic so that a multilayer cell is formed.

Radio base stations operated on a small transmission power are also provided in an underground passage and a tunnel in order to enlarge a radio zone sufficiently to eliminate a dead zone.

FIG. 1 shows a construction of a conventional mobile communication system.

Referring to FIG. 1, radio base stations $61_1$ and $61_2$ form adjacent radio zones $62_1$ and $62_2$, respectively. In the radio zone $62_1$, a radio base station $61_3$ forming a microcell 63 and a radio base station $61_4$ forming a picocell 64 are provided so as to form a multilayer. Mobile stations $65_1$–$65_N$ are located movable in the radio zones $62_1$ and $62_2$, the microcell 63 and the picocell 64.

In the radio base station $61_1$, an antenna $66_1$ is connected to an antenna terminal of a transmission and reception unit $68_1$ via a common antenna equipment unit $67_1$. A control terminal of the transmission and reception unit $68_1$ is connected to an input and output terminal of a base station control device $69_1$. A line terminal provided in the transmission and reception unit $68_1$ and a communication port of the base station control device $69_1$ are connected to a control station (not shown) via a transmission device $70_1$ and a communication link $71_1$.

Since the radio base stations $61_2$–$61_4$ have the same construction as the radio base station $61_1$, the corresponding elements are designated by using suffixes 2–4 in the description below, and the illustration and description thereof are omitted.

An antenna $72_1$ of the mobile station $65_1$, is connected to an antenna terminal of a transmission and reception unit $74_1$ via a common antenna equipment unit $73_1$. A modulated input and a demodulated output of the transmission and reception unit $74_1$ are connected to a microphone $75_1$ and a speaker $76_1$, respectively. A control terminal of the transmission and reception unit $74_1$ is connected to a control terminal of a control unit $77_1$. An input and output terminal of the control unit $77_1$ is connected to a display and operation unit $78_1$.

Since the construction of the mobile stations $65_2$–$65_1$ is the same as the mobile station $65_1$, the corresponding elements are designated by using suffixes 2–N in the description below, and the illustration and description thereof are omitted.

The base station control device $69_1$ of the radio base station $61_1$ in the above-described mobile communication system is directed by a center (not shown) via the communication link $71_1$ and the transmission device $70_1$ to generate announcement information including a wait enabled level and a wait disabled level as shown in FIG. 2 and transmits the announcement information to a predetermined control radio channel (hereinafter, simply referred to as a control channel) via the transmission and reception unit $68_1$, the antenna common equipment unit $67_1$ and the antenna $66_1$.

In addition to the wait enabled level and the wait disabled level, the announcement information also includes a message type identifying transmitted information as the announcement information, a mobile station transmission power specification specifying a transmission power of the mobile station, a location code indicating a location of the radio zone (service area), and the like. However, the information items other than the wait enabled level and the wait disabled level does not have to do with the present invention, and the description thereof is omitted.

The control unit $77_1$ of the mobile station $65_1$ maintains a control channel table listing all the radio channels over which the announcement information described above is transmitted from the radio base stations forming the respective radio zones to which the mobile station $65_1$ may be located. Further, upon power-on, the control unit $77_1$ measures sequentially the electric field intensity $L_1$ of the control channel registered in the control table channel by controlling the transmission and reception unit $74_1$ ((1) of FIG. 3). A determination is then made as to whether or not the measured electric field intensity is greater than a predetermined threshold level $L_{th}$ ((2) of FIG. 3).

The control unit $77_1$ registers the control channels for which a determination that the measured electric field intensity is greater than the threshold level $L_{th}$ is obtained, in a prescribed area (hereinafter, referred to as a candidate zone register) in a main memory. The electric field intensity of the registered control channel is also registered in the candidate zone register so that the correspondence between the control channel and the associated electric field intensity is specified ((3) of FIG. 3).

When the control unit $77_1$ has completed a series of the above-described processes (hereinafter, referred to as a measurement process) for all the control channels registered in the control channel table, the control unit $77_1$ determines whether or not the candidate zone register stores any control channel ((4) of FIG. 3). If an affirmative answer is given, the control unit $77_1$ sorts the entries in the candidate zone register according to the ascending order of the electric field intensity ((5) of FIG. 3).

The control unit $77_1$ refers to the candidate zone register when the sorting process has been completed and receives the announcement information via the individual control channels registered in the candidate zone register ((6) of FIG. 3). The control unit $77_1$ measures the electric field intensity again ((7) of FIG. 3). Further, the control unit $77_1$ compares the electric field intensity $L_2$ and the wait enabled level $L_{th}$ included in the announcement information ((8) of FIG. 3). When the former is lower in level than the latter, a similar comparison is conducted for the other control channels registered in the candidate zone register ((9) of FIG. 3). Hereinafter, a series of processes performed subsequent to the measurement process is referred to as a zone determination process. The control unit $77_1$ restarts the measurement process when the electric field intensity is found to be below the wait enabled level $L_{th}$ for all the control channels subjected to the comparison ((10) of FIG. 3).

If the electric intensity field of any of the control channels is found to be equal to or exceeds the wait enabled level, the control unit $77_1$ establishes that control channel as a control channel for the radio zone in which the mobile station is to register its location, issues a call and receives an incoming call ((11) of FIG. 3). Thereafter, the control unit $77_1$ enter a wait state ((12) of FIG. 3).

The operations relating to registering of a location, issuing of a call or receiving of an incoming call performed by the mobile station $65_1$ and the radio base station $61_1$ are not directly related to the present invention, and the description thereof will be omitted below.

The operation performed by the radio base stations $61_2$–$61_4$ is the same as the above-described operation of the radio base station $61_1$, and the description thereof is omitted. Also, the operation performed by the mobile stations $65_2$–$65_N$ is the same as the above-described operation of the mobile station $65_1$, and the description thereof is omitted.

In the conventional system described above, if the mobile station $65_1$ is located inside the microcell 63 and near the border with respect to the radio zone $62_1$, as indicated by the broken line in FIG. 4, and if the electric field intensity of the radio wave arriving from the radio base station $61_1$ is higher than that of the radio wave received from the radio base station $61_3$, the mobile station $65_1$ is set up for a wait in the radio zone $62_1$. As illustrated, the radio zone $62_1$ is formed outside the microcell 63 in which the mobile station $65_1$ is actually located.

In such a case, the microcell 63 and the picocell 64 provided with the aim of handling a large volume of traffic are not accessed by the mobile station $65_1$. The traffic otherwise handled by the microcell 63 is imposed as a load on the radio base station $61_1$, thus causing the operating efficiency and the service quality to be dropped.

When the propagation loss of the radio wave that arrives at the mobile station $65_1$ from the radio base station $61_1$ increases due to the propagation characteristic of the radio transmission channel varying depending on the speed of the mobile station mobile station $65_1$ and the path of the movement, the mobile station $65_1$ may leave a zone when it is not necessary and performs the measurement process. Even when a call originated in the mobile station $65_1$ becomes a successful call so that a conversation is established without the mobile station $65_1$ leaving the zone, the speech quality may be dropped if there is a large propagation loss, with the result that switching of message channels occur too frequently during the conversation.

Given that the microcell 63 or the picocell 64 is provided in order to serve the dead area located inside the radio zone $62_1$, the mobile station $65_1$ may be set up for a wait in a radio zone located outside the cell (the microcell 63 or the picocell 64) in which the mobile station $65_1$ is actually located. In this case, the microcell 63 or the picocell 64 remain unused so that the dead area is not efficiently served, a first aspect of the problem with the conventional mobile communication system.

A description will now be given, with reference to FIG. 5, of the flow of call origination operation in the conventional mobile communication system, in order to explain a second aspect of the problem with the conventional mobile communication system. In the following explanation of the second aspect, the PDC mobile communication system employed primarily in Japan is assumed.

In the conventional mobile communication system, when the user of a mobile station turns the power on (ST701), the mobile station measures a reception level of a perch channel provided for a base station (ST702). A perch channel is a term used in the PDC mobile communication system to refer to a channel provided for each of the base stations to allow a mobile station to determine a reception level with respect to the base station. In the PDC system, a perch channel is mainly used to transmit announcement information from the base station to the mobile station. The claims refer to a perch channel as a reception-level determining channel. If it is determined that the reception level exceeds a predetermined level (YES in ST703), the mobile station sorts the perch channels according to the ascending order of reception levels and stores the perch channels and the associated reception levels in a memory provided in the mobile station (ST704). A determination is then made as to whether the reception levels in all the perch channels have been measured (ST705).

If no perch channels and associated reception levels are stored in the memory (NO in S706), the mobile station displays an out-of-the-zone message in a display device (S707). When perch channels and associated reception levels are stored in the memory (YES in S706), the mobile station measures the reception level in the perch channel having the highest reception level according to the memory. If it is determined that the measured reception level exceeds a wait enabled level contained in the announcement information from the base station, the mobile stations is set up for a wait in the base station providing the highest reception level (S708).

The mobile station in a wait state sends a call request to the base station in which it is set up for a wait (S709). The mobile station notifies the base station of the perch channel codes and the reception levels provided by the base stations other than the notified base station.

If the level of reception from the mobile station issuing the request exceeds a predetermined level that enables assigning of a message channel (YES in S710), and if there is an unused message channel (YES in S711), the base station receiving the request from the mobile station assigns a message channel to the requesting mobile station (S712). If the level of reception from the mobile station is below the predetermined level (NO in S710), or if there is no unused message channel (NO in S711), the base station receiving the request refers to the reception levels of the adjacent base stations reported by the mobile station and designates one of the adjacent base stations as a base station for the requesting mobile station (S713).

The mobile station that receives, from the base station, a signal for assigning a message channel can use the assigned message channel to establish a call connection with the corresponding base station (S714).

Thus, the mobile station located at a point where there is an overlap of a plurality of zones formed by respective base stations is set up for a wait in the base station whose perch channel provides the highest reception level. When originating or receiving a call, the mobile station issues a request for a message channel to the base station in which the mobile station is set up for a wait.

However, it is not always best for the mobile station in the mobile communication system to issue a request for a message channel to the base station providing the highest reception level in the perch channel.

A relatively large service area formed, for example, by the base station A as shown in FIG. 31 is assumed. This large-zone construction formed by the base station A may include an area characterized by a concentrated traffic, resulting in a shortage of message channels in that area. In order to remedy this shortage, the base station B having a smaller transmission power and capable of forming a smaller-zone construction than the base station A is provided within the service area formed by the base station A. Provision of the base station B would serve the intended purpose if a mobile station within the zone formed by the base station B requests a message channel from the base station B.

However, a problem with the conventional mobile communication system is that the mobile station requests a message channel from the base station A providing a higher reception level than the base station B instead of requesting it from the base station B provided to handle an increased local traffic, with the result that the base station B remains unused to handle call originating or call incoming in the mobile station.

SUMMARY OF THE INVENTION

Accordingly, a general object of the present invention is to provide a mobile communication system and a mobile station apparatus in which the aforementioned problems of the conventional system are eliminated.

Another and more specific object of the present invention is to provide a mobile communication system and a mobile station apparatus in which a radio base station adapts itself to a dynamically established traffic distribution, or in which a mobile station can most successfully enter a radio zone in which it is actually located so as to be set up for a wait therein.

Still another object of the present invention is to assign order of priority to a plurality of base stations constituting a mobile communication system so that a mobile station requests a message channel from a base station having a higher priority than others in order to start communicating via that base station.

FIG. 6 is a block diagram of a mobile communication system according to claim 1 of the present invention. The mobile communication system according to claim 1 comprises a plurality of radio base stations $1_1$–$1_N$ forming respective radio zones and effecting a radio channel setting control in accordance with a predetermined procedure, and a mobile station 2 selecting, as a wait zone, one of the radio zones that satisfies a criteria demanded by the predetermined procedure, and receiving communication service via the selected wait zone. Each of the radio base stations $1_1$–$1_N$ comprises a traffic control unit 3 for setting a traffic distribution for the plurality of radio zones, and an announcing unit 4 for generating announcement information including the order of priority assigned to the plurality of radio zones, the order of priority being assigned in accordance with a probability density given to each of the plurality of radio zones under the distribution set by the traffic control unit 3, and for transmitting the announcement information to the radio zone formed by the radio station to which the announcing unit 4 belongs. The mobile station 2 comprises an announcement information receiving unit 5 for receiving the announcement information transmitted by the announcing unit 4 in accordance with the predetermined procedure, and a wait control unit 6 for selecting one of the radio zones as a wait zone, the radio zone to which a highest priority is assigned being a first candidate for selection by the wait control unit 6.

FIG. 7 shows a mobile communication system according to claim 2 of the present invention. The mobile communication system according to claim 2 comprises: a plurality of radio base stations $11_1$–$11_N$ forming one or a plurality of radio zones and one or a plurality of small-scale radio zones, resulting in a hierarchy of overlapping radio zones, and effecting a radio channel setting control in accordance with a predetermined procedure; and a mobile station 12 accessing one of the radio zones formed by the respective one of the plurality of radio base stations $11_1$–$11_N$, in accordance with a predetermined procedure, and receiving communication service via the accessed radio zone. Each of the plurality of radio base stations $11_1$–$11_N$ comprises an announcing unit 13 for transmitting announcement information which includes identification information for identifying radio channels assigned to respective radio zones and small-scale radio zones, via the radio channel assigned to the radio zone formed by the radio base station to which the announcing unit 13 belongs, the identification information being arranged in the announcement information so as to correspond to the hierarchy of overlapping radio zones. The mobile station 12 comprises: an announcement information receiving unit 14a for receiving the announcement information transmitted by the announcing unit 13a, in accordance with the procedure for radio channel setting control; a measuring unit 15a for measuring an electric field intensity for the radio channel corresponding to the identification information included in the announcement information received by the announcement information receiving unit 14a; and a wait control unit 16a for comparing an electric field intensity measured by the measuring unit 15a with a preset threshold level, and designating a radio zone to which the radio channel lowest in the hierarchy is assigned as a wait zone in which to receive the communication service, on the condition that the electric field intensity measured by the measuring unit 15a exceeds the preset threshold level.

The mobile communication system according to claim 3 comprises: a plurality of radio base stations $11_1$–$11_N$ forming one or a plurality of radio zones and one or a plurality of small-scale radio zones, resulting in a hierarchy of overlapping zones, and effecting a radio channel setting control in accordance with a predetermined procedure; and a mobile station 12 accessing one of the radio zones formed by the respective one of the plurality of radio base stations $11_1$–$11_N$ in accordance with a predetermined procedure, and receiving communication service via the accessed radio zone. Each of the plurality of radio base stations $11_1$–$11_N$ comprises an announcing unit 13a for transmitting announcement information which includes identification information for identifying the one or the plurality of radio zones and the one or the plurality of small-scale radio zones, via the radio channel assigned to the radio zone formed by the radio base station to which the announcing unit 13a belongs, the identification information being arranged in the announcement information according to respective positions in the hierarchy of overlapping zones. The mobile station 12 comprises: an announcement information receiving unit 14a for receiving the announcement information transmitted by the announcing unit 13a, in accordance with the procedure for radio channel setting control; a measuring unit 15a for measuring an electric field intensity for the radio zone corresponding to the identification information included in the announcement information received by the announcement information receiving unit 14a; and a wait control unit 16a for comparing an electric field intensity measured by the measuring unit 15a with a preset threshold level, and designating, as a wait zone in which to receive the communication service, a radio zone lowest in the hierarchy of overlapping zones on the condition that the electric field intensity measured by the measuring unit 15a exceeds the threshold level.

The mobile communication system according to claim 4 comprises: a plurality of radio base stations $11_1$–$11_N$ forming one or a plurality of radio zones and one or a plurality of small-scale radio zones, resulting in a hierarchy of overlapping zones, and effecting a radio channel setting control in accordance with a predetermined procedure; and a mobile station 12 accessing one of the radio zones formed by the respective one of the plurality of radio base stations $11_1$–$11_N$ in accordance with a predetermined procedure, and receiving communication service via the accessed radio zone. Each of the plurality of radio base stations $11_1$–$11_N$ comprises an announcing unit 13b for transmitting announcement information which includes identification information for identifying radio channels for the one or the plurality of radio zones and the one or the plurality of small-scale radio zones, via the radio channel assigned to the radio zone formed by the radio base station to which the announcing unit 13b belongs, the identification information being arranged in the announcement information according to respective positions in the hierarchy of overlapping zones. The mobile station 12 comprises: an announcement information receiving unit 14b for receiving the announcement information transmitted by the announcing unit 13b, in accordance with the procedure for radio channel setting control; a measuring unit 15b for measuring an electric field intensity for the radio channel corresponding to the identification information included in the announcement information received by the announcement information receiving unit 14b; and a wait control unit 16b for comparing an electric field intensity measured by the measuring unit 15b with a preset threshold level, and designating one of the radio channels, which is assigned to the radio zone lowest in the hierarchy and for which the control unit 16b has determined that the electric field intensity measured by the measuring unit 15b exceeds the preset threshold level, as a radio channel via which to receive the communication service.

The mobile communication system according to claim 5 comprises: a plurality of radio base stations $11_1$–$11_N$ forming one or a plurality of radio zones and one or a plurality of small-scale radio zones, resulting in a hierarchy of overlapping zones, and effecting a radio channel setting control in accordance with a predetermined procedure; and a mobile station 12 accessing one of the radio zones formed by the respective one of the plurality of radio base stations $11_1$–$11_N$, in accordance with a predetermined procedure, and receiving communication service via the accessed radio zone. Each of the plurality of radio base stations $11_1$–$11_N$ comprises an announcing unit 13c for transmitting announcement information which includes identification information for identifying the one or the plurality of radio zones and the one or the plurality of small-scale radio zones, via the radio channel assigned to the radio zone formed by the radio base station to which the announcing unit 13c belongs, the identification information being arranged in the announcement information according to respective positions in the hierarchy of overlapping zones. The mobile station 12 comprises: an announcement information receiving unit 14c for receiving the announcement information transmitted by the announcing unit 13c, in accordance with the procedure for radio channel setting control; a measuring unit 15c for measuring an electric field intensity for the radio zone corresponding to the identification information included in the announcement information received by the announcement information receiving unit 14c; and a wait control unit 16c for comparing an electric field intensity measured by the measuring unit 15c with a preset threshold level, and designating, as a wait zone in which to receive the communication service, a radio zone identified by the identification information to be lowest in the hierarchy of overlapping zones, on the condition that the electric field intensity measured by the measuring unit 15a exceeds the threshold level.

The mobile communication system according to claim 6 comprises: a plurality of radio base stations $11_1$–$11_N$ forming one or a plurality of radio zones and one or a plurality of small-scale radio zones, resulting in a hierarchy of overlapping zones, and effecting a radio channel setting control in accordance with a predetermined procedure; and a mobile station 12 accessing one of the radio zones formed by the respective one of the plurality of radio base stations $11_1$–$11_N$, in accordance with a predetermined procedure, and receiving communication service via the accessed radio zone. Each of the plurality of radio base stations $11_1$–$11_N$ comprises an announcing unit 13d for transmitting announcement information which includes first identification information for identifying a radio channel assigned to the radio zone formed by the radio base station to which the announcing unit 13d belongs, as well as including second identification information identifying the radio zones and the small-scale radio zones which overlap the radio zone formed by the radio base station to which the announcing unit 13d belongs, via the radio channel assigned to the radio zone formed by the radio base station to which the announcing unit 13d belongs, the second identification information being arranged in the announcement information according to respective positions in the hierarchy of overlapping zones. The mobile station 12 comprises: an announcement information receiving unit 14d for receiving the announcement information transmitted by the announcing unit 13d, in accordance with the procedure for radio channel setting control; a measuring unit 15d for measuring an electric field intensity for the radio channel corresponding to the identification information included in the announcement information received by the announcement information receiving unit 14d; and a wait control unit 16d for comparing an electric field intensity measured by the measuring unit 15d with a preset threshold level, determining the radio channel which is identified by the associated second identification information, if available, to have a lowest hierarchical order, and designating, as a wait zone in which to receive the communication service, the radio zone to which the determined radio channel is assigned, on the condition that the electric field intensity measured by the measuring unit 15d exceeds the threshold level.

The mobile communication system according to claim 7 comprises: a plurality of radio base stations $11_1$–$11_N$ forming one or a plurality of radio zones and one or a plurality of small-scale radio zones, resulting in a hierarchy of overlapping zones, and effecting a radio channel setting control in accordance with a predetermined procedure; and a mobile station 12 accessing one of the radio zones formed by the respective one of the plurality of radio base stations $11_1$–$11_N$ in accordance with a predetermined procedure, and receiving communication service via the accessed radio zone. Each of the plurality of radio base stations $11_1$–$11_N$ comprises an announcing unit 13e for transmitting announcement information which includes first identification information for identifying a radio channel assigned to a radio zone formed by the radio base station to which the announcing unit 13e belongs, as well as including second identification information identifying the radio zones and the small-scale radio zones which overlap the radio zone formed by the radio base station to which the announcing unit 13e belongs, over the radio zone formed by the radio base station to which the announcing unit 13e belongs, the second identification information being arranged in the announcement information according to respective positions in the hierarchy of overlapping zones. The mobile station 12 comprises: an announcement information receiving unit 14e for receiving the announcement information transmitted by the announcing nit 13e, in accordance with the procedure for radio channel setting control; a measuring unit 15e for measuring an electric field intensity for the radio zone corresponding to the identification information included in the announcement information received by the announcement information receiving unit 14e; and a wait control unit 16e for comparing an electric field intensity measured by the measuring unit 15e with a preset threshold level, determining the radio zone corresponding to the radio channel which is identified by the associated second identification information, if available, to have a lowest hierarchical order, and designating the determined radio zone as a wait zone in which to receive the communication service on the condition that the electric field intensity measured by the measuring unit 15e exceeds the threshold level.

The mobile communication system according to claim 8 comprises: a plurality of radio base stations $11_1$–$11_N$ forming one or a plurality of radio zones and one or a plurality of small-scale radio zones, resulting in a hierarchy of overlapping zones, and effecting a radio channel setting control in accordance with a predetermined procedure; and a mobile station 12 accessing one of the radio zones formed by the respective one of the plurality of radio base stations $11_1$–$11_N$, in accordance with a predetermined procedure, and receiving communication service via the accessed radio zone. Each of the plurality of radio base stations $11_1$–$11_N$ comprises an announcing unit 13f for transmitting announcement information which includes a hierarchical (equal or subordinate) order of the radio zone formed by the radio base station to which the announcing unit 13f belongs with respect to the overlapping radio zones and small-scale radio zones, and which also includes identification information for identifying radio channels assigned to the radio zone formed by the radio base station to which the announcing unit 13f belongs and the overlapping radio zones and small-scale radio zones, via the radio channel assigned to the radio zone formed by the radio base station to which the announcing unit 13f belongs. The mobile station 12 comprises: an announcement information receiving unit 14f for receiving the announcement information transmitted by the announcing unit 13f, in accordance with the procedure for radio channel setting control, for extracting the identification information from the announcement information, and for determining the hierarchy of the radio zones to which the radio channels identified by the identification information are assigned; a measuring unit 15f for measuring an electric field intensity for the radio channel corresponding to the identification information obtained by the announcement information receiving unit 14f; and a wait control unit 16f for comparing an electric field intensity measured by the measuring unit 15f with a preset threshold level, and designating a radio zone to which the radio channel lowest in the hierarchy is assigned as a wait zone in which to receive the communication service, on the condition that the electric field intensity measured by the measuring unit 15f for the radio channel lowest in the hierarchy exceeds the preset threshold level.

The mobile communication system according to claim 9 comprises: a plurality of radio base stations $11_1$–$11_N$ forming one or a plurality of radio zones and one or a plurality of small-scale radio zones, resulting in a hierarchy of overlapping zones, and effecting a radio channel setting control in accordance with a predetermined procedure; and a mobile station 12 accessing one of the radio zones formed by the respective one of the plurality of radio base stations $11_1$–$11_N$, in accordance with a predetermined procedure, and receiving communication service via the accessed radio zone. Each of the plurality of radio base stations $11_1$–$11_N$ comprises an announcing unit 13g for transmitting announcement information which includes a hierarchical (equal or subordinate) order of the radio zone formed by the radio base station to which the announcing unit 13g belongs with respect to the overlapping radio zones and small-scale radio zones, and which also includes identification information for identifying the radio zone formed by the radio base station to which the announcing unit 13g belongs and the overlapping radio zones and small-scale radio zones, over the radio zone formed by the radio base station to which the announcing unit 13g belongs. The mobile station 12 comprises: an announcement information receiving unit 14g for receiving the announcement information transmitted by the announcing unit 13g, in accordance with the procedure for radio channel setting control, for extracting the identification information from the announcement information, and for determining the hierarchy of the radio zones corresponding to the identification information; a measuring unit 15g for measuring an electric field intensity for the radio zone corresponding to the identification information extracted by the announcement information receiving unit 14g; and a wait control unit 16g for comparing an electric field intensity measured by the measuring unit 15g with a preset threshold level, and designating a radio zone lowest in the hierarchy determined by the announcement information receiving unit 14g as a wait zone in which to receive the communication service, on the condition that the electric field intensity measured by the measuring unit 15g for the radio zone lowest in the hierarchy exceeds the preset threshold level.

The announcing unit of the mobile communication system according to claim 10 comprises a unit for adding, in the announcement information, preset threshold values individually provided for the radio zone formed by the radio base station to which the announcing unit belongs and the overlapping radio zones and small-scale radio zones, resulting in a hierarchy that corresponds to the hierarchy of overlapping zones. The wait control unit 16 employs the threshold values added to the announcement information by the announcing unit in making comparisons with the electric field intensity.

The announcing unit of the mobile communication system according to claim 11 comprises a unit for adding a relative value indicating the preset threshold value for the zone formed by the radio base station to which the announcing unit belongs, in the form of a difference with respect to a reference value for the threshold value. The announcement information receiving unit includes a unit for determining the relative value added to the announcement information, in relation to the radio zone in which the announcement information is received. The wait control unit compares the electric field intensity measured by the measuring unit with a sum of the reference value and the relative value determined by the announcement information receiving unit in relation to the radio zone in which the electric field intensity is measured.

The announcing unit of the mobile communication system according to claim 12 comprises a unit for adding relative values indicating the preset threshold values for the radio zone formed by the radio base station to which the announcing unit belongs and the overlapping radio zones and small-scale radio zones, in the form of differences with respect to a reference value common to the threshold values, resulting in a hierarchy that corresponds to the hierarchy of overlapping zones. The wait control unit compares the electric field intensity with a sum of the relative value and the reference value.

The mobile station 12 of the mobile communication system according to claim 13 comprises a zone determination unit 17 for performing a cyclic measurement of the electric field intensity of the radio zones in which the mobile station 12 can be located, comparing a measured electric field intensity with a lower acceptance value by which an entry into the radio zone is enabled, stopping processes of measurement and comparison when it is found that the former exceeds the latter, and selecting the associated radio zone as a candidate in which the announcement information receiving unit 14 is to receive the announcement information.

The wait control unit of the mobile communication system according to claim 14 compares the electric field intensity measured by the measuring unit with the threshold value in the descending order of the hierarchy in the radio zones subject to the measurement, and designates the radio zone for which it is found that the former exceeds the latter as a wait zone.

The measuring unit of the mobile communication system according to claim 15 comprises a unit which omits a measurement of the radio zone selected by the zone determination unit 17 and substitutes therefor the electric field intensity measured by the zone determination unit.

FIG. 8 is a block diagram showing the invention described in claim 16.

The mobile station according to claim 16 comprises an announcement information receiving unit 21 for receiving announcement information including orders of priority assigned to radio zones formed by a plurality of radio base stations, the reception by the announcement information receiving unit 21 being conducted according to a descending order of preset traffic distribution and in accordance with a radio channel setting control procedure; a wait unit 23 for determining whether the radio zone associated with the order of priority included in the announcement information received by the announcement information receiving unit 21 satisfies a criteria adapted for the radio channel setting control procedure, and for designating the radio zone for which an affirmative answer is given as a wait zone; and a communication control unit 25 which receives communication service from the radio base station forming the radio zone designated by the wait unit 23.

The mobile communication system according to claim 17 comprises: a plurality of base stations forming respective radio zones that overlap each other; a mobile station transportable between said radio zones; wherein each of said plurality of base stations comprises: announcing means for sending announcement information including an order of priority of said plurality of base stations to the mobile station located in one of said radio zones, and said mobile station comprises: control means for selecting the base station to which a request for a message channel is to be issued, based on the order of priority of the base stations included in the announcement information transmitted from said plurality of base stations.

According to this aspect of the present invention, the base station as shown in FIG. 31 in which the mobile station is set up for a wait transmits the announcement information that includes the order of priority specifying, for example, that the base station B be given the priority over the base station A in selecting a base station from which to request a message channel. Therefore, the mobile station requests a message channel from the base station B in accordance with the order of priority included in the announcement information from the base station A.

Since the mobile station requests a message channel from the base station B instead of the base station A providing a higher reception level, the base station B can be used efficiently to handle call originating and call incoming in the mobile station.

The mobile station according to claim 18 further comprises: announcement information receiving means for receiving the announcement information including the order of priority of said plurality of base stations and transmitted from said plurality of base stations; and transmission means for issuing a request for a message channel to the base station selected by said control means.

According to this aspect of the present invention, the announcement information receiving means of the mobile station receives the announcement information including the order of priority of the base stations from, for example, the base station A and the base station B as shown in FIG. 31. The transmission means of the mobile station transmits a request for a message channel from a base station selected by the control means. For example, the mobile station may send the request to the base station B having the highest priority.

The mobile station according to claim 19 further comprises: storage means for storing the announcement information; measuring means for measuring a reception level in reception-level determining channels in a descending order of priority of said plurality of base stations, based on the announcement information stored in said storage means and including the order of priority and based on information relating to the reception-level determining channels.

According to this aspect of the present invention, the memory means of the mobile station stores the announcement information received by the announcement information receiving means from, for example, the base station A and the base station B as shown in FIG. 31 and including the order of priority of the base stations. Measurement of the reception level by the measuring means starts with the base station B having the highest priority, based on the order of priority of the base stations A and B stored in the storing means and the information relating to the perch channel corresponding to the respective base stations. The measuring means notifies the control means of the reception level.

Therefore, the mobile station stores the order of priority of the base stations included in the announcement information received by the announcement information receiving means and notifies the control means of the reception level so that selection can be made on the base station to which a request for a message channel is to be issued. In this way, the control means is able to select the base station B to which the request should be sent.

The control means according to claim 20 includes determining means for determining whether the reception level in a reception-level determining channel is equal to or exceeds a predetermined level that enables a request for a message channel.

According to this aspect of the present invention, the control means of the mobile station can determine whether the reception level of the perch channel of, for example, the base station A or the base station B as shown in FIG. 31 is equal to or exceeds a predetermined level.

The announcing means according to claim 21 includes first arranging means for ordering the announcement information so as to arrange information relating to reception-level determining channels in a descending order of priority.

According to this aspect of the present invention, the announcing means of, for example, the base station A as shown FIG. 31 can order the announcement information such that information relating to the perch channel of the base station A and that of the base station B are arranged in the order of priority.

The announcing means according to claim 22 includes second arranging means for ordering the announcement information so as to couple information relating to each reception-level determining channel to an order of priority associated therewith.

According to this aspect of the present invention, the announcing means of, for example, the base station A as shown in FIG. 31 can order the announcement information such that information relating to the perch channel of the base station A is coupled to the priority assigned thereto and information relating to the perch channel of the base station B is coupled to the priority assigned thereto.

The transmission means according to claim 23 includes first transmission means for issuing a request for a message channel to the base station selected by the control means when a call is originated.

According to this aspect of the present invention, the control means of the mobile station as shown in FIG. 31 can select the base station B assigned the highest priority when the mobile station originates a call, so that the transmission means can request a message channel from the base station B.

The transmission means according to claim 24 includes second transmission means for issuing a request for a message channel to the base station selected by the control means when a call is incoming.

According to this aspect of the present invention, the control means of the mobile station as shown in FIG. 31 can select the base station B assigned the highest priority when the mobile station receives an incoming call, so that the transmission means can request a message channel from the base station B.

The transmission means according to claim 25 includes third transmission means for transmitting a request for a communication to the base station selected by the control means when a message channel is switched from one to another in the event of a handover of a call.

According to this aspect of the present invention, the control means of the mobile station as shown in FIG. 31 can select the base station B assigned the highest priority when a switching of channels occurs in the event of a handover, so that the transmission means can request a message channel from the base station B.

The mobile station according to claim 26 comprises control means for selecting a base station to which a request for a message channel is to be issued, based on an order of priority of a plurality of base stations included in announcement information from said plurality of base stations.

Referring to 31, based on the announcement information from the base station A including the order of priority of the base stations A and B, the mobile station can request a message channel from the base station B instead of the base station A providing a higher reception level. Thus, the base station B, provided to handle an increased local traffic, can be efficiently used to handle call originating and call incoming in the mobile station.

The mobile station according to claim 27 comprises: announcement information receiving means for receiving, from said plurality of base stations, the announcement information including the order of priority of said plurality of base stations; and transmission means for transmitting a request for a message channel to the base station selected by said control means.

According to this aspect of the present invention, the announcement information receiving means of the mobile station receives the announcement information including the order of priority of the base stations from, for example, the base station A and the base station B as shown in FIG. 31. The transmission means of the mobile station transmits a request for a message channel from a base station selected by the control means. For example, the mobile station may send the request to the base station B having the highest priority.

The mobile station according to claim 28 comprises: storage means for storing the announcement information; measuring means for measuring a reception level in reception-level determining channels in a descending order of priority of said plurality of base stations, based on the announcement information stored in said storage means and including the order of priority and based on information relating to the reception-level determining channels.

According to this aspect of the present invention, the memory means of the mobile station stores the announcement information received by the announcement information receiving means from, for example, the base station A and the base station B as shown in FIG. 31 and including the order of priority of the base stations. Measurement of the reception level by the measuring means starts with the base station B having the highest priority, based on the order of priority of the base stations A and B stored in the storing means and the information relating to the perch channel corresponding to the respective base stations. The measuring means notifies the control means of the reception level.

Therefore, the mobile station stores the order of priority of the base stations included in the announcement information received by the announcement information receiving means and notifies the control means of the reception level so that selection can be made on the base station to which a request for a message channel is to be issued. In this way, the control means is able to select the base station B to which the request should be sent.

The control means according to claim 29 includes determining means for determining whether the reception level in a reception-level determining channel is equal to or exceeds a predetermined level that enables a request for a message channel.

According to this aspect of the present invention, the control means of the mobile station can determine whether the reception level of the perch channel of, for example, the base station A or the base station B as shown in FIG. 31 is equal to or exceeds a predetermined level.

The transmission means according to claim 30 includes first transmission means for issuing a request for a message channel to the base station selected by the control means when a call is originated.

According to this aspect of the present invention, the control means of the mobile station as shown in FIG. 31 can select the base station B assigned the highest priority when the mobile station originates a call, so that the transmission means can request a message channel from the base station B.

The transmission means according to claim 31 includes second transmission means for issuing a request for a message channel to the base station selected by the control means when a call is incoming.

According to this aspect of the present invention, the control means of the mobile station as shown in FIG. 31 can select the base station B assigned the highest priority when the mobile station receives an incoming call, so that the transmission means can request a message channel from the base station B.

The transmission means according to claim 32 includes third transmission means for transmitting a request for a communication to the base station selected by the control means when a message channel is switched from one to another in the event of a handover of a call.

According to this aspect of the present invention, the control means of the mobile station as shown in FIG. 31 can select the base station B assigned the highest priority when a switching of channels occurs in the event of a handover, so that the transmission means can request a message channel from the base station B.

The base station according to claim 33 comprises: announcing means for sending announcement information including an order of priority of a plurality of base stations constituting the mobile communication system to a mobile station located in one of the radio zones.

A mobile communication system as shown in FIG. 31 is assumed. The base station A forms a relatively large service area (zone) and a base station B having a smaller transmission power than the base station A forms a relatively small service area (zone) inside the service area formed by the base station A. The mobile station is set up for a wait in the base station A. According to the invention of claim 33, the base station A can transmit the announcement information including the order of priority of the base stations. For example, the base station B could be given a higher priority over the base station A according to the announcement information.

The announcing means according to claim 34 includes first arranging means for ordering the announcement information so as to arrange information relating to reception-level determining channels in a descending order of priority.

According to this aspect of the present invention, the announcing means of, for example, the base station A as shown FIG. 31 can order the announcement information such that information relating to the perch channel of the base station A and that of the base station B are arranged in the order of priority.

The announcing means according to claim 35 includes second arranging means for ordering the announcement information so as to couple information relating to each reception-level determining channel to an order of priority associated therewith.

According to this aspect of the present invention, the announcing means of, for example, the base station A as shown in FIG. 31 can order the announcement information such that information relating to the perch channel of the base station A is coupled to the priority assigned thereto and information relating to the perch channel of the base station B is coupled to the priority assigned thereto.

BRIEF DESCRIPTION OF THE DRAWINGS

Other objects and further features of the present invention will be apparent from the following detailed description when read in conjunction with the accompanying drawings, in which:

FIG. 2 shows a construction of conventional announcement information;

FIG. 22 shows a format of the announcement information according to the present invention;

FIG. 23 shows another format of the announcement information according to the present invention;

FIG. 24 shows still another format of the announcement information according to the present invention;

DESCRIPTION OF THE PREFERRED EMBODIMENTS

The inventive feature of an embodiment that corresponds to the invention described in claim 1 consists in the constitution of the announcement information sent by the base station control devices $69_1$–$69_4$ of the radio base stations $61_1$–$61_4$ to the control channel, and in the procedure of radio channel setting control effected by the control units $77_1$–$77_N$ of the mobile stations $65_1$–$65_N$, respectively, in accordance with the announcement information. The hardware configuration of the system according to the embodiment that corresponds to the invention described in claim 1 is the same as the conventional system shown in FIG. 1, and the description thereof is omitted.

Figure 6:
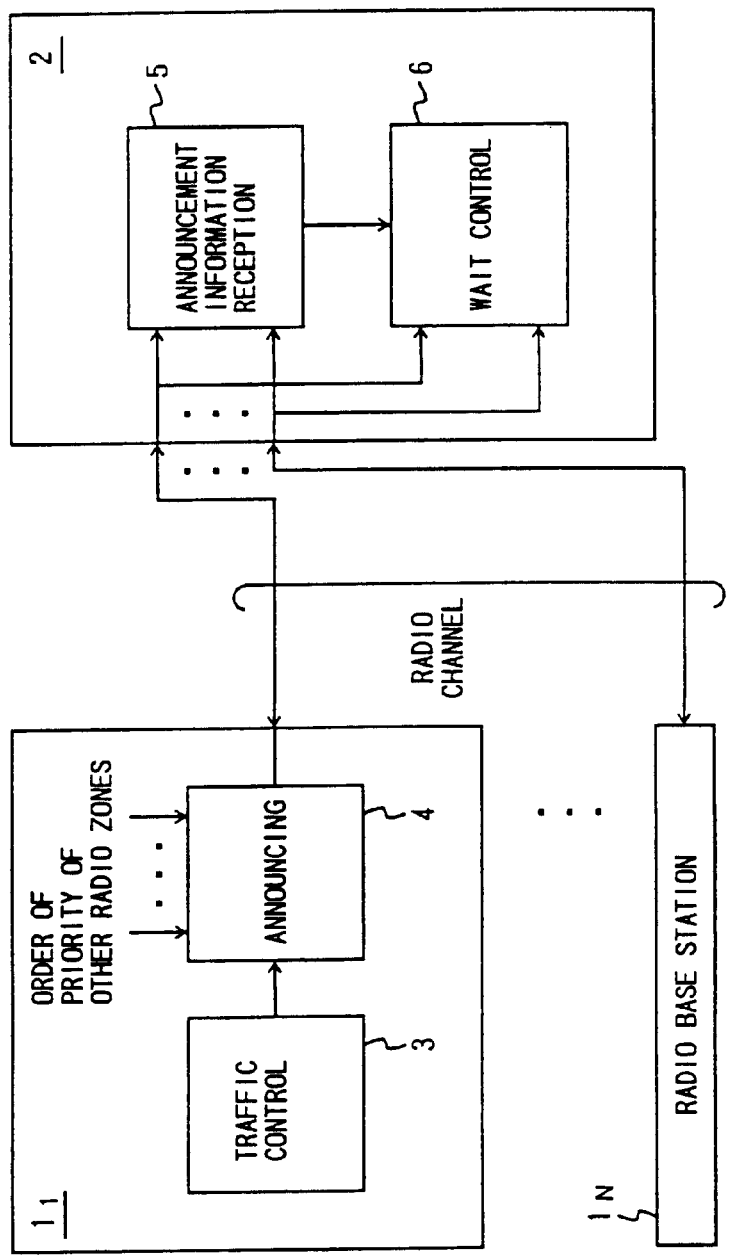
FIG. 6 is a block diagram of a mobile communication system according to the invention described in claim 1.
Figure 7:
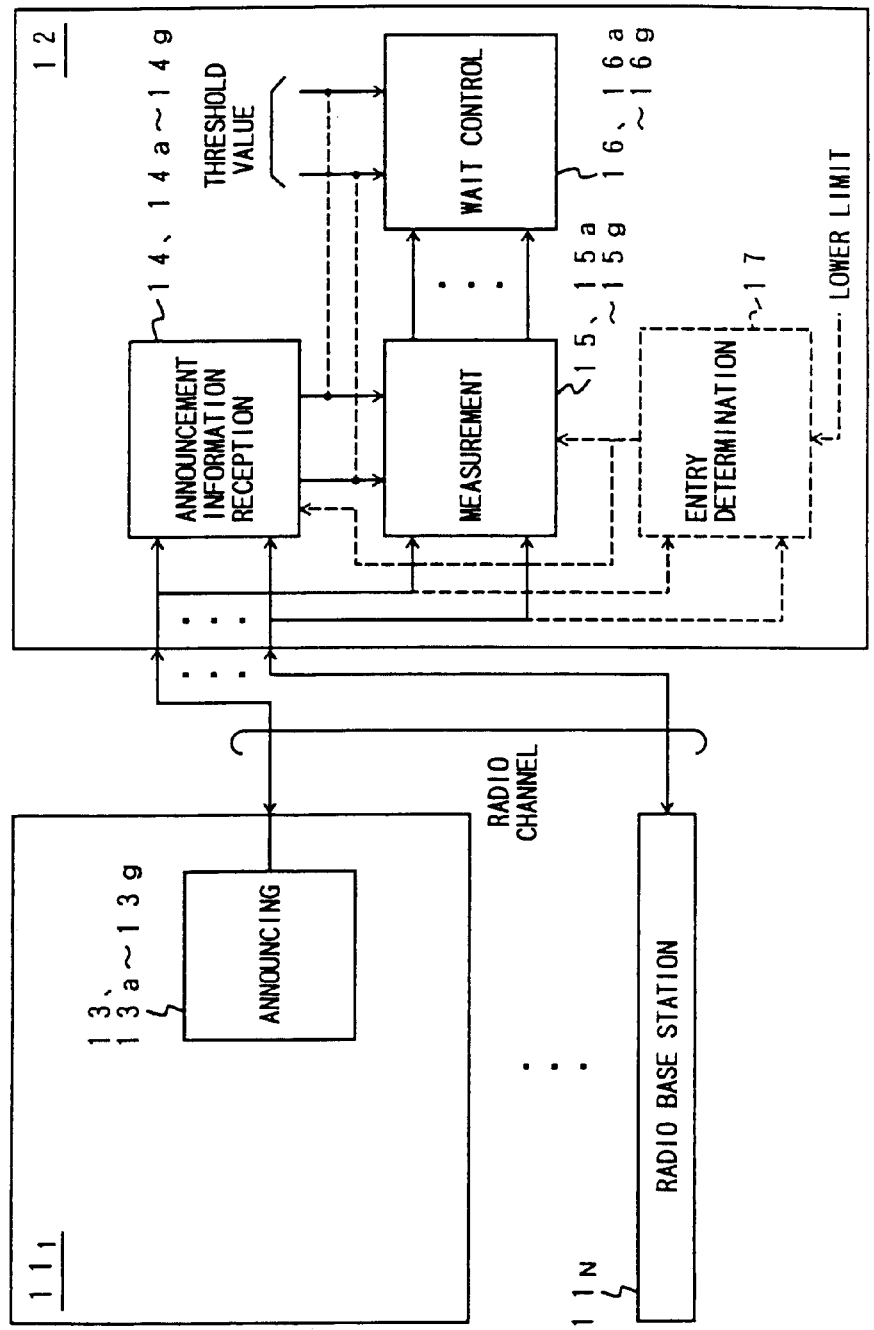
FIG. 7 is a block diagram showing a principle of the invention described in claims 2–15.

The radio base stations $61_1$–$61_4$ correspond to the radio base stations $1_1$–$1_N$ shown in FIG. 6, respectively. Each of the radio base stations $1_{1-N}$ includes the respective traffic control unit 3 and the announcing unit 4. The mobile stations $65_1$–$65_N$ correspond to the mobile station 2 which includes the announcement information receiving unit 5 and the wait control unit 6.

Figure 1:
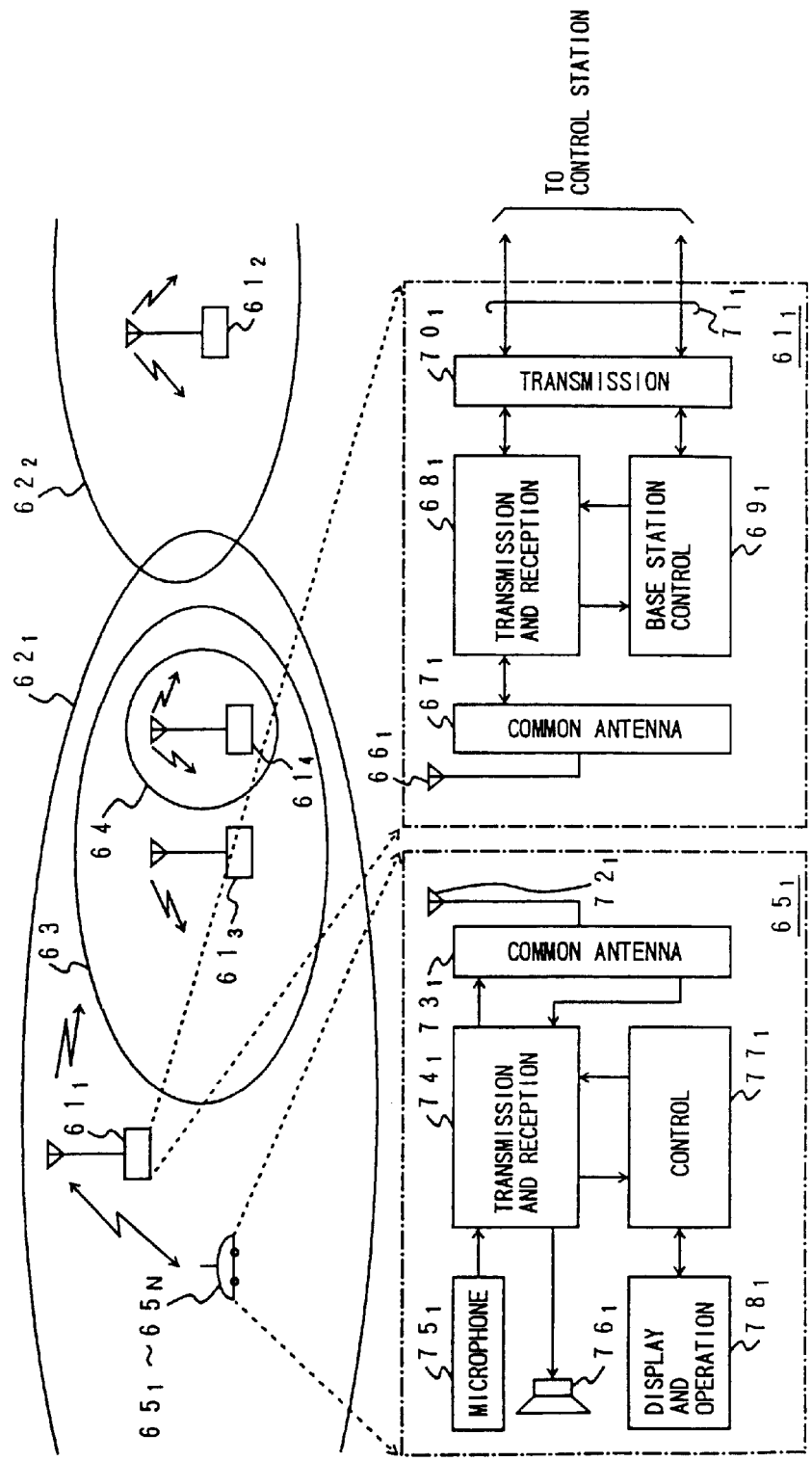
FIG. 1 shows a construction of a conventional mobile communication system.

A description will now be given, with reference to FIG. 1, of the operation of the system that corresponds to the invention described in claim 1.

Each of the base station control devices $69_1$–$69_4$ of the radio base stations $61_1$–$61_4$, respectively, maintains a data base (not shown). Such a data base assigns a weight to each of the radio base stations $61_1$–$61_4$ so as to arrange the radio base stations $61_1$–$61_4$ in the order of priority. The weight is determined by a condition such as the operating mode and the current traffic. The operating mode could include the day of the week, the time zone of the day and the like.

Each of the base station control devices $69_1$–$69_4$ also monitors calls originated in mobile stations located in a radio zone formed by the respective base station, so that the traffic in that radio zone can be measured. The measured traffic is reported to the other base stations via a communication link (not shown).

Further, each of the base station control devices $69_1$–$69_4$ refers to the above-mentioned data base against the traffic measured locally, the traffic reported by the other base stations, and the day of the week and the time zone, so as to determine a combination of weights suitable for the combination of the ongoing traffic. Each of the base station control devices $69_1$–$69_4$ then incorporates the determined combination in the announcement information in relation to the respective radio zones $62_1$–$62_4$ (or the radio base stations $61_1$–$61_4$). The announcement information is transmitted via the transmission and reception units $68_1$–$68_4$, the common antenna equipment units $67_1$–$67_4$ and the antennas $66_1$–$66_4$.

The control unit $77_1$ of the mobile station $65_1$ effects a measurement process and a zone determination process as in the conventional system. Given that there are a plurality of candidate radio zones which the mobile station $65_1$ may enter, the radio zone to which the greatest weight is assigned in the announcement information is selected as the first candidate zone for entry so that the control unit $77_1$ can enter a wait state.

Thus, according to the embodiment that corresponds to the invention described in claim 1, the distribution of the mobile stations set up for a wait in respective radio zones can be varied dynamically so as to be adapted for the operating condition and the operating mode of the radio base stations. Therefore, maintenance and operating requirements are flexibly met and the resources such as the radio base stations and the radio frequencies are effectively utilized.

In the above-described embodiments, the weights are determined by the traffic distribution in the radio zones, the day of the week and the time zone. However, the weight may be appropriately provided in correspondence with events detected in the process of the monitoring control and the radio channel setting control effected by the radio base stations. Such events may be various failures and releases therefrom, or congestions in radio channels.

Figure 8:
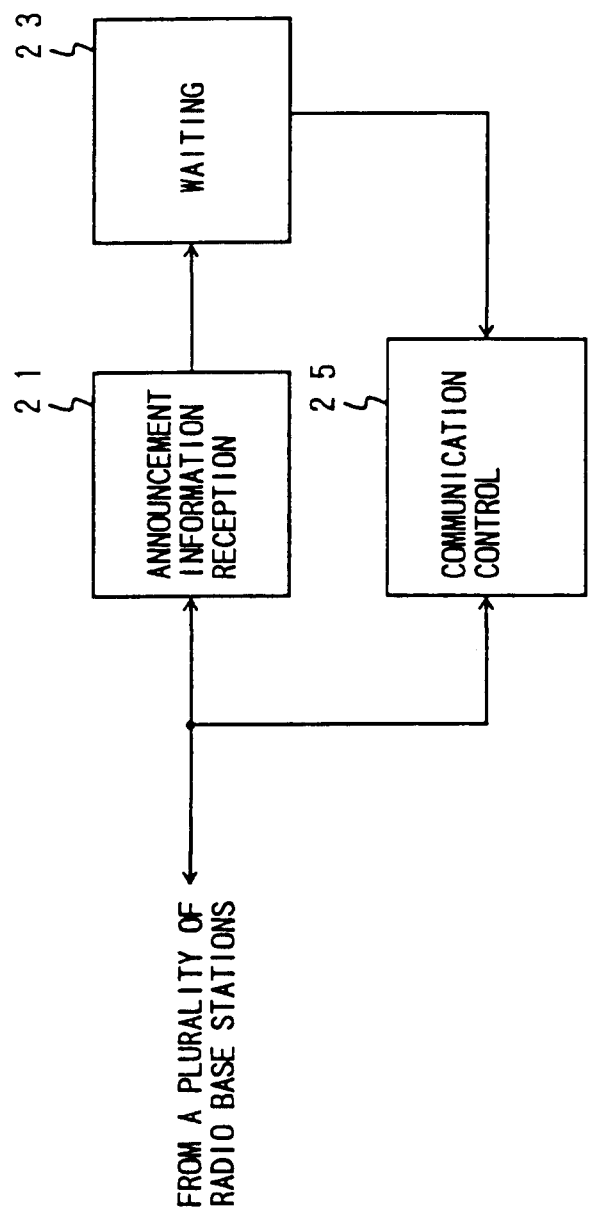
FIG. 8 is a block diagram showing a principle of the invention described in claim 16.

FIG. 8 is a flowchart of an operation of the mobile communication system according to embodiments that correspond to the invention described in claims 2, 3 and 14–16.

The inventive feature of the embodiments that correspond to the invention described in claims 2, 3 and 14–16 consists in the constitution of the announcement information sent by the base station control devices $69_1$–$69_4$ of the radio base stations $61_1$–$61_4$ to the control channel, and in the procedure of radio channel setting control process effected by the control units $77_1$–$77_N$ of the mobile stations $65_1$–$65_N$, respectively, in accordance with the announcement information. The hardware configuration of the embodiments that correspond to the invention described in claims 2, 3 and 14–16 is the same as that of the conventional system shown in FIG. 1, and the description thereof is omitted.

The radio base stations $61_1$–$61_4$ correspond to radio base stations $11_1$–$11_N$ which include announcing units 13 and 13a–13g, respectively. The mobile stations $65_1$–$65_N$ correspond to a mobile station 12 which includes one of announcing information receiving units 14 and 14a–14g (in the case of claim 2) or an announcing information receiving unit 21 (in the case of claim 16). The mobile station 12 also includes one of measuring units 15 and 15a–15g, one of wait control units 16 and 16a–16g, an entry determining unit 17, a wait unit 23, and a communication control unit 25.

A description will now be given of the operation of the system according to embodiments that correspond to the invention described in claims 2, 3 and 16. For the sake of simplicity of the description that follows, it is assumed that the mobile station $65_1$ is located in the same location assumed in the description of the related art.

In the absence of a hierarchy of radio zones (hereinafter, referred to as overlap zones) embodied by a microcell 63, a picocell 64 and the like at respective locations in a radio zone formed by the radio base station $61_1$, the base station control device $69_1$ of the radio base station $61_1$ transmits the announcement information having the same format as that of the conventional announcement information as shown in FIG. 2, via the transmission and reception unit $68_1$, the common antenna equipment unit $67_1$ and the antenna $66_1$.

Figure 10:
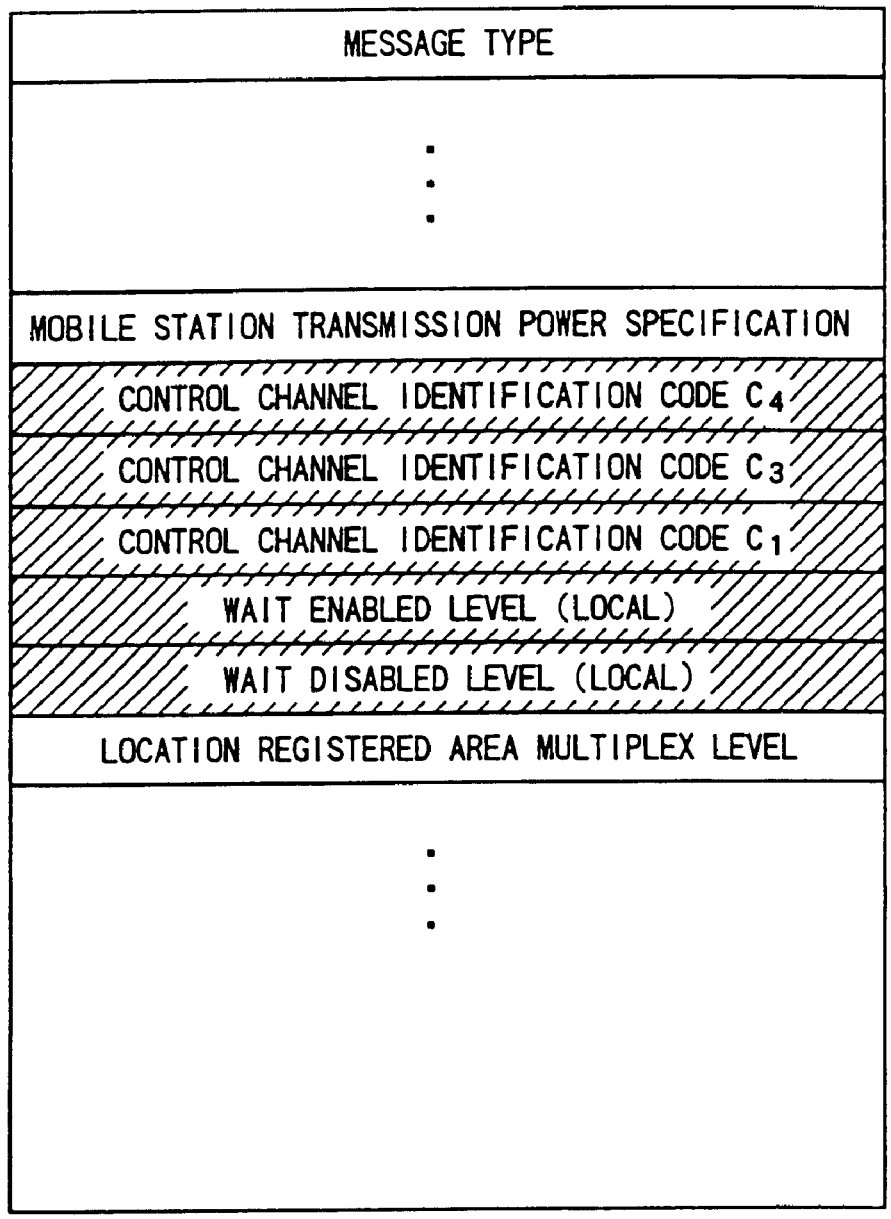
FIG. 10 shows a format of announcement information according to an embodiment that corresponds to the invention described in claims 2 and 3.

If there are overlap zones, the base station control device $69_1$ is provided by a control station (not shown) with an identification code $C_1$ for a control channel formed by the radio base station $61_1$ and identification codes $C_3$ and $C_4$ for control channels (hereinafter, referred to as overlap control channels) assigned to the microcell 63 and the picocell 64 embodying the overlap zones, via the communication link $71_1$ and the transmission device $70_1$. As indicated by a hatched area in FIG. 10, the base station control device $69_1$ incorporates, in the announcement information, the identification codes $C_1$ and $C_3$–$C_4$ for the control channel and the overlap control channels, respectively, such that a series of the identification codes $C_4$, $C_3$ and $C_1$ are arranged according to respective positions in the hierarchy. The wait enabled level and the wait disabled level are also included in the announcement information as in the conventional system.

The control unit $77_1$ of the mobile station $65_1$ effects the measurement process and the zone determination process as in the conventional system. In the zone determination process, a determination as to whether the format of the announcement information received via the control channel subject to the measurement of the electric field intensity $L_2$ is the same as the conventional format shown in FIG. 2 is made, depending on whether the above-described series of the identification codes is included in the announcement information ((1) of FIG. 9).

Figure 9:
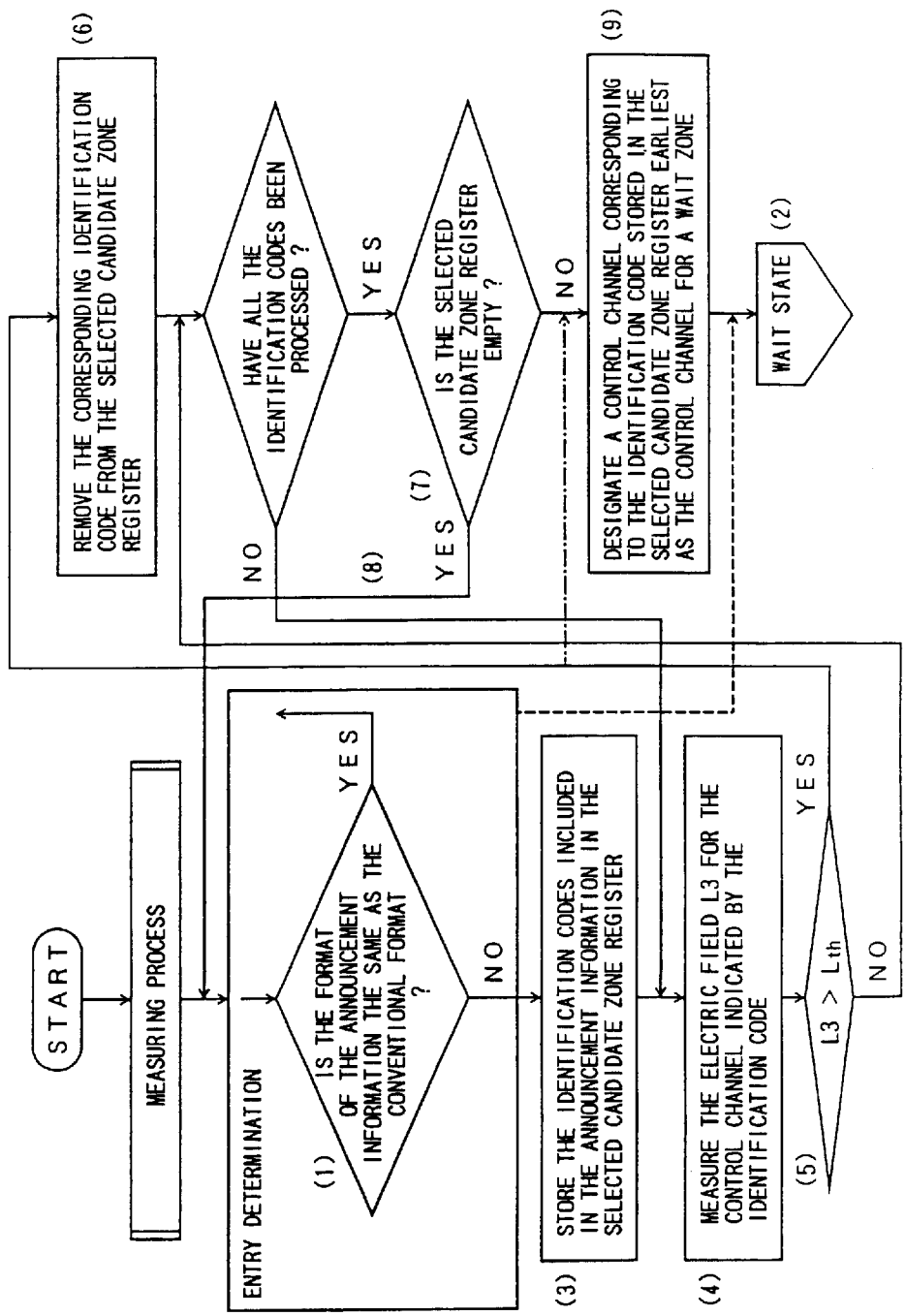
FIG. 9 is a flowchart of an operation of a system according to the invention described in claims 2, 3, 14–16.

If the format of the announcement information is found to be the same as the conventional format, the control unit $77_1$ performs the zone determination process in accordance with the same procedure as observed in the conventional system before proceeding to a wait state ((2) of FIG. 9).

If the format of the announcement information is not found to be the same as the conventional format, the control unit $77_1$ stores the series of the identification codes $C_4$, $C_3$ and $C_1$ in a reserved area (hereinafter, referred to as a selected candidate zone register) in the main memory ((3) of FIG. 9). The control unit $77_1$ sequentially refers to the identification codes $C_4$, $C_3$ and $C_1$ and measures the electric field intensity $L_3$ of the overlap control channels and the control channel corresponding to the respective identification codes ((4) of FIG. 9). The control unit $77_1$ then compares the measured electric field intensity with the wait enabled level $L_{th}$ received in the announcement information via the channel subject to the measurement ((5) of FIG. 9).

If the electric field $L_3$ is found to exceed the wait enabled level $L_{th}$, the control unit $77_1$ retains the relevant identification code in the selected candidate zone register. If the opposite is the case, the relevant identification code is removed ((6) of FIG. 9).

When the control unit $77_1$ has processed all the identification codes stored in the candidate zone register, a determination is made as to whether or not the selected candidate zone register contains any identification code ((7) of FIG. 9).

When the determination in (7) gives a negative answer, the control unit $77_1$ performs the zone determination process in accordance with the conventional procedure before proceeding to a wait state ((8) of FIG. 9).

When the determination in (7) gives a positive answer, the control unit $77_1$ designates an overlap control channel (or a control channel) specified by the identification code stored earliest in the selected candidate zone register as a control channel for a radio zone in which the mobile station $65_1$ is to receive the communication service, and proceeds to be set up for a wait in the designated control channel ((9) of FIG. 9).

Thus, in the system described above, the mobile stations $65_1$–$65_N$ give a priority to the microcell 63 over the radio zone $62_1$, and give a priority to the picocell 64 over the microcell 63, in selecting a wait zone. In contrast with the conventional system in which the wait zone is selected simply in accordance with the order of electric field intensity of the associated control channels, the embodiments that correspond to the invention described in claims 2, 3 and 14–16 ensure that the mobile station can wait in the most appropriate zone than the conventional system.

In the foregoing description, it is assumed that the mobile stations $65_1$–$65_N$ are implemented by the mobile station described in claim 16. However, mobile stations according to different embodiments may also be employed.

Figure 11:
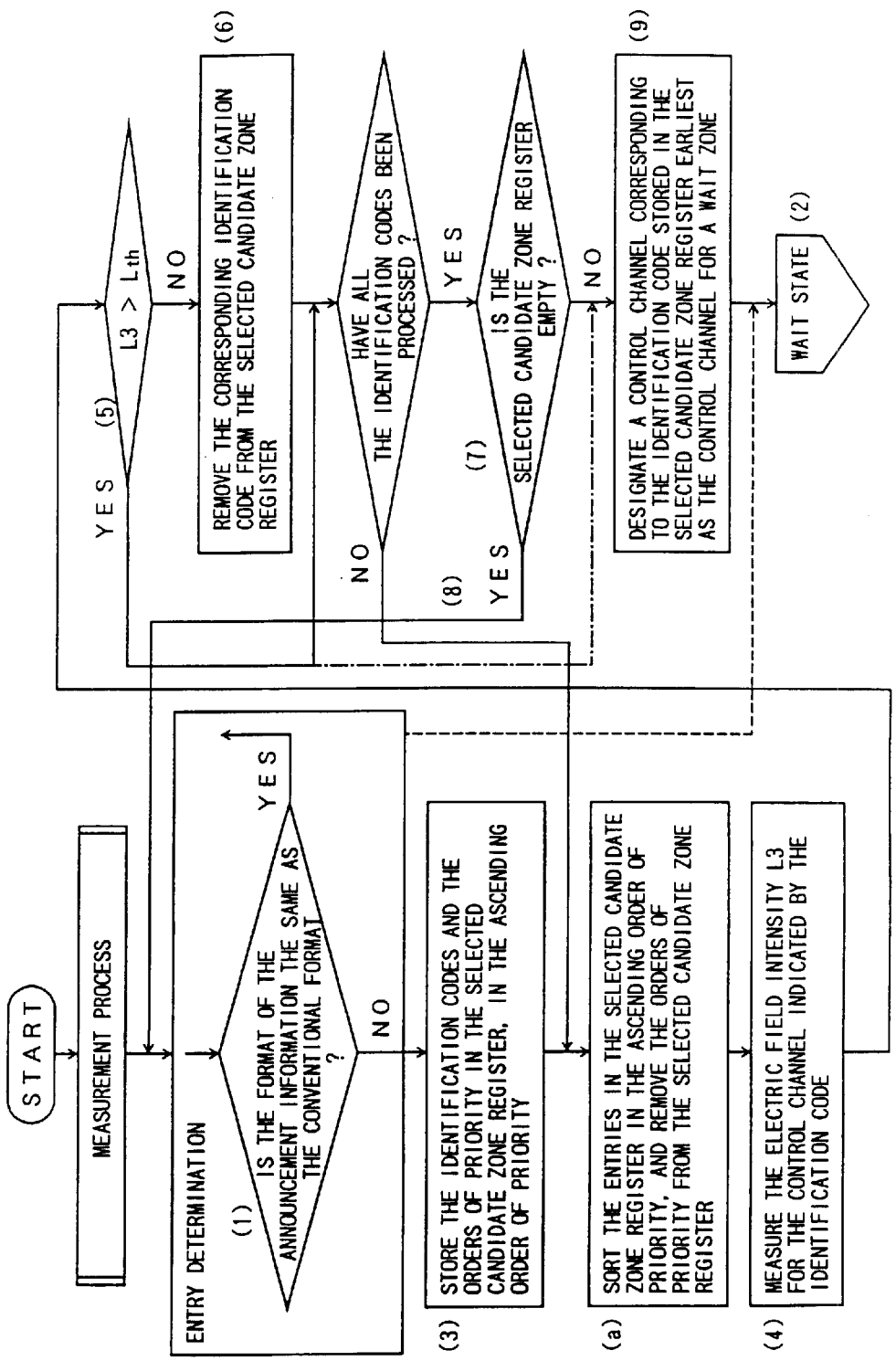
FIG. 11 is a flowchart of an operation according to an embodiment that corresponds to the invention described in claims 4–9, 14 and 15.

FIG. 11 is a flowchart of an operation of the mobile communication system according to embodiments that correspond to the invention described in claims 4–9, 14 and 15.

A description will now be given, with reference to FIGS. 1 and 11, of the operation of the system according to embodiments that correspond to invention described in claims 4–7. For the sake of simplicity of the description that follows, it is assumed that the mobile station $65_1$ is located in the same location assumed in the description of the related art.

In the absence of overlap zones such as a microcell 63, a picocell 64 and the like at respective locations in a radio zone formed by the radio base station $61_1$, the base station control device $69_1$ of the radio base station $61_1$ transmits the announcement information having the same format as that of the conventional announcement information as shown in FIG. 2, via the transmission and reception unit $68_1$, the common antenna equipment unit $67_1$ and the antenna $66_1$.

If there are overlap zones, the base station control device $69_1$ is provided by a control station (not shown) with an identification code $C_1$ for a control channel assigned to the radio base station $61_1$, identification codes $C_3$ and $C_4$ for overlap control channels assigned to the microcell 63 and the picocell 64 embodying the overlap zones, and numerals $P_1$, $P_3$ and $P_4$ indicating the hierarchical order of the radio zone $62_1$, the microcell 63 and the picocell 64, via the communication link $71_1$ and the transmission device $70_1$. The numerals will be simply referred to as the order of priority. For the sake of simplicity of the description, it is assumed that the radio zone $62_1$ has the order of priority $P_1=0$, the microcell 63 $P_3=1$ and the picocell 64 $P_4=2$.

Figure 12:
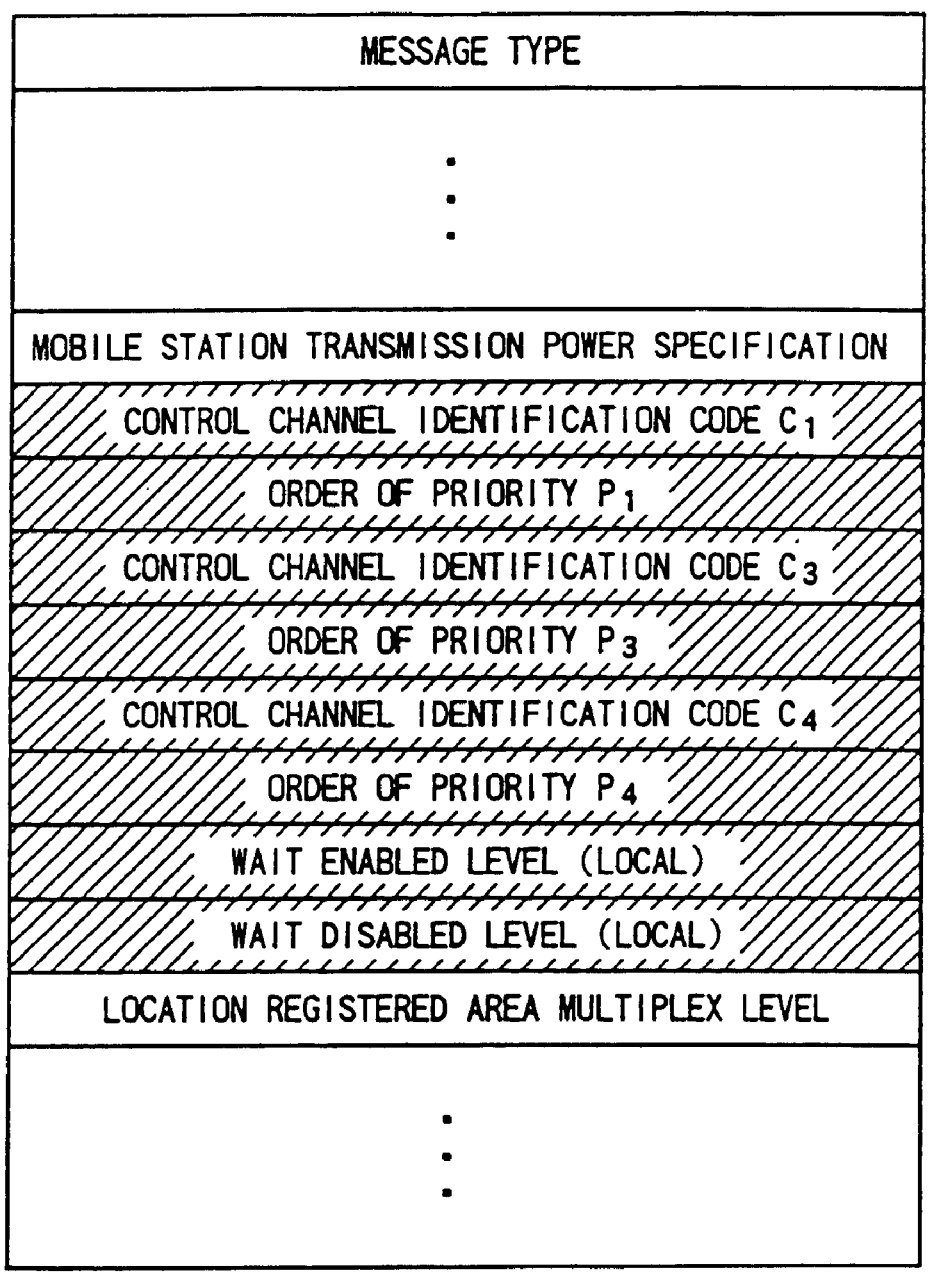
FIG. 12 shows a format of announcement information according to an embodiment that corresponds to the invention described in claims 4–7.

As indicated by a hatched area in FIG. 12, the base station control device $69_1$ incorporates, in the announcement information, the identification codes $C_1$ and $C_3$–$C_4$, and the orders of priority $P_1$, $P_3$ and $P_4$ such that a resultant series of identification information $C_1$, $P_1$, $C_3$, $P_3$, $C_4$ and $P_4$ show correspondences between the individual channels and the order of priority associated therewith. The wait enabled level and the wait disabled level are also included in the announcement information as in the conventional system.

The control unit $77_1$ of the mobile station $65_1$ effects the measurement process and the zone determination process as in the conventional system. In the zone determination process, a determination as to whether the format of the announcement information received via the control channel subject to the measurement of the electric field intensity $L_2$ is the same as the conventional format shown in FIG. 2 is made, depending on whether the above-described series of the identification information is included in the announcement information ((1) of FIG. 11).

If the format of the announcement information is found to be the same as the conventional format, the control unit $77_1$ performs the zone determination process in accordance with the same procedure as observed in the conventional system before proceeding to a wait state ((2) of FIG. 11).

If the format of the announcement information is not found to be the same as the conventional format, the control unit $77_1$ stores the series of the identification information $C_1$, $P_1$, $C_3$, $P_3$, $C_4$ and $P_4$ in the selected candidate zone register in the main memory ((3) of FIG. 11). The control unit $77_1$ sorts the combinations of the identification codes and the orders of priority stored in the selected candidate zone register, in the ascending order of priority. Once this sorting is done, all the orders of priority are removed from the register, resulting in the series of identification information consisted only of the identification codes being stored in the selected candidate zone register ((a) of FIG. 11).

The control unit $77_1$ sequentially refers to the identification codes $C_4$, $C_3$ and $C_1$ and measures the electric field intensity $L_3$ of the overlap control channels and the control channel corresponding to the respective identification codes ((4) of FIG. 11). The control unit $77_1$ then compares the measured electric field intensity with the wait enabled level $L_{th}$ received in the announcement information via the channel subject to the measurement ((5) of FIG. 11).

When the result of the comparison is available, the control unit $77_1$ then enters a wait state in accordance with the same procedure as observed in the embodiment that corresponds to the invention described in claim 2. The steps subsequent to (5) of FIG. 11 are designated by the same reference numerals (6)–(9) as the corresponding steps of FIG. 9, and the description thereof is omitted.

According to embodiments that correspond to the invention described in claims 4–9, 14 and 15, as long as the correspondences between the identification codes and the respective orders of priority are established, it is possible for the radio base stations $61_1$–$61_4$ to transmit identification information as part of the announcement information irrespective of the order of priority. Accordingly, a flexible operation of the radio base stations $61_1$–$61_4$ allowing addition of radio zones or reforming is enabled. As in the embodiment that corresponds to the invention described in claims 2 and 3, it is possible for the mobile stations $65_1$–$65_4$ to give a priority to the microcell 63 over the radio zone $62_1$ and to give a priority to the picocell 64 over the microcell 63, in selecting a wait zone.

According to the embodiment that corresponds to the invention described in claims 4–9, 14 and 15, the series of identification information ($C_1$, $P_1$, $C_3$, $P_3$, $C_4$, $P_4$) stored in the selected candidate zone register is sorted in the ascending order of the priority, and then the identification information consisting only of the identification codes are retained in the selected candidate zone register. An alternative procedure may be to retain the orders of priority in the selected candidate zone register so that the identification code with the highest priority may be referred to in selecting a wait zone.

As shown in FIG. 12, according to the embodiment that corresponds to the invention described in claims 4–9, 14 and 15, the radio base station $61_1$ transmits, as part of the announcement information, the order of priority $P_1$ for the radio zone $62_1$ in relation to the identification code $C_1$ for the radio zone $62_1$. However, if the mobile station ($65_1$–$65_N$) is capable of identifying the relative order of priority of the radio zone $62_1$ with respect to other radio zones (for example, the microcell 63 and the picocell 64), or if it is evident that the mobile station ($65_1$–$65_N$) should be set up for a wait in the radio zone at the top of the hierarchy or the radio zone at the bottom thereof, the order of priority may not be included in the announcement information. Accordingly, the volume of the announcement information is reduced so that the system flexibility with respect to modifications etc. thereof can be improved.

A description will now be given, with reference to FIGS. 1 and 11, of the operation of the system according to an embodiment that corresponds to the invention described in claims 8 and 9. For the sake of simplicity of the description that follows, it is assumed that the mobile station $65_1$ is located in the same location assumed in the description of the related art.

In the absence of overlap zones such as a microcell 63, a picocell 64 and the like at respective locations in a radio zone formed by the radio base station $61_1$, the base station control device $69_1$ of the radio base station $61_1$ transmits the announcement information having the same format as that of the conventional announcement information as shown in FIG. 2, via the transmission and reception unit $68_1$, the common antenna equipment unit $67_1$ and the antenna $66_1$.

Figure 13:
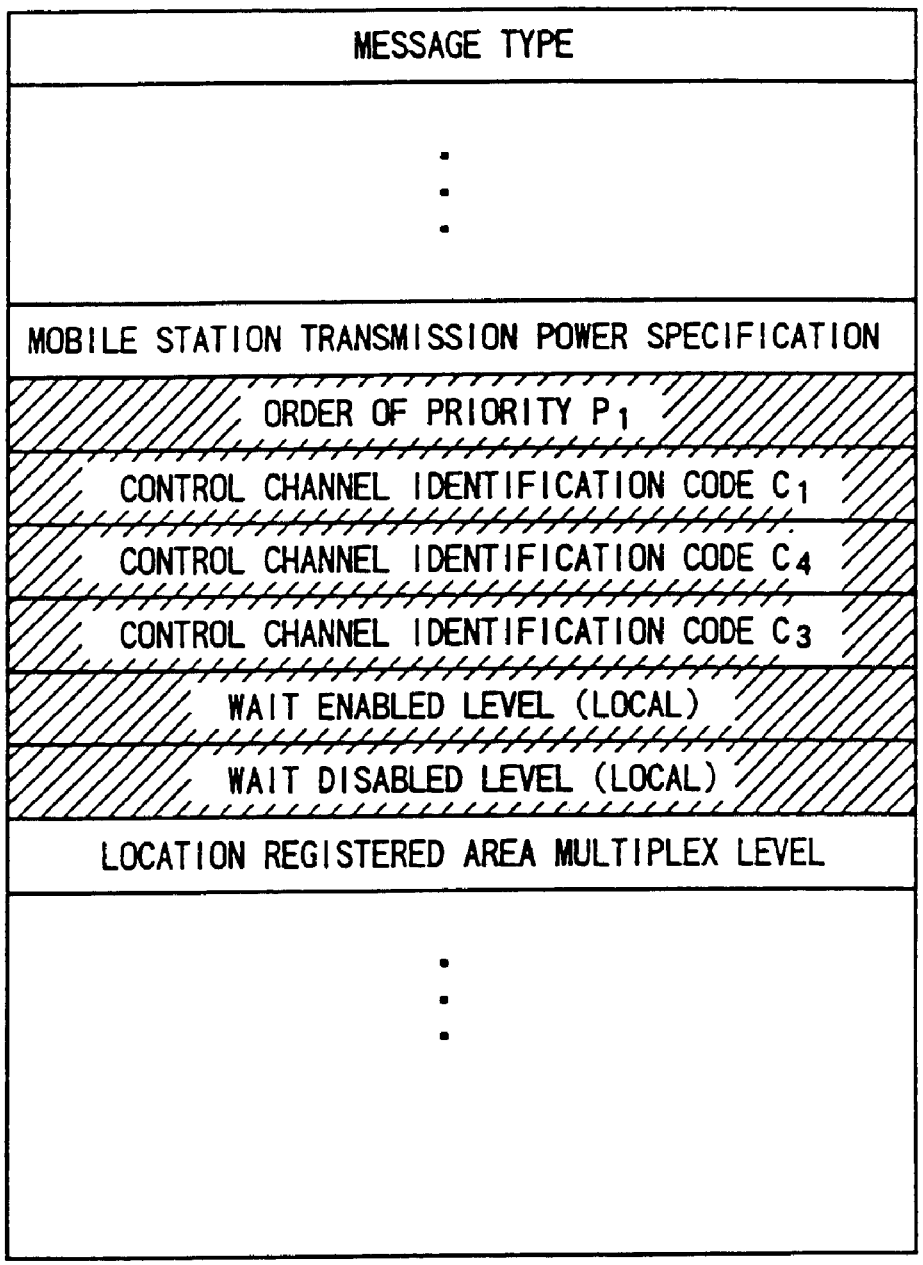
FIG. 13 shows a format of announcement information according to an embodiment that corresponds to the invention described in claims 8 and 9.

If there are overlap zones, the base station control device $69_1$ is provided by a control station (not shown) with an identification code $C_1$ and an associated order of priority $P_1$ for a control channel formed by the radio base station $61_1$, identification codes $C_3$ and $C_4$ for overlap control channels assigned to the microcell 63 and the picocell 64 embodying the overlap zones, the order of the identification codes $C_3$ and $C_4$ not being related to the associated orders of priority. The resultant series of identification information $P_1$, $C_1$, $C_4$ and $C_3$ incorporated in the announcement information is indicated by a hatched area in FIG. 13. The wait enabled level and the wait disabled level are also included in the announcement information as in the conventional system. For the sake of simplicity of the description, it is assumed that the order of priority $P_1=0$.

The control unit $77_1$ of the mobile station $65_1$ effects the measurement process and the zone determination process as in the conventional system. In the zone determination process, a determination is made as to whether the format of the announcement information received via the control channel in which the electric field intensity $L_2$ is measured is the same as the conventional format shown in FIG. 2, depending on whether the above-described series of the identification information is included in the announcement information ((1) of FIG. 11).

If the format of the announcement information is found to be the same as the conventional format, the control unit $77_1$ performs the zone determination process in accordance with the same procedure as observed in the conventional system before proceeding to a wait state ((2) of FIG. 11).

If the format of the announcement information is not found to be the same as the conventional format, the control unit $77_1$ extracts the order of priority $P_1$ and the identification code $C_1$ from the series of identification information $P_1$, $C_1$, $C_4$ and $C_3$ and stores the extracted information in the selected candidate zone register in the main memory ((3) of FIG. 11). The control unit $77_1$ measures the electric field intensity $L_2$ of the overlap control channels specified by the identification codes $C_4$ and $C_3$ and stores the identification codes $C_4$ and $C_3$, and the orders of priority thereof in the selected candidate zone register. A similar step as above is performed in the event that any additional identification code is received in the form of the announcement information (an identification code that is repeated is not subject to the above step).

When the identification codes and the associated orders of priority for the radio zones that are candidates for a wait zone have been stored in the selected candidate zone register, the control unit 771 performs the same steps ((a), (4)–(9) of FIG. 11) as performed in the embodiment that corresponds to the invention described in claims 4–7, before proceeding to a wait state.

According to the embodiment described above, the announcement information may not include the orders of priority of all the microcells and picocells in order for the control unit $77_1$ of the mobile station $65_1$ to specify the control channel for the radio zone in which the mobile station $65_1$ is actually located before proceeding to a wait state.

Therefore, an advantage of the embodiment that corresponds to the invention described in claims 8 and 9 over the embodiment that corresponds to the invention described in claims 4–7 is that the transmission efficiency of the control channel is increased and flexibility with respect to different modes of service is available.

While the identification codes in the foregoing embodiments are for identifying individual control channels or overlap control channels, the present invention is not limited to such a constitution. The mobile station ($65_1$–$65_N$) may use alternative identification information (zone identification information) for identifying radio zones (such as the picocell 64, the microcell 63, the radio zone $62_1$), instead of control channels associated therewith, included in the announcement information, in order to determine a radio zone for entry.

In the alternative approach described above, information specifying overlap control channels and control channels that correspond to the zone identification information may be stored in the form of a table in an area reserved in a main memory of the control unit $77_1$–$77_N$, or may be provided separately (for example, as part of the announcement information) in accordance with the radio channel setting control executed in relation to the radio base stations $61_1$–$61_4$.

Figure 14:
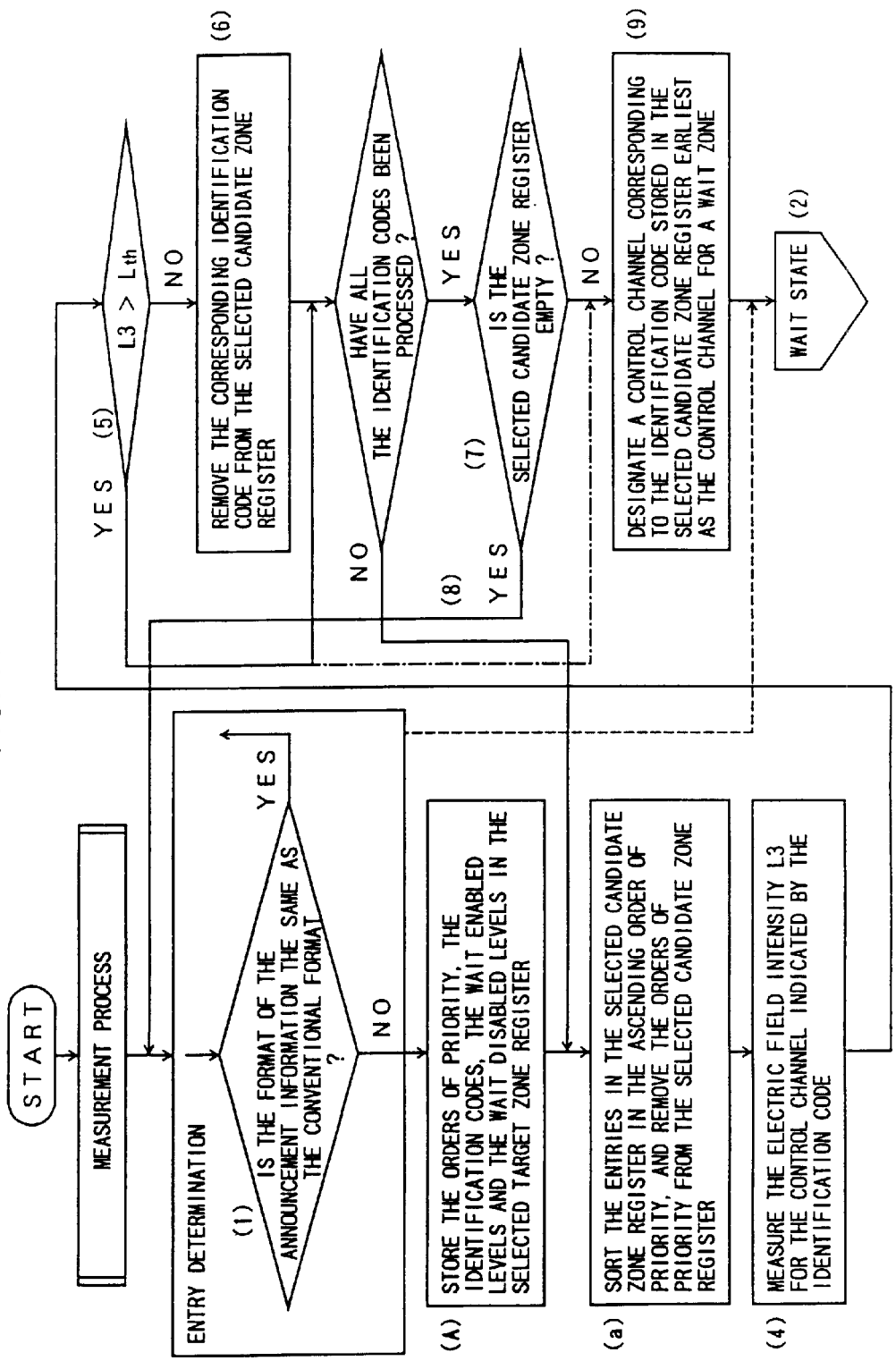
FIG. 14 is a flowchart of an operation according to an embodiment that corresponds the invention described in claims 10, 14 and 15.

FIG. 14 is a flowchart of an operation of the mobile communication system according to an embodiment that corresponds to the invention described in claims 10, 14 and 15.

A description will now be given, with reference to FIGS. 1 and 14, of the operation according to an embodiment that corresponds to the invention described in claim 10. For the sake of simplicity of the description that follows, it is assumed that the mobile station $65_1$ is located in the same location assumed in the description of the related art.

In the absence of overlap zones at respective locations in a radio zone formed by the radio base station $61_1$, the base station control device $69_1$ of the radio base station 61 transmits the announcement information having the same format as that of the conventional announcement information as shown in FIG. 2, via the transmission and reception unit $68_1$, the common antenna equipment unit $67_1$ and the antenna $66_1$.

If there are overlap zones, the base station control device $69_1$ is provided by a control station (not shown) with an identification code $C_1$ for a control channel assigned to the radio base station $61_1$, identification codes $C_3$ and $C_4$ for overlap control channels assigned to the microcell 63 and the picocell 64 embodying the overlap zones, orders of priority $P_1$, $P_3$ and $P_4$ indicating the hierarchical order of the radio zone $62_1$, the microcell 63 and the picocell 64, wait enabled levels $L_{th1}$, $L_{th2}$ and $L_{th3}$ and the wait disabled levels $l_{th1}$, $l_{th3}$ and $l_{th4}$, via the communication link $71_1$ and the transmission device $70_1$. For the sake of simplicity of the description, it is assumed that the radio zone $62_1$ has the order of priority $P_1$=0, the microcell 63 $P_3$=1 and the picocell 64 $P_4$=2.

Figure 15:
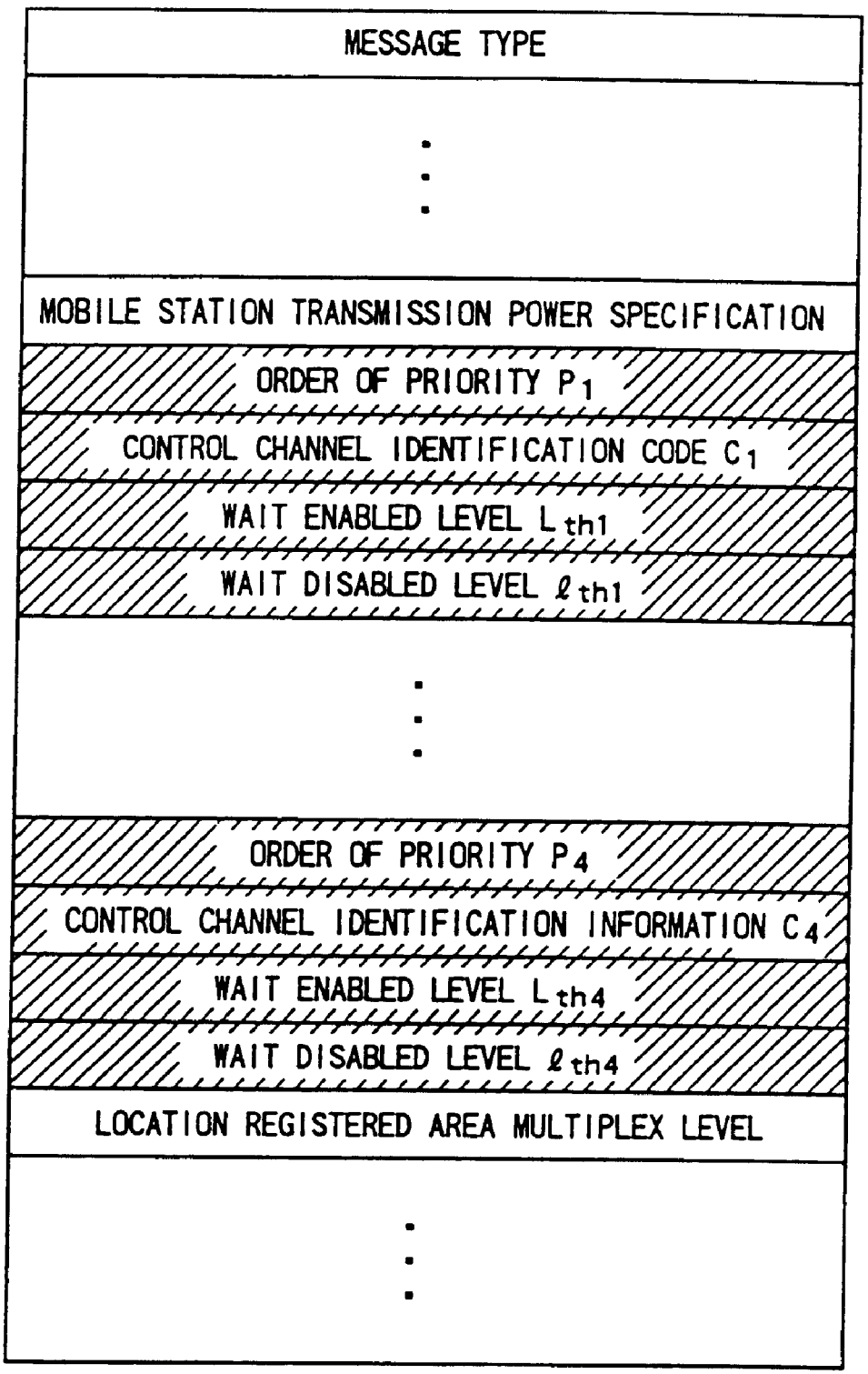
FIG. 15 shows a format of announcement information according to an embodiment that corresponds to the invention described in claim 10.

As indicated by a hatched area in FIG. 15, the base station control device $69_1$ incorporates, in the announcement information, the orders of priority $P_1$, $P_3$ and $P_4$, the identification codes $C_1$, $C_3$ and $C_4$, the wait enabled levels $L_{th1}$, $L_{th2}$ and $L_{th3}$ and the wait disabled levels $l_{th1}$, $l_{th3}$ and $l_{th4}$, resulting in series of identification information ($P_1$, $C_1$, $L_{th1}$ and $l_{th1}$) . . . ($P_4$, $C_4$, $L_{th4}$ and $l_{th4}$) each corresponding to the radio zone.

The control unit $77_1$ of the mobile station $65_1$ effects the measurement process and the zone determination process as in the conventional system. In the zone determination process, a determination as to whether the format of the announcement information received via the control channel subject to the measurement of the electric field intensity $L_2$ is the same as the conventional format shown in FIG. 2 is made, depending on whether the above-described series of the identification information is included in the announcement information ((1) of FIG. 14).

If the format of the announcement information is found to be the same as the conventional format, the control unit $77_1$ performs the zone determination process in accordance with the same procedure as observed in the conventional system before proceeding to a wait state ((2) of FIG. 14).

If the format of the announcement information is not found to be the same as the conventional format, the control unit $77_1$ stores the series of the identification information ($P_1$, $C_1$, $L_{th1}$ and $l_{th1}$) . . . ($P_4$, $C_4$, $L_{th4}$ and $l_{th4}$) included in the announcement information in the selected candidate zone register (A) of FIG. 14). The control unit $77_1$ sorts the combinations of the orders of priority, the identification codes, the wait enabled levels and the wait disabled levels stored in the selected candidate zone register, in the ascending order of priority. Once this sorting is done, all the orders of priority are removed from the register ((a) of FIG. 14), resulting in the series of identification information consisted of the identification codes, the wait enabled levels and the wait disabled levels being stored in the selected candidate zone register.

The control unit $77_1$ sequentially refers to the identification codes $C_4$, $C_3$ and $C_1$, and wait enabled levels $L_{th4}$, $L_{th3}$ and $L_{th1}$ arranged in the ascending order of priority so as to measure the electric field intensity $L_3$ of the overlap control channels and the control channel corresponding to the respective identification codes ((4) of FIG. 14). The control unit $77_1$ then compares the measured electric field intensity with the wait enabled level $L_{th}$ that corresponds to the measured channel ((5) of FIG. 14).

When the result of the comparison is available, the control unit $77_1$ then enters a wait state in accordance with the same procedure observed in the embodiment that corresponds the invention described in claim 4. The steps subsequent to (5) of FIG. 14 are designated by the same reference numerals (6)–(9) as the corresponding steps of FIG. 9, and the description thereof is omitted.

According to the embodiment that corresponds to the invention described in claim 10, the mobile stations $65_1$–$65_N$ give a priority to the radio zone having a greater order of priority, in selecting a wait zone. The threshold level of the electric field intensity that serves as a criteria associated with each radio zone for selection of the wait zone can be dynamically (or statically) set under the control of the radio base station.

Accordingly, the geographical distribution (number) of the mobile stations set up for a wait in the radio zones $62_1$ and $62_2$, the microcell 63 and the picocell 64 can be properly established. Also, the hierarchy of radio zones can be properly established. As in the embodiment that corresponds to the invention described in claim 2, the mobile stations $65_1$–$65_N$ can give a priority to the microcell 63 over the radio zone $62_1$ and give a priority to the picocell 64 over the microcell 63, in selecting a wait zone.

While the embodiment described above is constructed such that the series of information $(P_1, C_1, L_{th1}$ and $l_{th1}) \ldots (P_4, C_4, L_{th4}$ and $l_{th4})$ is sorted according to the ascending order (the descending order) of the order of priority, so that the identification codes, the wait enabled levels and the wait disabled levels are retained in the register, the orders of priority may not be removed from the register and may be referred to in selecting a wait zone.

Figure 16:
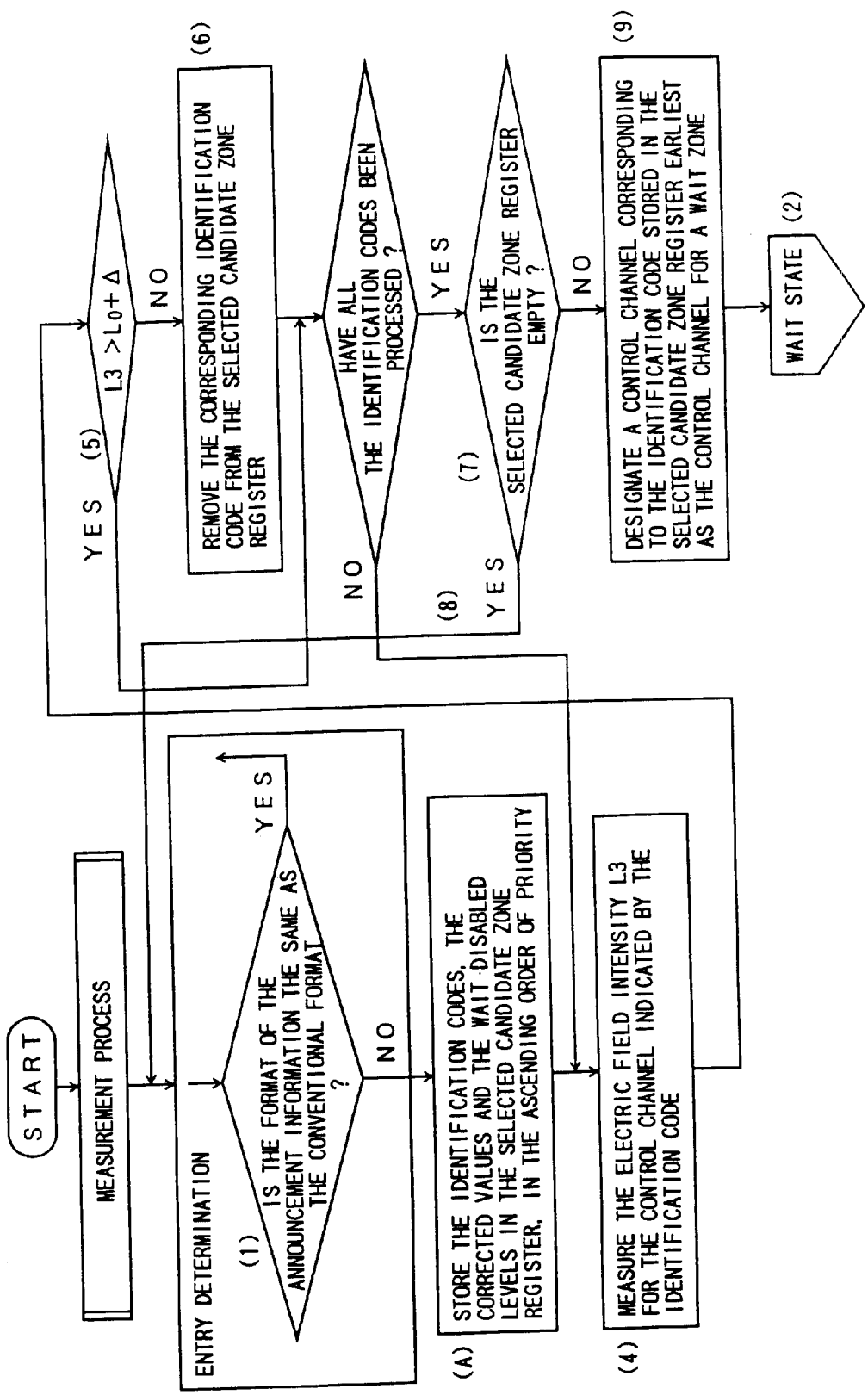
FIG. 16 is a flowchart of an operation according to an embodiment that corresponds to the invention described in claims 11, 12, 14 and 15.

FIG. 16 is a flowchart of an operation of a system according to an embodiment that corresponds to the invention described in claims 11, 12, 14 and 15.

A description will now be given, with reference to FIGS. 1 and 16, of an operation of a mobile communication system according to an embodiment that corresponds to the invention described in claims 11 and 12.

In the absence of overlap zones at respective locations in a radio zone formed by the radio base station $61_1$, the base station control device $69_1$ of the radio base station $61_1$ transmits the announcement information having the same format as that of the conventional announcement information as shown in FIG. 2, via the transmission and reception unit $68_1$, the common antenna equipment unit $67_1$ and the antenna $66_1$.

If there are overlap zones, the base station control device $69_1$ is provided by a control station (not shown) with an identification code $C_1$ for a control channel formed by the radio base station $61_1$, identification codes $C_3$ and $C_4$ for overlap control channels assigned to the microcell 63 and the picocell 64 embodying the overlap zones, orders of priority $P_1$, $P_3$ and $P_4$ indicating the hierarchical order of the radio zone $62_1$, the microcell 63 and the picocell 64, corrected values $\Delta_1$, $\Delta_2$ and $\Delta_3$ indicating the enabled levels in the form of relative levels with respect to a predetermined reference level $L_0$ and the wait disabled levels $l_{th1}$, $l_{th3}$ and $l_{th4}$, via the communication link $71_1$ and the transmission device $70_1$. For the sake of simplicity of the description, it is assumed that the radio zone $62_1$ has the order of priority $P_1=0$, the microcell 63 $P_3=1$ and the picocell 64 $P_4=2$.

Figure 17:
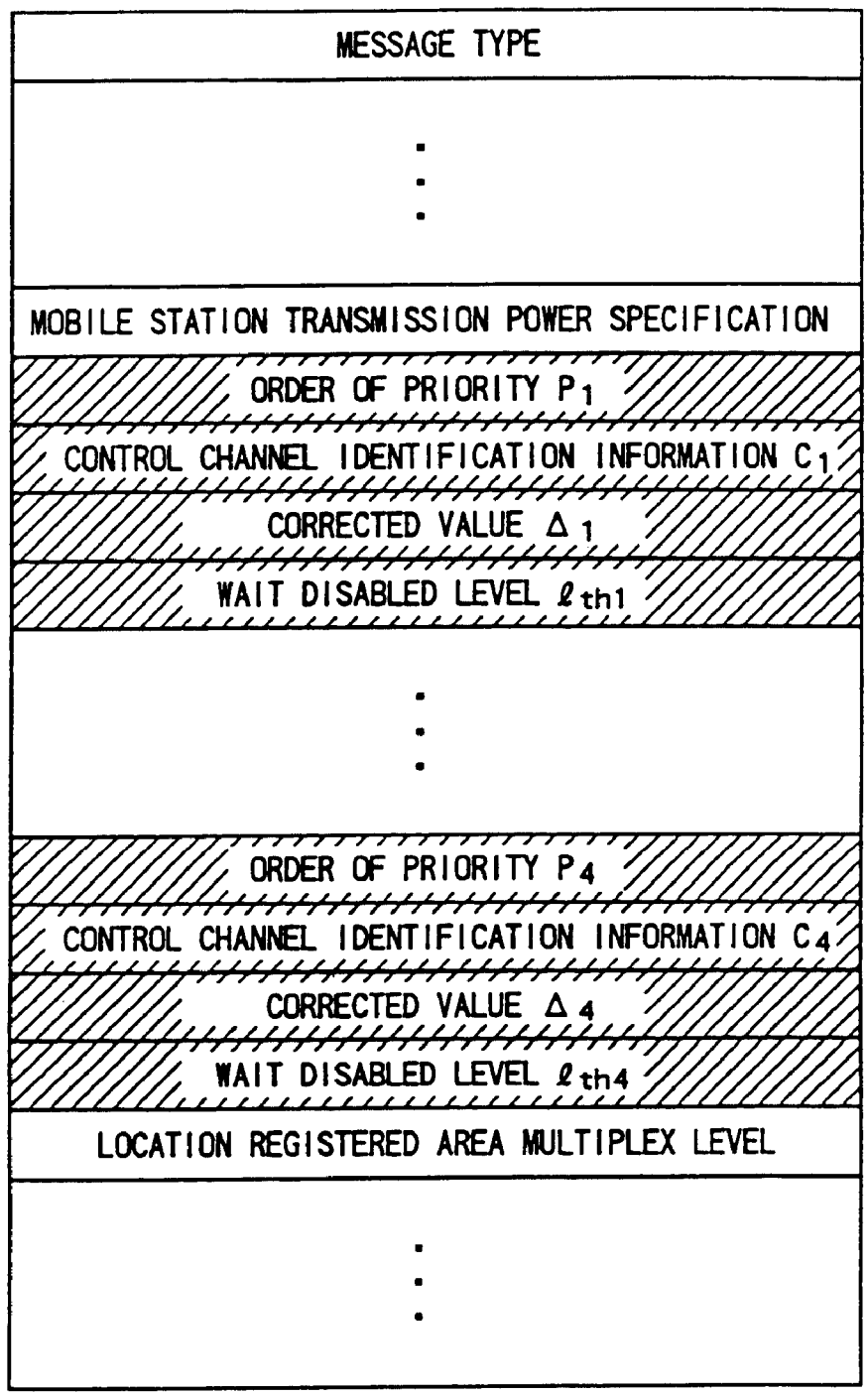
FIG. 17 shows announcement information according to an embodiment that corresponds to the invention described in claims 11 and 12.

As indicated by a hatched area in FIG. 17, the base station control device $69_1$ incorporates, in the announcement information, the identification codes $C_1$, $C_3$ and $C_4$, the orders of priority $P_1$, $P_3$ and $P_4$, the corrected values $\Delta_1$, $\Delta_2$ and $\Delta_3$ and the wait disabled levels $l_{th1}$, $l_{th3}$ and $l_{th4}$, resulting in series of identification information $(P_1, C_1, \Delta_1$ and $l_{th1}) \ldots (P_4, C_4, \Delta_4$ and $l_{th4})$ each corresponding to the radio zone.

The control unit $77_1$ of the mobile station $65_1$ effects the measurement process and the zone determination process as in the conventional system. In the zone determination process, a determination as to whether the format of the announcement information received via the control channel subject to the measurement of the electric field intensity $L_2$ is the same as the conventional format shown in FIG. 2 is made, depending on whether the above-described series of the identification information is included in the announcement information ((1) of FIG. 16). If the format of the announcement information is found to be the same as the conventional format, the control unit $77_1$ performs the zone determination process in accordance with the same procedure as observed in the conventional system before proceeding to a wait state ((2) of FIG. 16).

If the format of the announcement information is not found to be the same as the conventional format, the control unit $77_1$ stores the series of the identification information $(P_1, C_1, \Delta_1$ and $l_{th1}) \ldots (P_4, C_4, \Delta_4$ and $l_{th4})$ included in the announcement information in the selected candidate zone register. The control unit $77_1$ sorts the combinations of the orders of priority, the identification codes, the corrected values and the wait disabled levels stored in the selected candidate zone register, in the ascending order of priority. Once this sorting is done, all the orders of priority are removed from the register, resulting in the series of identification information consisted of the identification codes, the corrected values and the wait disabled levels being stored in the selected candidate zone register ((A) of FIG. 16).

The control unit $77_1$ sequentially refers to the identification codes $C_4$, $C_3$ and $C_1$, and corrected values $\Delta_1$, $\Delta_2$ and $\Delta_3$ arranged in the ascending order of priority so as to measure the electric field intensity $L_3$ of the overlap control channels and the control channel corresponding to the respective identification codes ((4) of FIG. 16). The control unit $77_1$ then compares the measured electric field intensity with a sum of the corrected value $\Delta$ for the measured channel and the reference value $L_0$ ((5) of FIG. 16).

When the result of the comparison is available, the control unit $77_1$ then enters a wait state in accordance with the same procedure observed in the embodiment that corresponds to the invention described in claim 4. The steps subsequent to (5) of FIG. 16 are designated by the same reference numerals (6)–(9) as the corresponding steps of FIG. 14, and the description thereof is omitted.

According to the embodiment described above, the corrected values smaller than the values of the wait enabled levels are included in the announcement information in place of the wait enabled levels. The mobile stations $65_1$–$65_N$ can give a priority to the radio zone having a greater order of priority, in selecting a wait zone.

Accordingly, the transmission efficiency of the control channel can be maintained at a high level. The geographical distribution (number) of the mobile stations set up for a wait in the radio zones $62_1$ and $62_2$, the microcell 63 and the picocell 64 can be properly established. Also, the hierarchy of radio zones can be properly established. The mobile stations $65_1$–$65_N$ can give a priority to the microcell 63 or the picocell 64 over the radio zone $62_1$, in selecting a wait zone.

While the embodiment described above is constructed such that the series of information $(P_1, C_1 \Delta_1$ and $l_{th1}) \ldots (P_4, C_4, \Delta_4$ and $l_{th4})$ is sorted according to the ascending order (the descending order) of the order of priority so that the identification codes, the corrected values and the wait disabled levels are retained in the register, the orders of priority may not be removed from the register and may be referred to in selecting a wait zone.

The embodiment described above is constructed such that the radio base station transmits the corrected values associated with all the microcells and picocells formed within the radio zone of that radio base station. Alternatively, for example, the radio base stations each forming the radio zone, the microcell or the picocell may transmit only the corrected value associated with its own radio zone. In such a case, the mobile station is expected to perform the determination step ((5) of FIG. 16) by acquiring the corrected value from the individual control channels subject to measurement of the electric field intensity.

Although no description is given of a process related to the wait disabled level in the embodiments that correspond to the invention described in claims 10–12, the wait disabled level may be employed as a criteria in a conventional determination for determining whether or not the mobile station should exit a wait state.

Previous to the determination process, the mobile station may remove, from the selected candidate zone register, wait disabled levels other than that of the control channel (or the overlap control channel) in which the mobile station is set up for a wait.

In the foregoing embodiments, comparison of the measured electric field intensity with the wait enabled level is conducted in the ascending order of priority assigned to the control channels that are specified by the identification codes stored in the candidate zone register or the selected candidate zone register, so that the control channel (or the overlap control channel) for which it is found that the measured electric field intensity exceeds the wait enabled level is selected as the control channel in which to wait. Alternatively, the electric field intensity of the control channels is first measured irrespective of the order of priority thereof, and then comparisons are made in the ascending order of priority.

Figure 18:
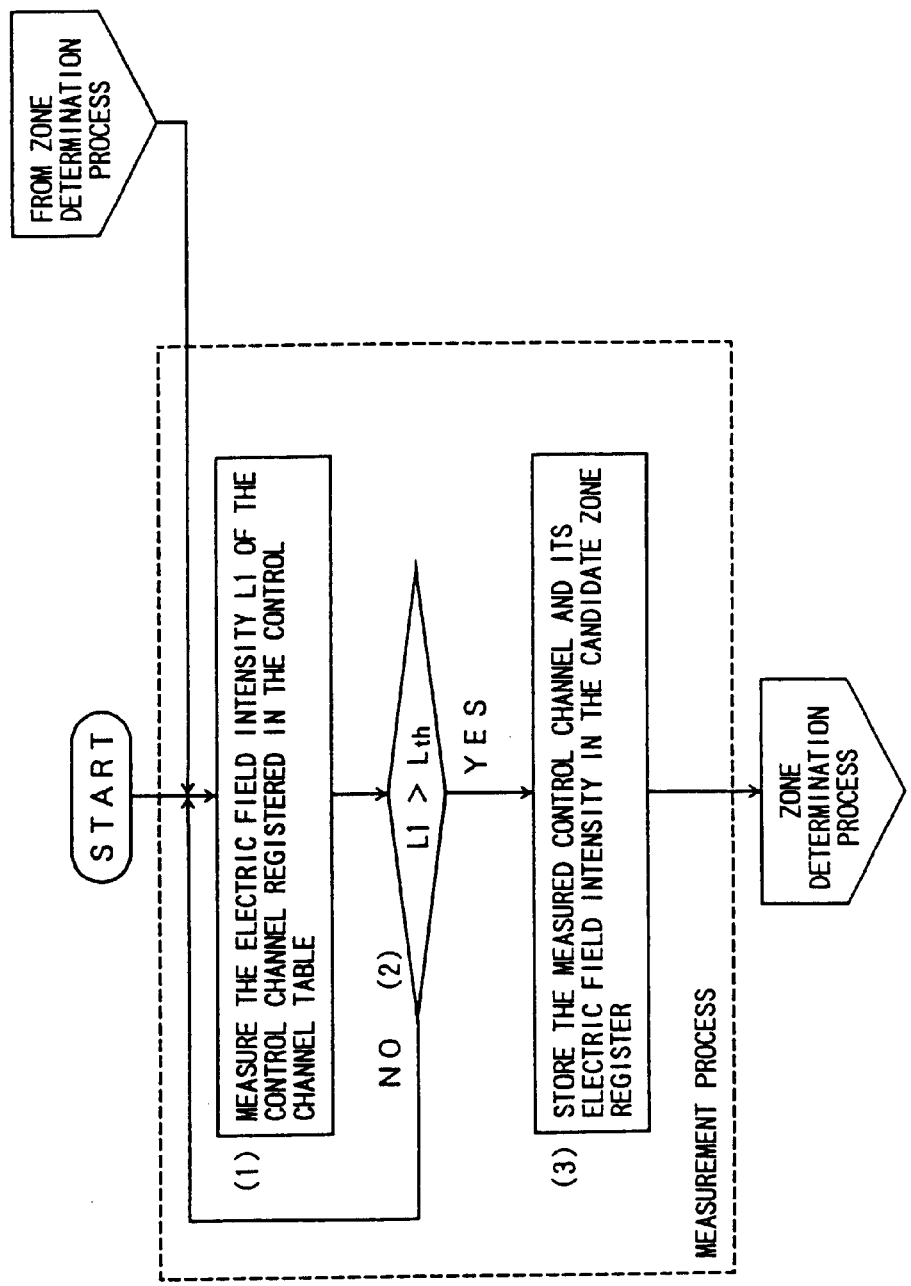
FIG. 18 is a flowchart of an operation according to an embodiment that corresponds to the invention described in claims 13–15.

FIG. 18 is a flowchart of an operation of a mobile communication system according to an embodiment that corresponds to the invention described in claims 13–15.

A description will now be given, with reference to FIGS. 1 and 17, of an operation of a mobile communication system according to an embodiment that corresponds to the invention described in claim 13.

The inventive feature of this system consists in the measuring process. The other processes including the zone entry process are the same as the corresponding processes in the embodiments described so far, and the description thereof is omitted.

Figure 3:
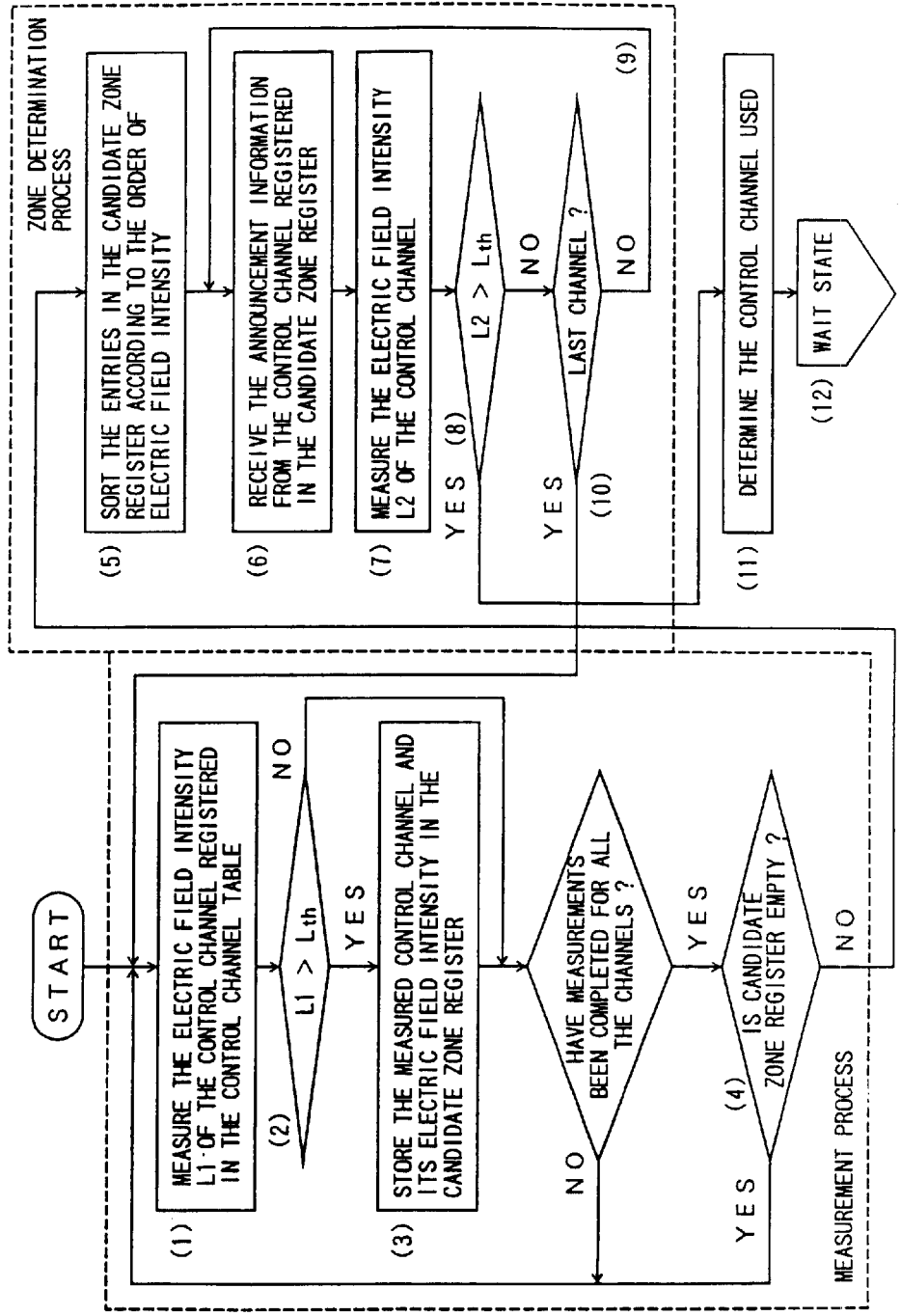
FIG. 3 is a flowchart of a conventional operation.
Figure 4:
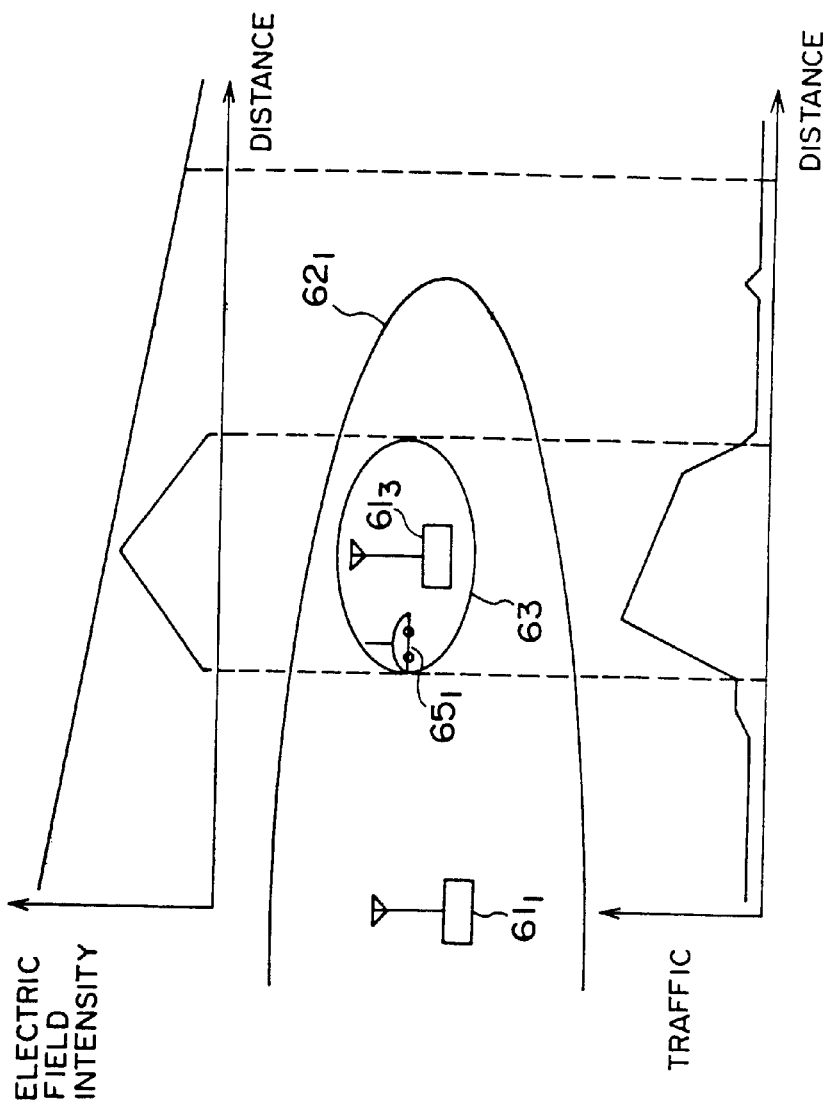
FIG. 4 illustrates a problem with the conventional mobile communication system.
Figure 5:
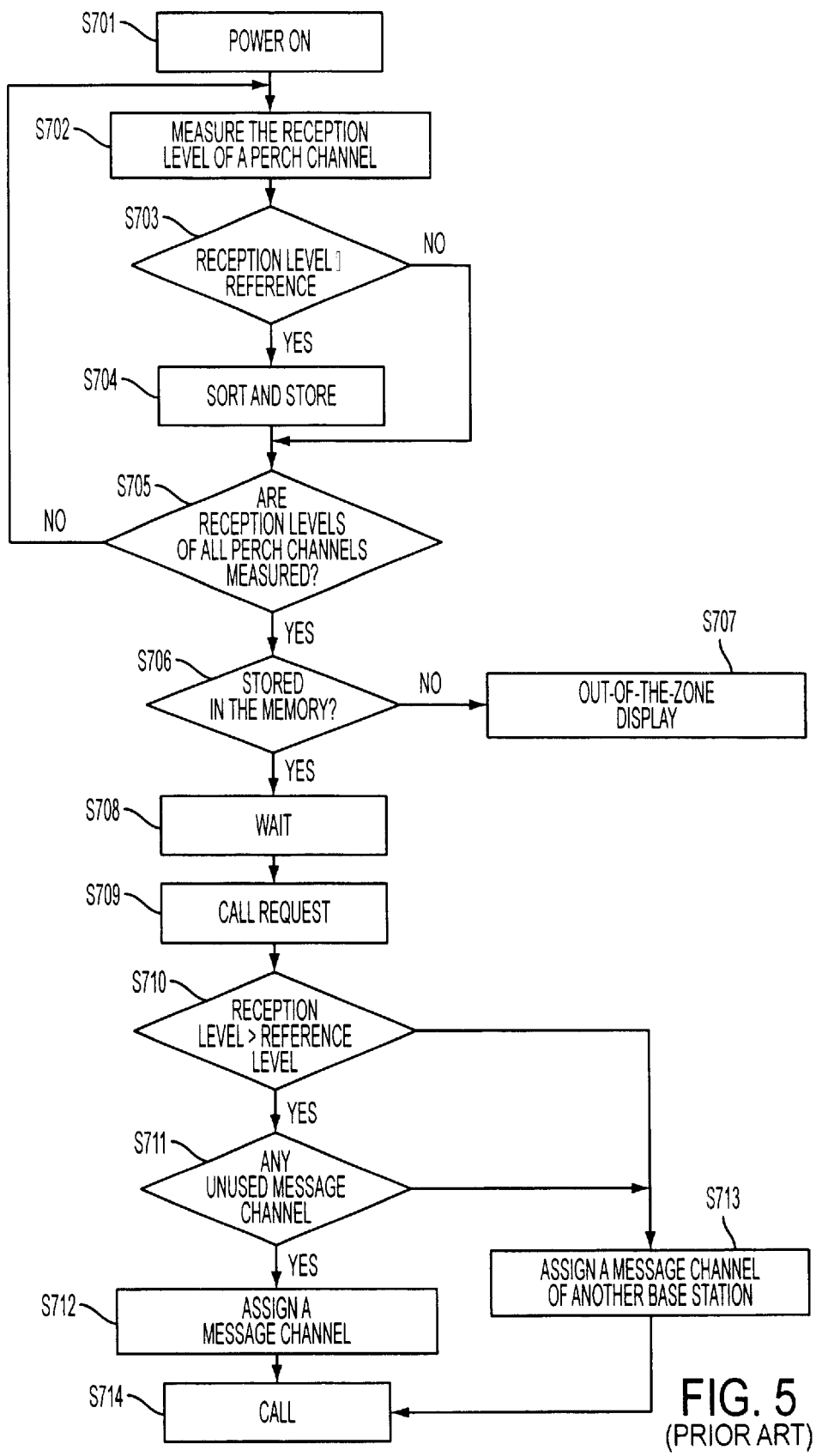
FIG. 5 is a flowchart showing the conventional call origination operation.

Those processes of FIG. 18 that are identical to the corresponding processes of FIG. 3 are designated by the same reference numerals, and the description thereof is omitted.

Upon a power-on, the control unit $77_1$ of the mobile station $65_1$ measures sequentially the electric field intensity $L_1$ of the control channels registered in the control table channel by controlling the transmission and reception unit $74_1$ ((1) of FIG. 18). A determination is then made as to whether or not the measured electric field intensity is greater than a predetermined threshold level $L_{th}$ ((2) of FIG. 18).

The control unit $77_1$ registers the control channels for which a determination that the measured electric field intensity is greater than the threshold level $L_{th}$ is obtained, in the candidate zone register, in relation to the electric field intensity ((3) of FIG. 18).

The control unit $77_1$ starts the zone entry determination process without measuring the electric field intensity of the other control channels registered in the control channel table.

In those steps of the zone entry determination process which steps are started when it is found that the format of the announcement information differs from the conventional format, all the control channels, specified by the identification information provided in the order of priority or provided coupled to information indicating the respective order of priority, are subject to the measurement of the electric field intensity and also to the comparison for determining whether or not the measured electric field intensity exceeds the wait enabled level.

According to the embodiment described above, the time required for the mobile station ($65_1$–$65_N$) to enter a wait state upon a power-on is reduced. Therefore, it is ensured that the service can be provided promptly upon a power-on or upon an exchange of a battery.

A description will now be given, with reference to FIGS. 1, 9, 11, 14, 16 and 18, of an operation of a mobile communication system according to an embodiment that corresponds to the invention described in claims 14 and 15.

The difference between this embodiment and the earlier embodiments consists in the measurement process and the zone determination process.

In the measurement process according to this embodiment, the control unit $77_1$ allows the previously measured electric field intensity for a given channel to be stored in the candidate zone register in relation to its electric field intensity.

In further accordance with this embodiment, when the control unit $77_1$ measures the electric field intensity $L_2$ or $L_3$ ((7) of FIG. 3, (4) of FIG. 9, (4) of FIG. 11, (4) of FIG. 14 and (4) of FIG. 16), a determination is made as to whether or not the control channel subject to the measurement is stored in the candidate zone register. If an affirmative answer is given in the determination, the measurement of that control channel is omitted. The electric field intensity already stored in the target zone register for that control channel is regarded as the electric field intensity $L_2$ or $L_3$.

According to the above-described embodiment, it is possible to reduce the total number of control channels to be subjected to the measurement of its electric field intensity before the mobile station enters a wait state. Therefore, the operating efficiency of the mobile station is increased and the quality of the service is improved.

As shown in FIGS. 9, 10, 13 and 15, according to the foregoing embodiments, a determination as to whether or not the electric field intensity exceeds the wait enabled level is made for the control channels that correspond to all the identification codes stored in the selected candidate zone register. An alternative approach indicated by the chain lines in FIGS. 9, 10, 13 and 15 is that upon a determination that the electric field intensity of any channel (radio zone) exceeds the wait enabled level, the mobile station immediately is set up for a wait in that control channel (radio zone) so that the mobile station can receive the communication service.

While the identification information for overlapping zones adjacent to the radio zone formed by a given radio base station is not transmitted by the given radio base station, according to the foregoing embodiments, the identification information for the adjacent zones may be transmitted as long as the relative orders of priority of the adjacent radio zones with respect to the radio zone formed by the given radio base station are recognized properly by the mobile station.

In the foregoing embodiments, various information is arranged in the announcement information in the ascending order of priority, the announcement information is not limited to such a construction. For example, the various information may be arranged in the descending order or in a predetermined format corresponding to the order of priority.

Also, in the foregoing embodiments, the announcement information includes the channel numbers of the control radio channels assigned to the respective radio zones (radio base stations) and used to transmit the announcement information. However, the channel numbers may be replaced by a radio frequency in case the radio channel is formed by a single radio frequency as in the case of an analog mobile communication system, instead of being constituted according to a time division system such as the TDMA system.

Further, in the foregoing embodiments, digital transmission of the announcement information is effected by utilizing a spare field not reserved under a given frame format, the present invention is not limited to such a construction. For example, if the size of the spare field is not satisfactorily large, the announcement information may be transmitted in multiframes. The announcement information may be transmitted in a plurality of frames, either frame by frame or in dividends thereof, as long as the mobile station can properly receive the announcement information.

While the foregoing embodiments are constructed such that the announcement information is transmitted via the control radio channel, the present invention can be applied to various systems irrespective of the radio channel setting control method and the radio transmission method.

Figure 20:
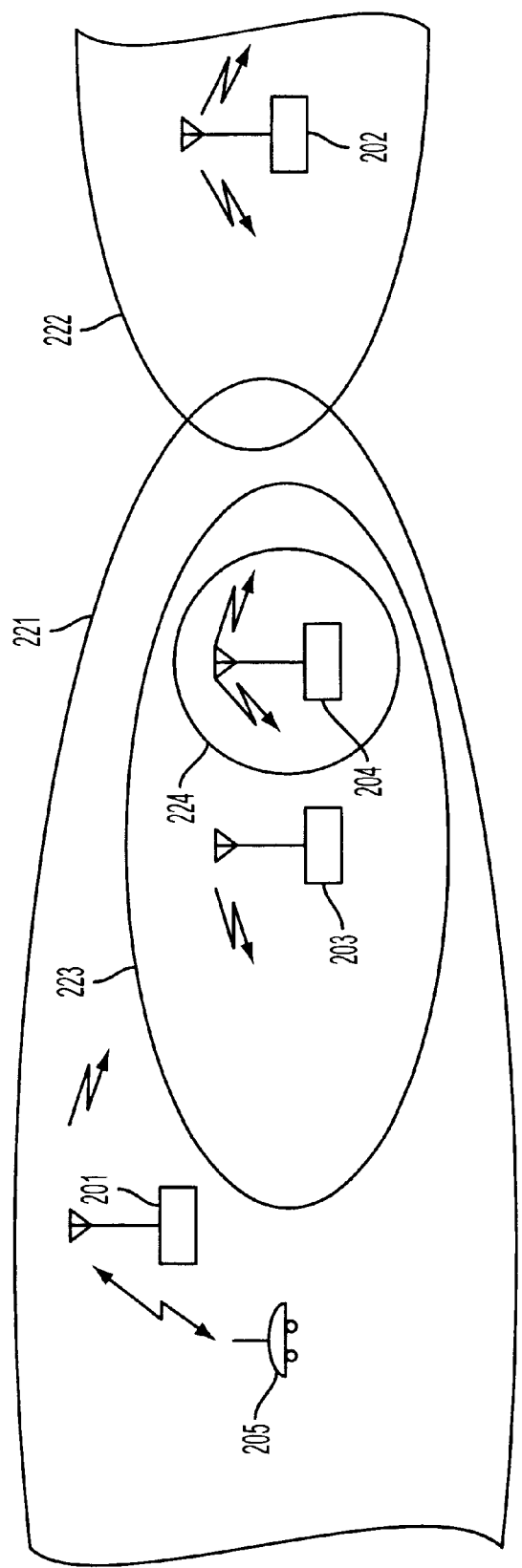
FIG. 20 shows a mobile communication system to which the present invention is applied.

Reference is made to FIG. 20 and a description will now be given of embodiments of the invention directed to resolving the second aspect of the problem with the conventional mobile communication system. According to the invention described below, each of a plurality of base stations forming overlapping zones and constituting a mobile communication system is assigned an order of priority. A mobile station requests a message channel from the base station having a relatively high order of priority so that a call using that base station is enabled.

Referring to FIG. 20, a zone 221 formed by a base station 201 and a zone 222 formed by a base station 202 are adjacent to each other. In the zone 221 are provided a base station 203 having a smaller transmission power than the base station 201 and forming a zone 223 and a base station 204 having a smaller transmission power than the base station 203 and forming a zone 224 smaller than the zone 223. A mobile station 205 is movable in an area comprising the zone 221, the zone 222, the zone 223 and the zone 224.

Figure 32:
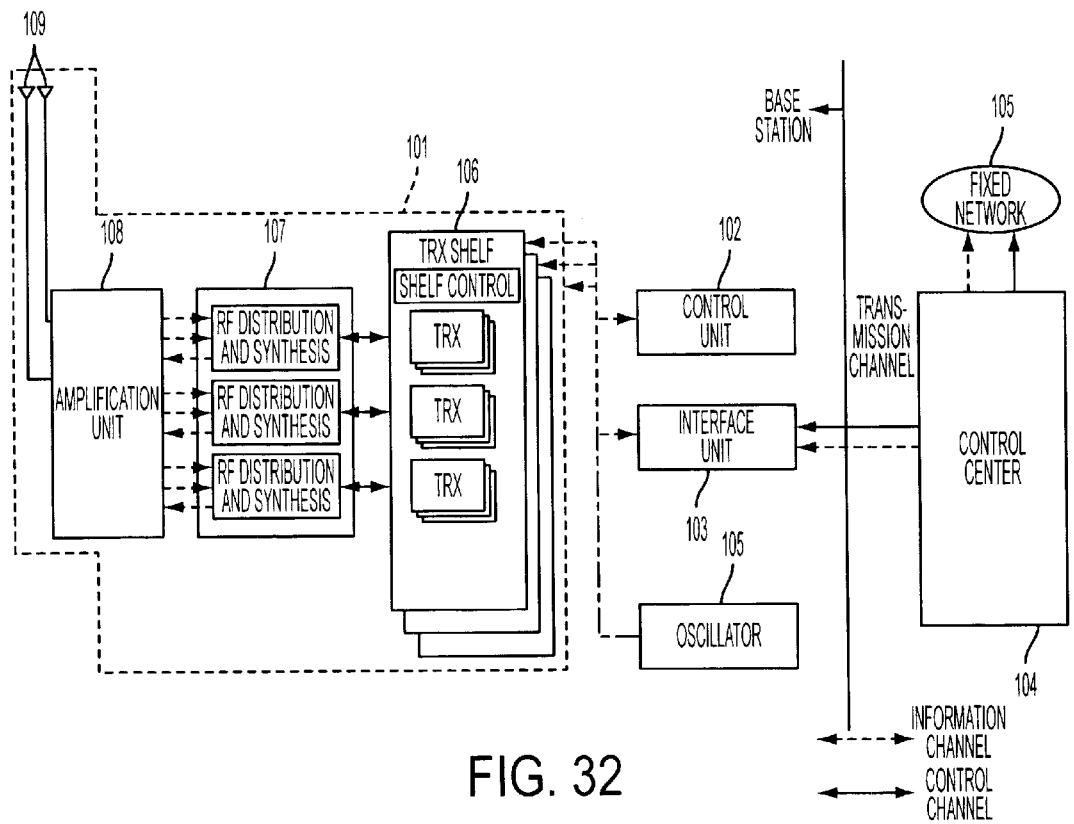
FIG. 32 shows a hardware construction of a base station assumed in the present invention.
Figure 33:
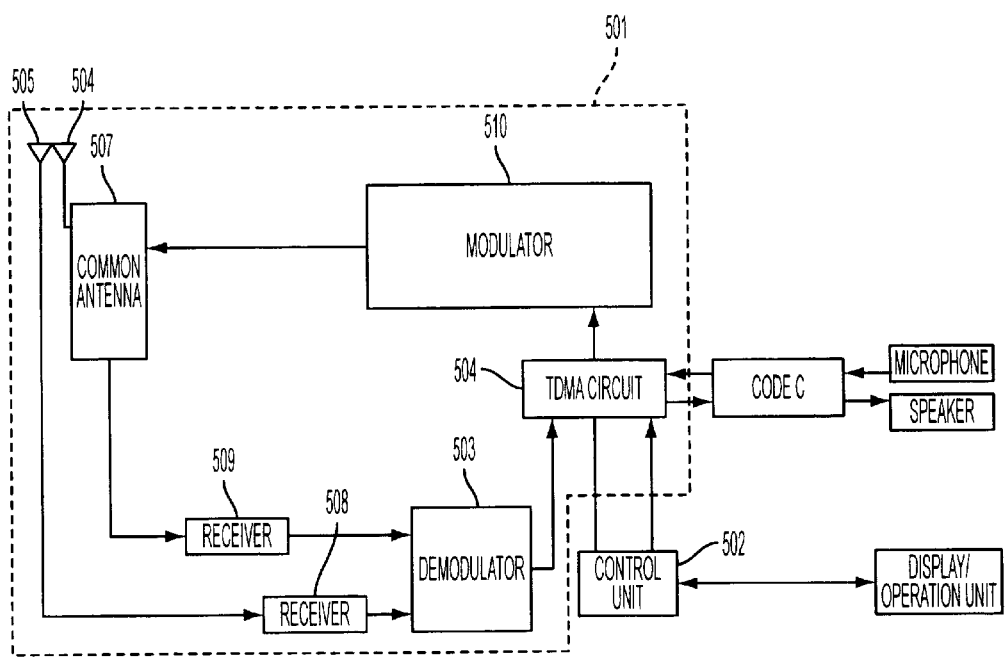
FIG. 33 shows a hardware construction of a mobile station assumed in present invention.

FIG. 32 shows a hardware construction of a base station assumed in the following description, and FIG. 33 shows a hardware construction of a mobile station assumed in the following description.

Referring to FIG. 32, a transmission/reception unit 101 of a base station includes TRX shelves 106, an RF distribution/synthesis unit 107, an amplifier unit 108 and an antenna 108. A control unit 102 manages announcement information set up in the base station by a control center 104 via an interface unit 103. The control unit 102 transmits the announcement information to a transmitter/receiver (TRX) within the TRX shelf 106 at a timing provided by the oscillator 105. The transmitter/receiver which has received the announcement information transmits the announcement information to the mobile station via the RF distribution/synthesis unit 107, the amplifier unit 108 and the antenna 109.

A request for a message channel issued by the mobile station originating a call or receiving a call is received by the transmitter/receiver in the TRX shelf 106 via the antenna 109, the amplifier unit 108 and the RF distribution/synthesis unit 107. The information received by the transmitter/receiver is transmitted to the control center 104 under the control of the control unit 102 so that communication via the fixed network 105 is set up. By definition, a shelf is a box for storing the transmitter/receiver.

Figure 19:
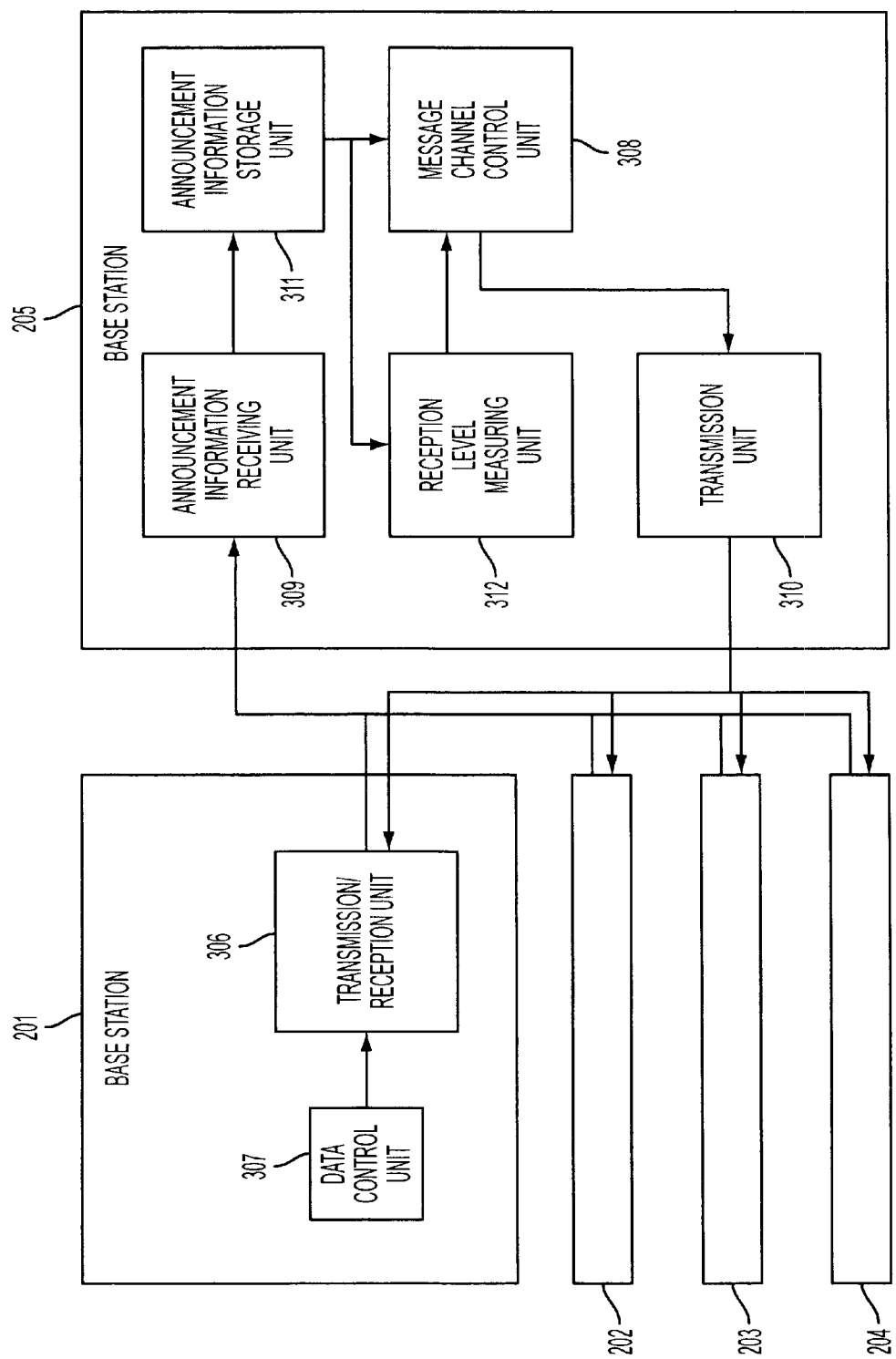
FIG. 19 shows a mobile communication system directed to resolving the problem with the conventional message channel assigning operation.

The transmission/reception unit 101 corresponds to a transmission/reception unit 306 shown in FIG. 19 illustrating the principle of the present invention directed to resolving the second aspect of the problem with the conventional mobile communication system. The control unit 102 corresponds to a data control unit 307 shown in FIG. 19. The description of the transmission/reception unit 306 and the data control unit 307 will be given later.

Referring to FIG. 33, a transmission/reception unit 501 of a mobile station includes a TDMA (time division multiple access) circuit 504, a modulator 510, a demodulator 503, receivers 508 and 509, a common antenna 507, and antennas 505 and 506. The announcement information from the base station is received by the receiver 508 via the antenna 505 or received by the receiver 509 via the antenna 506 and the common antenna 507. The signal demodulated by the demodulator 503 is processed by the TDMA circuit 504. The control unit 502 selects the base station from which the mobile station is to request a message channel, based on the order of priority of the base stations contained in the announcement information and based on the reception level in the perch channels provided for the respective base station.

A request for a message channel occurring when a call is originated or when a call is received is transmitted to the TDMA circuit 504 under the control of the control unit 502. The request is processed by the TDMA circuit 504 and then modulated by the modulator 510. The modulated request is transmitted to the target base station via the common antenna 507 and the antenna 506.

The transmission/reception unit 501 corresponds to an announcement information receiving unit 309 and a transmission unit 310 described later. The control unit 502 corresponds to a message channel control unit 308, an announcement information storage unit 311 and a reception level measuring unit 312 described later.

FIG. 19 illustrates the principle of the present invention directed to resolving the second aspect of the problem with the conventional mobile communication system. The base station 201 includes the data control unit 307 and the transmission/reception unit 306. The base station 201 transmits announcement information to mobile stations and assigns a message channel to a requesting mobile station.

The data control unit 307 manages and controls the order of priority assigned to the base station 201 and other base stations associated with the base stations 201. The data control unit 307 also controls assignment of a message channel responsive to a request for a message channel from a mobile station, so as to set up a call. A request for a message channel could occur when switching from one message channel to another occurs during a communication. A request for a message channel could also occur when a mobile station originates a call or receives a call. The transmission/reception unit 306 provides an interface for all the signals controlled by the data control unit 307. The base stations 202, 203 and 204 have the same construction and function the same way as the base station 201 so that the description thereof is omitted.

Referring again to FIG. 19, a mobile station 205 comprises the message channel control unit 308, the announcement information receiving unit 309, the transmission unit 310, the announcement information storage unit 311 and the reception level measuring unit 312.

The message channel control unit 308 operates to select a base station to which a request for a message channel is to be issued, based on the order of priority of the base stations included in the announcement information from the base station (one of the base stations 201, 202, 203 and 204), and based on the reception level in the perch channels provided for the respective base stations (the base stations 201, 202, 203 and 204). The announcement information receiving unit 309 operates to receive the announcement information from the base station. The transmission unit 310 operates to transmit a request for a message channel to the base station selected by the message channel control unit 308. The announcement information storage unit 311 stores the announcement information received by the announcement information receiving unit 309. The reception level measuring unit 312 reads the announcement information stored in the announcement information storage unit 311 when a request for a message channel is issued to the base station, and measures the reception level of the perch channels provided for the respective base stations in the descending order of priority such that the reception level in the perch channel having the highest priority is measured first. The reception level measuring unit 312 transmits the measured reception level to the message channel control unit 308.

Figure 21A:
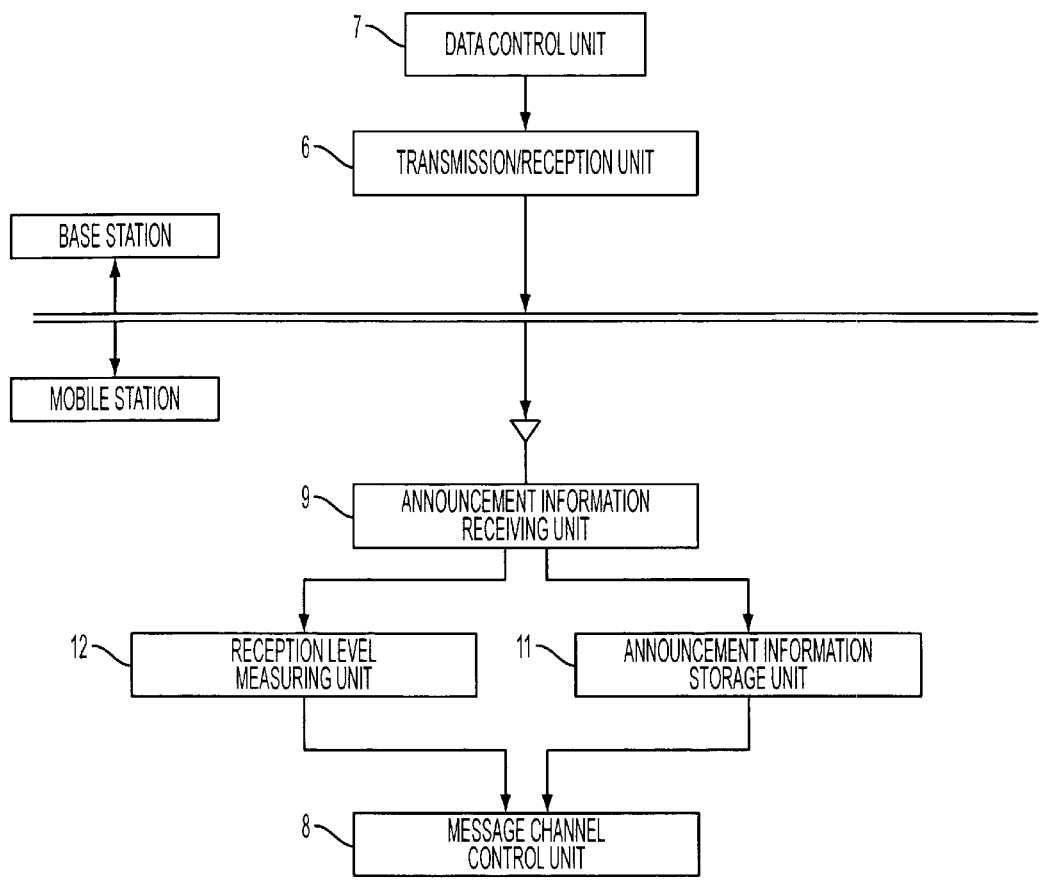
FIG. 21A shows how the announcement information is delivered.
Figure 21B:
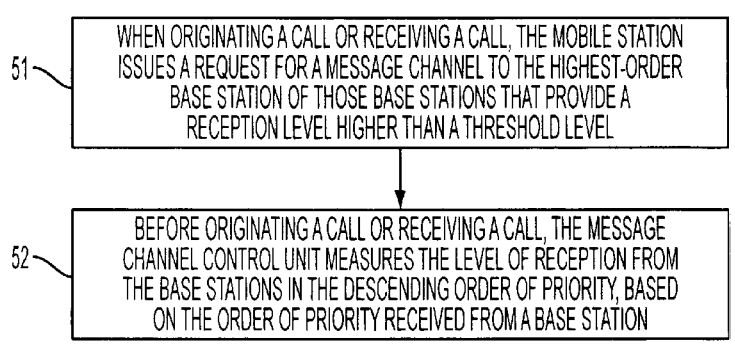
FIG. 21B shows the principle of the flow of the call origination operation according to the present invention.

FIGS. 21A and 21B illustrate the principle according to which a mobile station issues a request for a message channel to a base station in the mobile communication system of FIG. 19. FIG. 21A shows how the announcement information is delivered, and FIG. 21B shows the principle of the flow of the call origination operation according to the present invention.

An outline of the call request operation according to the present invention will now be given. It is assumed that the mobile station 205 is located in the service area formed by the base station 204 but is set up for a wait in the base station 201. When the mobile station 205 issues a call, the reception level measuring unit 312 of the mobile station 205 measures the reception level of the base stations 201, 202, 203 and 204 and determines that the announcement information is to be received from, for example, the base station 201 that provides the highest reception level. It is assumed that the reception levels measured by the reception level measuring unit 312 are such that the base station 201, the base station 202, the base station 203, the base station 204 and the base station 202 have increasingly lower reception levels in the stated order.

When the transmission/reception unit 306 of the base station 201 transmits the announcement information managed by the data control unit 307, the announcement information receiving unit 307 of the mobile station 205 stores the received announcement information in the announcement information storage unit 311. The announcement information transmitted by the base station could have the format as shown in FIG. 22, FIG. 23 or FIG. 24. The announcement information having the format of FIG. 22 includes the order of priority assigned to the base station transmitting the announcement information. The format shown in FIG. 23 is such that the perch channel codes corresponding to the base station which is the source of the announcement information and corresponding to the adjacent base stations are arranged in the descending order (or the ascending order) of the priority. The format shown in FIG. 24 is such that each of the perch channel codes corresponding to the source base stations and the adjacent base stations is coupled to the associated order of priority.

The reception level measuring unit 312 of the mobile station originating a call measures the reception level of the perch channels provided for the base stations, in the descending order of the priority based on order of priority specified in the announcement information from the base station (step S1). The reception level measuring unit 312 transmits the reception level to the message channel control unit 308. It is assumed that the order of priority is such that the base station 204, the base station 203, the base station 201 and the base station 202 have increasingly lower priorities in the stated order.

Once the reception level in the perch channel corresponding to the base station 204 is received, the message channel control unit 308 determines that a request for a message channel is to be issued to the base station 204 if the measured reception level is equal to or exceeds a predetermined threshold level. The message channel control unit 308 then issues a request for a message channel to the base station 204 via the transmission unit 310 (S2).

Figure 25:
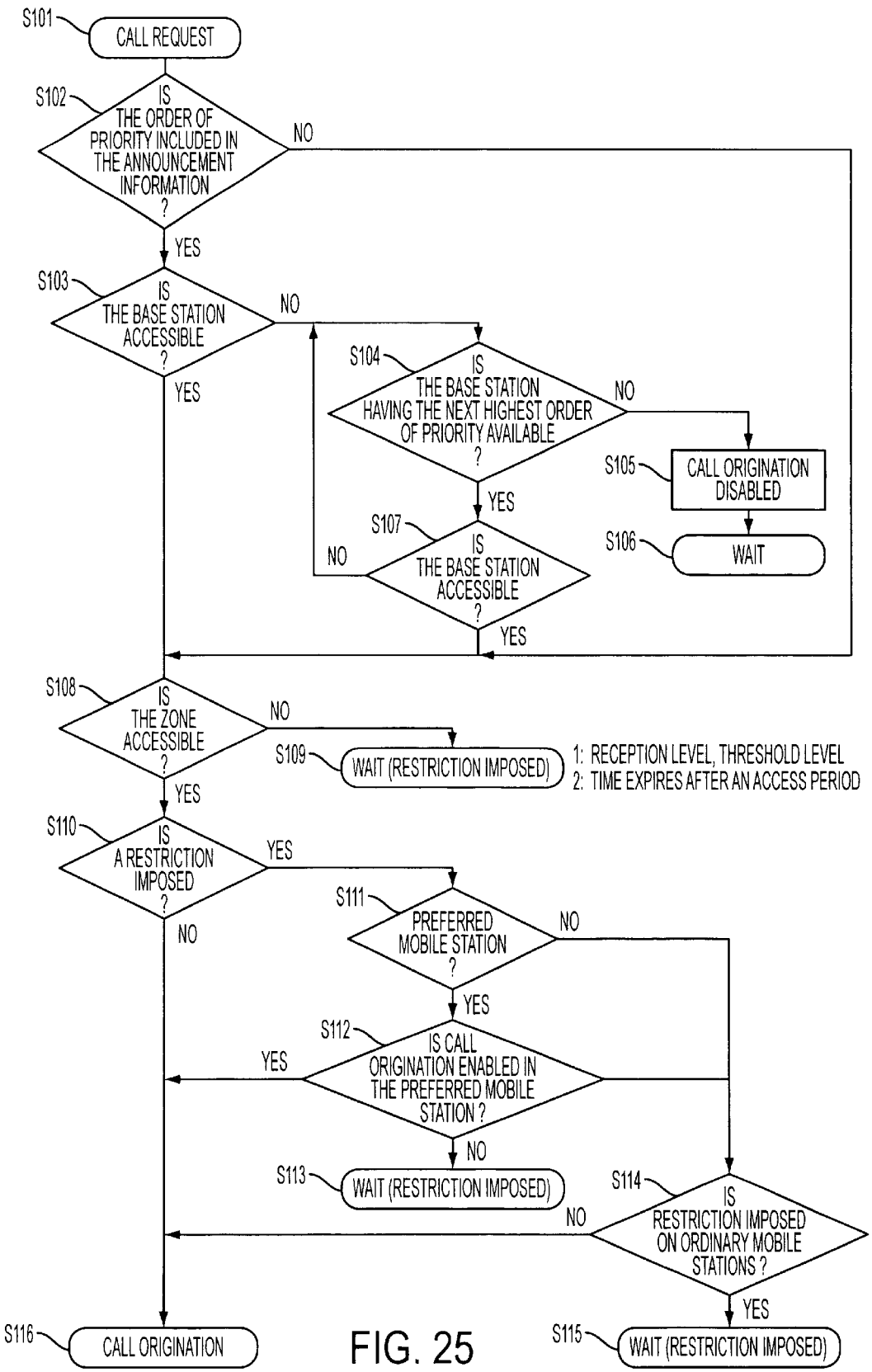
FIG. 25 is a flowchart showing the flow of the call origination operation according to the present invention.

A detailed description of call origination outlined above will now be given. FIG. 25 is a flowchart showing the flow of the call origination operation, and FIG. 26 shows a sequence of the call origination operation.

Figure 26:
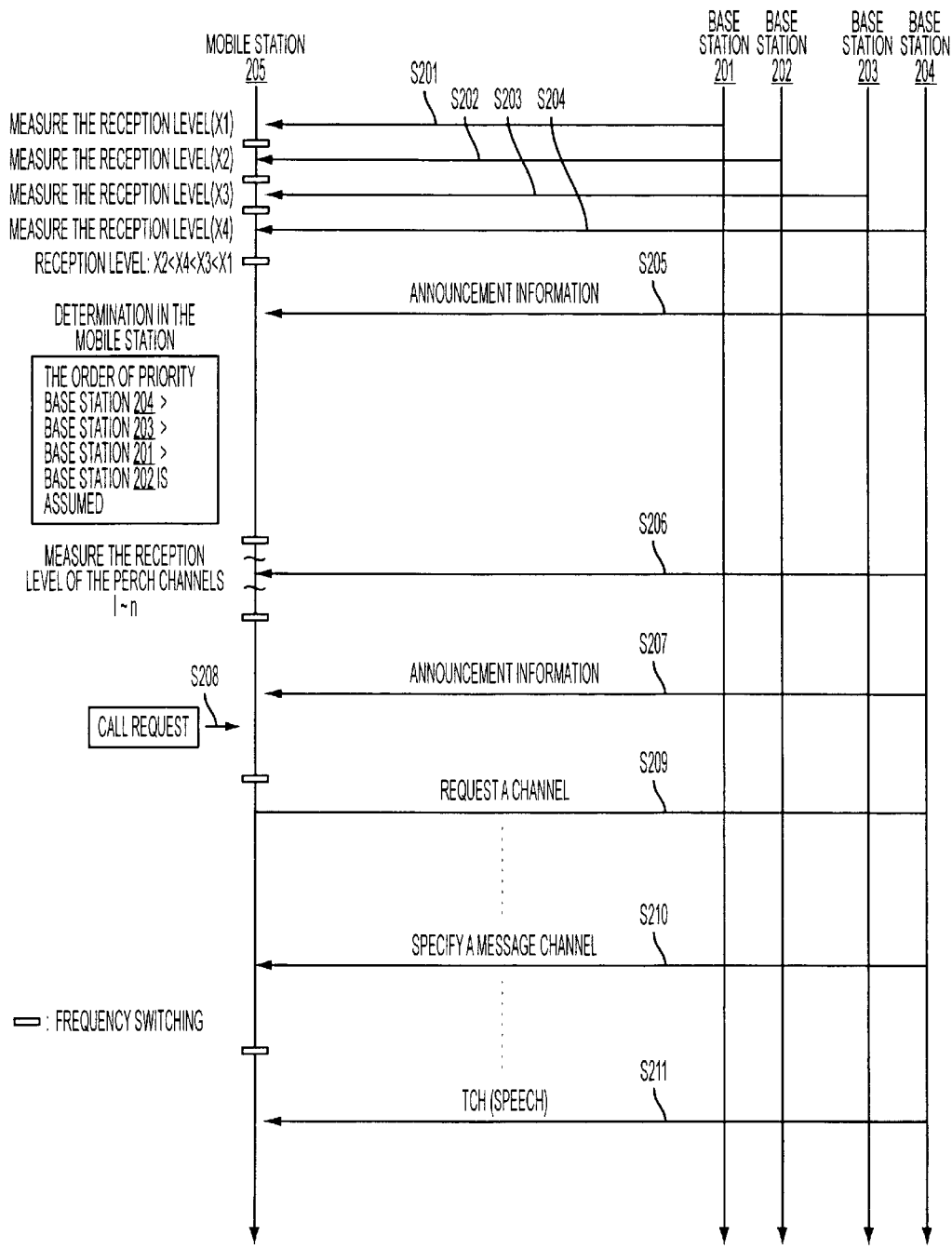
FIG. 26 shows a sequence of the call origination operation according to the present invention.

The reception level measuring unit 312 of the mobile station 205 measures the reception level provided by the base stations (the base stations 201, 202, 203 and 204) forming the respective zones (steps S201, S202, S203 and S204 of FIG. 26). It is assumed that the measured reception levels are such that the base station 202, the base station 204, the base station 203 and the base station 201 have increasingly higher reception levels in the stated order. Accordingly, the message channel control unit 308 determines that the announcement information is to be received from the base station 201.

Upon receipt of the announcement information from the base station 201 (S205), the announcement information receiving unit 309 of the mobile station 205 causes the announcement information to be stored in the announcement information storage unit 311. The announcement information could have the format as shown in FIG. 22, FIG. 23 or FIG. 24. The announcement information having the format of FIG. 22 includes the order of priority assigned to the base station transmitting the announcement information. When the mobile station 205 receives the announcement information having the format as shown in FIG. 22, the mobile station 205 needs to acquire the announcement information from the base stations other than the source base station (the base station 201) that transmitted the announcement information, in order to learn the order of priority assigned to the base stations adjacent to the source base station. The format shown in FIG. 23 is such that the perch channel codes corresponding to the source base station and the adjacent base stations are arranged in the descending order (or the ascending order) of the priority. The format shown in FIG. 24 is such that each of the perch channels codes corresponding to the source base stations and the adjacent base stations is coupled to the associated order of priority. It will now be assumed that the mobile station 205 has received the announcement information having the format of FIG. 23.

The message channel control unit 308 reads the announcement information from the announcement information storage unit 311 so as to learn the order of priority assigned to the base stations (the base stations 201, 202, 203 and 204) and a predetermined level of the reception level that enables a request for a message channel. It is assumed that the base station 202, the base station 201, the base station 203 and the base station 204 have the increasingly higher priorities. The reception level measuring unit 312 reads the announcement information from the announcement information storage unit 311 so as to retrieve the order of priority included in the announcement information to be assigned to the respective perch channels codes, each of the perch channel codes corresponding to the associated base station. The reception level measuring unit 312 then measures the reception level of the perch channel corresponding to the base station 204 having the highest priority (S206).

The reception level measuring unit 312 transmits the measured reception level to the message channel control unit 308. The message channel control unit 308 determines whether the level is equal to or exceeds a predetermined threshold level that enables a request for a message channel. If it is determined that level is equal to or exceeds the threshold level, the mobile station acquires the announcement information from the base station 204 (S207). If it is determined that the level is below the threshold level, the reception level measuring unit 312 measures the reception level of the perch channel corresponding to the base station 203 having the next highest order of priority (S206). The reception level measuring unit 312 repeats step S206 such that it successively measures the reception level of the perch channel provided for the respective base stations in the descending order of priority, until the base station that provides the reception level which is equal to or exceeds the threshold level is found, or until all the perch channels are subject to measurement.

When the user of the mobile station 205 performs an operation for originating a call (S208 in FIG. 26 and S101 in FIG. 25) after S207, the message channel control unit 308 determines whether the announcement information from the base station 204 contains the order of priority of the base stations (base stations 201, 202, 203 and 204) (S102).

When the announcement information contains the order of priority (YES in S102) of the base stations 201, 202, 203 and 204, the reception level measuring unit 312 reads the announcement information from the announcement information storage unit 311 so as to retrieve the order of priority assigned to the perch channels which are provided for the base stations 201, 202, 203 and 204. The reception level measuring unit 312 measures the reception level of the perch channel corresponding to the base station 204 having the highest priority. The order of priority stored in the announcement information storage unit 311 is such that the base station 202< the base station 201< the base station 203 < the base station 204.

The reception level measuring unit 312 transmits the reception level in the perch channel corresponding to the base station 204 to the message channel control unit 308. The message channel control unit 308 determines whether the reception level is equal to or exceeds a predetermined threshold level that enables a request for a message channel (S103). If the message channel control unit 308 determines that the reception level is equal to exceeds the threshold level (YES in S103), the message channel control unit 308 retrieves restriction information from the announcement information transmitted from the base station 204 and stored in the announcement information storage unit 311. The message channel control unit 308 determines whether it is possible to originate a call in a zone 224 (see FIG. 20).

If the message channel control unit 308 determines in step S103 that the reception level is below the threshold level (NO in S103), the reception level measuring unit 312 determines whether a perch channel corresponding to the base station having the next highest priority is available (S104). If no perch channel corresponding to the base station having the next highest priority is available (No in S104), it is determined that the mobile station 205 cannot originate a call (S105) and is put in a wait state (S106). If a perch channel corresponding to the base station having the next highest priority is available (YES in S104), the reception level measuring unit 312 repeats steps S104 and S107 such that it successively measures (NO in S107) the reception level in the perch channels in the descending order of priority until the base station providing a reception level which is equal to or exceeds the threshold level is found (YES in S107) or until all the perch channels have been subject to measurement (NO in S104). If the message channel control unit 308 finds a base station that provides a reception level which is equal to or exceeds the threshold level (YES in S107), the message channel control unit 308 retrieves the restriction information from the announcement information stored in the announcement information storage unit 311 so as to determine if it is possible to originate a call in the zone formed by the base station found in S107 (S108). If it is determined that the order of priority of the base stations is not included in the announcement information (NO in S102), the message channel control unit 308 retrieves the restriction information from the announcement information stored in the announcement information storage unit 311 and determines whether it is possible to originate a call in the zone formed by the base station which is the source of the stored announcement information (S108).

If it is determined that call origination is disabled in the zone 224 formed by the base station 204 (NO in S108), the mobile station 205 is put in a wait state (S109). If call origination is enabled (YES in S108), the message channel control unit 308 retrieves the restriction information from the announcement information stored in the announcement information storage unit 311 so as to determine whether a restriction regarding a preferred mobile station is imposed on the zone 224 formed by the base station 204 (S110). A preferred mobile station is a station which is given a precedence in message channel assignment.

If it is determined that a restriction regarding a preferred mobile station is imposed (YES in S110) and if the mobile station 205 is a preferred mobile station (YES in S111), the message channel control unit 308 determines whether call origination in the mobile station 205 is enabled (S112). If it is determined that call origination is enabled (YES in S112), the message channel control unit 308 determines that a request for a message channel is to be issued to the base station 204 and causes the transmission unit 310 to transmit a request for a message channel (S209). If it is determined that call origination is disabled (NO in S112), the mobile station 205 is put in a wait state (S113).

If a restriction regarding a preferred mobile station is imposed (YES in S110) and if the mobile station 205 is not a preferred mobile station (NO in S111), the message channel control unit 308 determines whether a restriction is imposed on the mobile station 205 (S114). If there is no restriction (NO in S114), the message channel control unit 308 determines that a request for a message channel is to be issued to the base station 204 and causes the transmission unit 310 to transmit a request for a message channel to the base station 204 (S209). If there is a restriction (YES in S114), the mobile station 205 is put in a wait state (S115).

If it is determined that no restriction regarding a preferred mobile station is imposed (NO in S110), the message channel control unit 308 determines that a request for a message channel is to be issued to the base station 204 and causes the transmission unit 310 to transmit a request for a message channel (S209).

When an unused message channel is available in the base station 204 receiving the request for a message channel, the base station 204 assigns a message channel to the mobile station 205 and transmits a channel assignment signal to the mobile station (S210). When there is no message channel available, the base station 204 notifies the mobile station 205 that there is no message channel available, thus putting the mobile station in a wait state.

The mobile station 205 that has received the channel assignment signal originates a call to another mobile station (S116) and establishes the assigned message channel with the base station 204 so as to start a call.

Figure 27:
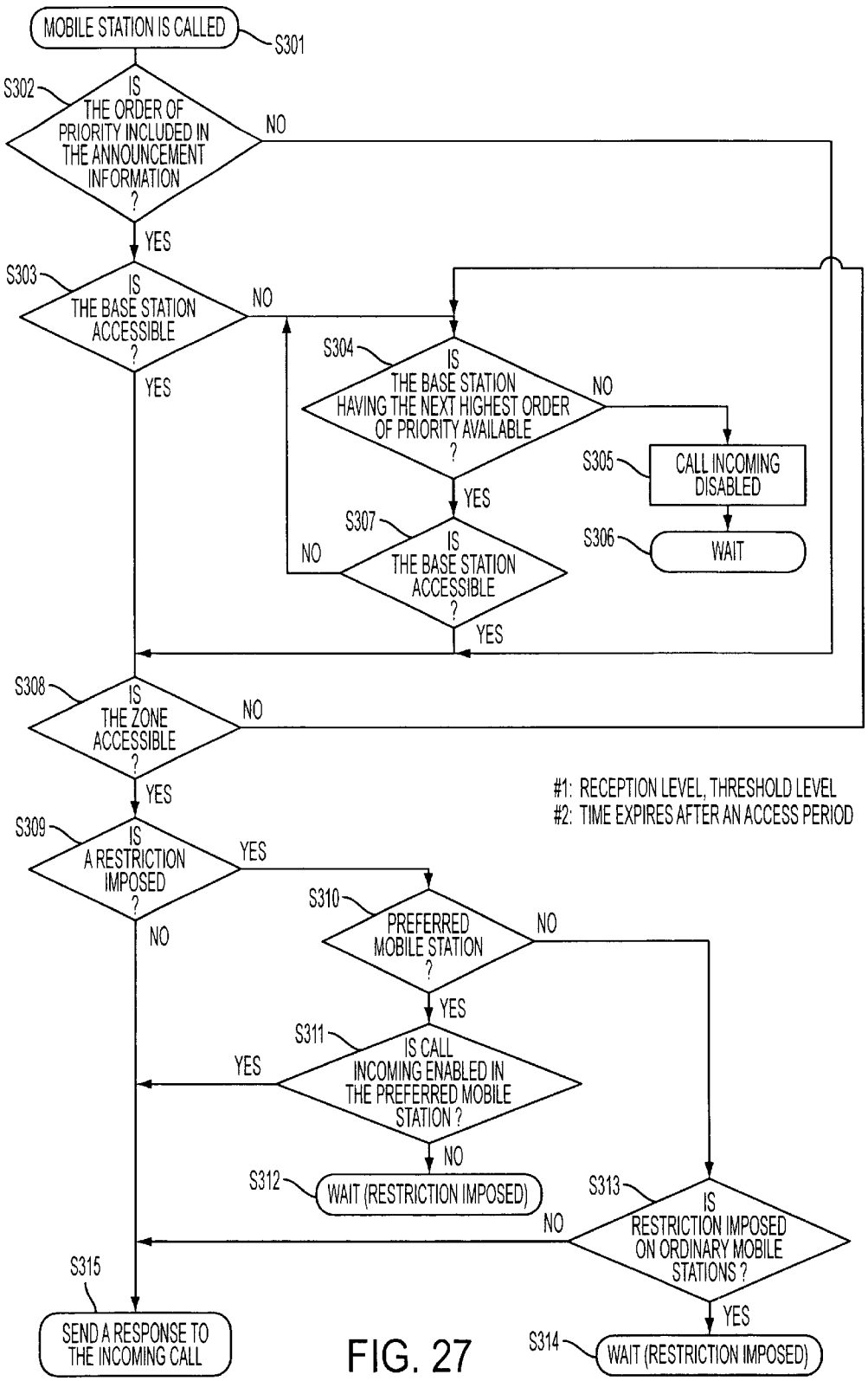
FIG. 27 shows the flow of the call-incoming operation according to the present invention.

Referring to FIG. 20, a detailed description will now be given of how a call incoming to the mobile station 205 located in the service area formed by the base station 203 and set up for a wait in the base station 201 is processed according to the mobile communication system of the present invention. Reference is also made to FIG. 27, which shows the flow of the call-incoming operation according to the present invention, and FIG. 28, which shows the sequence of the call-incoming operation.

Figure 28:
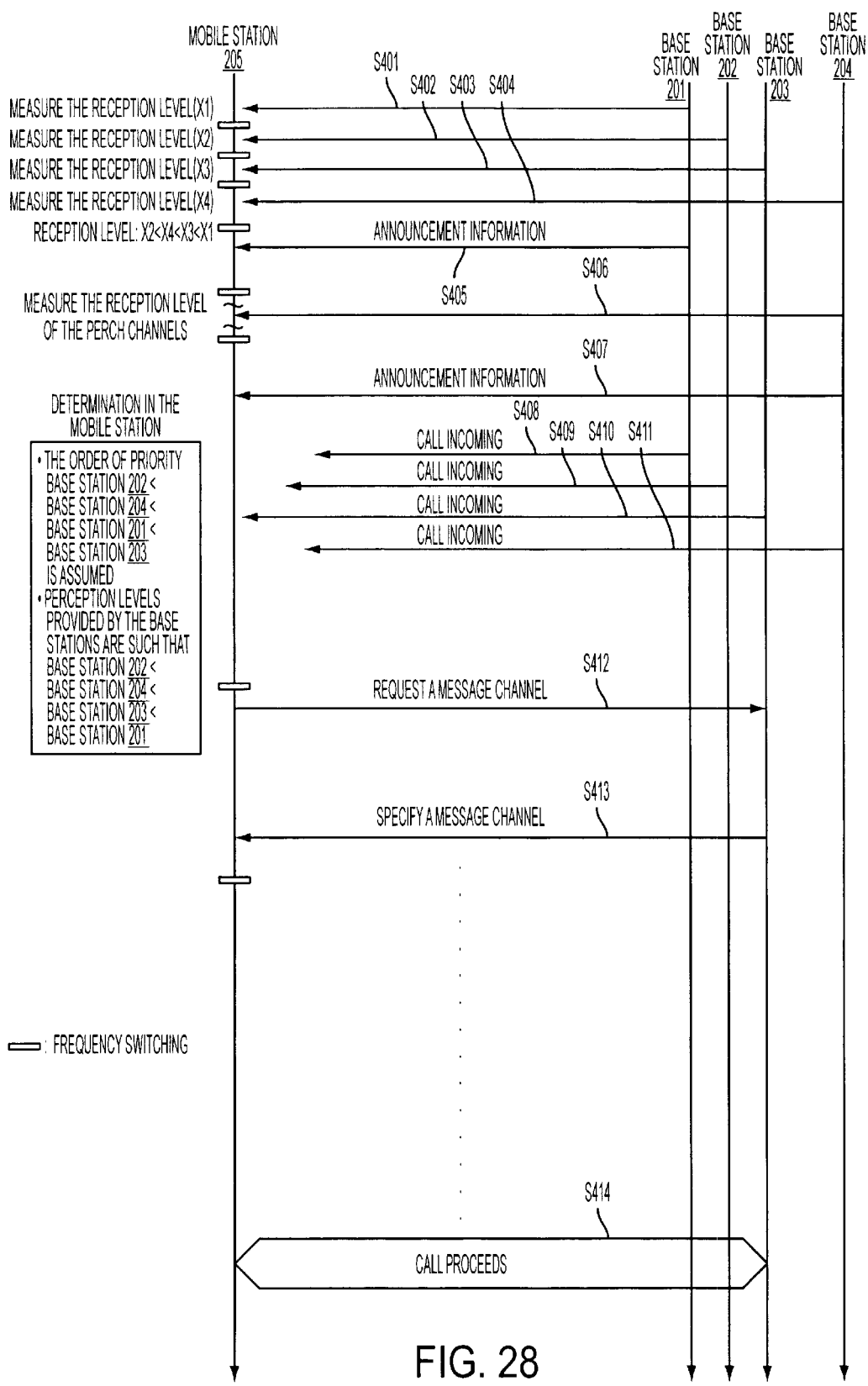
FIG. 28 shows the sequence of the call-incoming operation according to the present invention.

The reception level measuring unit 312 of the mobile station 205 measures the reception level provided by the base stations 201, 202, 203 and 204 forming the respective zones (steps S401, S402, S403 and S404 in FIG. 28). It is assumed that the reception levels provided by the base stations 201, 202, 203 and 204 are such that the base station 202< the base station 204< the base station 203< the base station 201, so that the message channel control unit 308 determines that the announcement information is to be received from the base station 201 providing the highest reception level.

The mobile station 205 has received the announcement information from the base station 201 (S405), the announcement information receiving unit 309 causes the announcement information to be stored in the announcement information storage unit 311. The announcement information could have the format as shown in FIG. 22, FIG. 23 or FIG. 24. The announcement information having the format of FIG. 22 includes the order of priority assigned to the base station transmitting the announcement information. When the mobile station 205 receives the announcement information having the format as shown in FIG. 22, the mobile station 205 needs to acquire the announcement information from the base stations other than the source base station (the base station 201) that transmitted the announcement information, in order to learn the order of priority assigned to the base stations adjacent to the source base station. The format shown in FIG. 23 is such that the perch channel codes corresponding to the source base station and the adjacent base stations are arranged in the descending order (or the ascending order) of the priority. The format shown in FIG. 24 is such that each of the perch channels code corresponding to the source base stations and the adjacent base stations is coupled to the associated order of priority. It will now be assumed that the mobile station 205 has received the announcement information having the format of FIG. 23.

The message channel control unit 308 reads the announcement information from the announcement information storage unit 311 so as to learn the order of priority assigned to the base stations (the base stations 201, 202, 203 and 204) and a predetermined level of the reception level that enables a request for a message channel. It is assumed that the base station 202, the base station 204, the base station 201 and the base station 203 have the increasingly higher priorities. The reception level measuring unit 312 reads the announcement information from the announcement information storage unit 311 so as to retrieve the order of priority included in the announcement information to be assigned to the respective perch channels codes, each of the perch channel codes corresponding to the associated base station. The reception level measuring unit 312 then measures the reception level of the perch channel corresponding to the base station 203 having the highest priority (S406).

The reception level measuring unit 312 transmits the measured reception level to the message channel control unit 308. The message channel control unit 308 then determines whether the level is equal to or exceeds a predetermined threshold level that enables a request for a message channel. If the message channel control unit 308 determines that the level is equal to or exceeds the threshold level, the mobile station 205 acquires the announcement information from the base station 203 (S407). The message channel control unit 308 obtains the order of priority of the base stations 201, 202, 203 and 204 from the announcement information from the base station 203. If the message channel control unit 308 determines that the level is below the threshold level, the reception level measuring unit 312 measures the reception level of the perch channel corresponding to the base station 204 given the next highest priority (S406). The reception level measuring unit 312 repeats step S406 such that it successively measures the reception level in the perch channels in the descending order of priority until the base station providing a reception level which is equal to or exceeds the threshold level is found or until all the perch channels have been subject to measurement.

When there is an incoming call in the mobile station 205 after S407 (S408, S409, S410, S411) (S301 in FIG. 27), and when the order of priority of the base stations 201, 202, 203 and 204 is included in the announcement information (YES in S302), the reception level measuring unit 312 reads the announcement information from the announcement information storage unit 311 so as to retrieve the order of priority of the base stations 201, 202, 203 and 204, the order of priority being indicated by information assigned to each of the perch channels corresponding to the respective base stations 201, 202, 203 and 204; The reception level measuring unit 312 measures the reception level of the perch channel corresponding to the base station 203 having the highest priority. The order of priority stored in the announcement information storage unit 312 is such that the base station 201< the base station 204< the base station 201< the base station 203.

The reception level measuring unit 312 transmits the reception level of the perch channel corresponding to the base station 203 to the message channel control unit 308. The message channel control unit 308 determines whether the reception level is equal to or exceeds a predetermined threshold level that enables a request for a message channel (S303). If the message channel control unit 308 determines that the reception level is equal to or exceeds the threshold level (YES in S303), the message channel control unit 308 retrieves restriction information from the announcement information transmitted from the base station 203 and stored in the announcement information storage unit 311 so as to determine whether call incoming is enabled in the zone 223 formed by the base station 203 (S308).

If the message channel control unit 308 determines in S303 that the reception level is below the threshold level (NO in S303), the reception level measuring unit 312 determines whether the base station having the next highest priority is available (S304). If no perch channel corresponding to the base station having the next highest priority is available (NO in S304), call incoming in the mobile station 205 is disabled (S305) so that the mobile station 205 is put in a wait state (S306). If the perch channel corresponding to the base station having the next highest priority is available (YES in S304), the reception level measuring unit 312 repeats steps S304 and S307 such that it successively measures (NO in S307) the reception level in the perch channels in the descending order of priority until the base station providing a reception level which is equal to or exceeds the threshold level is found (YES in S307) or until all the perch channels have been subject to measurement (NO in S304). If the message channel control unit 308 finds a base station that provides a reception level which is equal to or exceeds the threshold level (YES in S307), the message channel control unit 308 retrieves the restriction information from the announcement information stored in the announcement information storage unit 311 so as to determine if call incoming is enabled in the zone formed by the base station found in S307 (S308). If it is determined in S302 that the order of priority of the base stations is not included in the announcement information (NO in S302), the message channel control unit 308 retrieves the restriction information from the announcement information stored in the announcement information storage unit 311 and determines whether call incoming is enabled in the zone formed by the base station which is the source of the stored announcement information (S308).

If it is determined that call incoming is disabled in the zone 223 formed by the base station 203 (NO in S303), the reception level measuring unit 312 determines whether the perch channel corresponding to the base station having the next highest priority is available (S304). If no perch channel corresponding to the base station having the next highest priority is available (NO in S304), call incoming in the mobile station 205 is disabled (S305) so that the mobile station 205 is put in a wait state (S306). If the perch channel corresponding to the base station having the next highest priority is available (YES in S304), the reception level measuring unit 312 repeats steps S304 and S307 such that it successively measures (NO in S307) the reception level in the perch channels in the descending order of priority until the base station providing a reception level which is equal to or exceeds the threshold level is found (YES in S307) or until all the perch channels have been subject to measurement (NO in S304). If the message channel control unit 308 finds a base station that provides a reception level which is equal to or exceeds the threshold level (YES in S307), the message channel control unit 308 retrieves the restriction information from the announcement information stored in the announcement information storage unit 311 so as to determine if call incoming is enabled in the zone formed by the base station found in S307 (S308).

If it is determined that call incoming is enabled in the zone 223 formed by the base station 203 (YES in S308), the message channel control unit 308 retrieves the restriction information from the announcement information transmitted from the base station 203 and stored in the announcement information storage unit 311 so as to determine whether a restriction regarding a preferred mobile station is imposed in the zone 223 formed by the base station 203 (S309).

If there is a restriction regarding a preferred mobile station (YES in S309) and if the mobile station 205 is a preferred mobile station (YES in S310), the message channel control unit 308 determines whether call incoming is enabled in the mobile station 205 (S311). If call incoming is enabled (YES in S311), the message channel control unit 308 determines that a request for a message channel is to be issued to the base station 203 and causes the transmission unit 310 to transmit a request for a message channel (S412). If call incoming is disabled (NO in S311), the mobile station 205 is put in a wait state (S312).

If there is a restriction regarding a preferred mobile station (YES in S309) and if the mobile station 205 is not a preferred mobile station (NO in S310), the message channel control unit 308 determines whether a restriction is imposed on the mobile station 205 (S313). If there is no restriction (NO in S313), the message channel control unit 308 determines that a request for a message channel is to be issued to the base station 203 and causes the transmission unit 310 to transmit a request for a message channel (S412). If there is a restriction (YES in S313), the mobile station 205 is put in a wait state (S314).

If it is determined that there is no restriction regarding a preferred mobile station (NO in S309), the message channel control unit 308 determines that a request for a message channel is to be issued to the base station 203 and causes the transmission unit 310 to transmit a request for a message channel (S412).

The base station 203 receiving the request assigns an unused message channel to the mobile station 205 and transmits a channel assignment signal thereto (S413). If no unused message channel is available, the mobile station 205 is put in a wait state.

The mobile station receiving the message channel assignment signal returns a response to an incoming call to the base station 203 (S309), establishes the assigned message channel with the base station 203 so as to start a call (S414).

Figure 29:
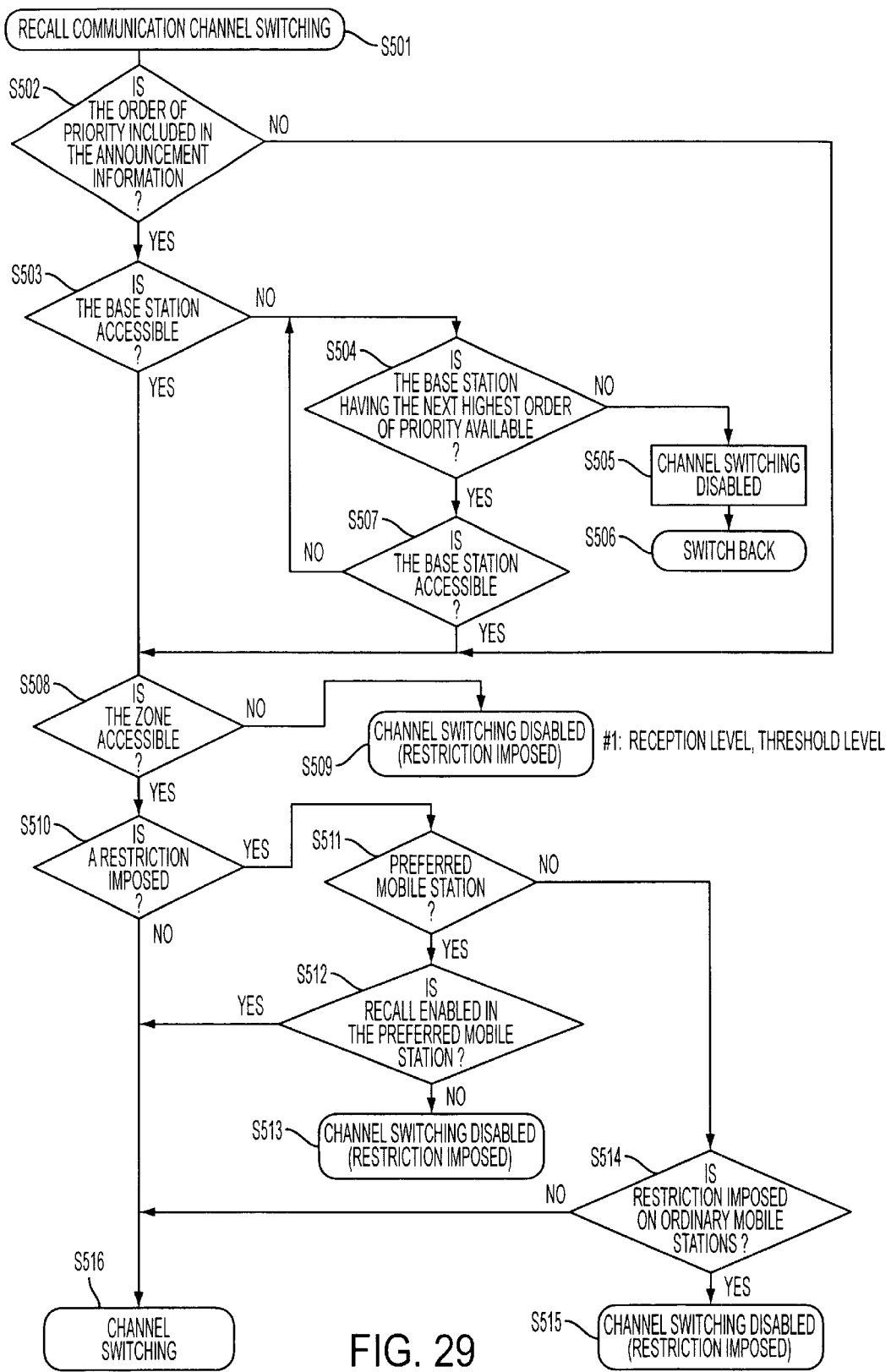
FIG. 29 shows the flow of a recall channel switching operation according to the present invention.
Figure 30:
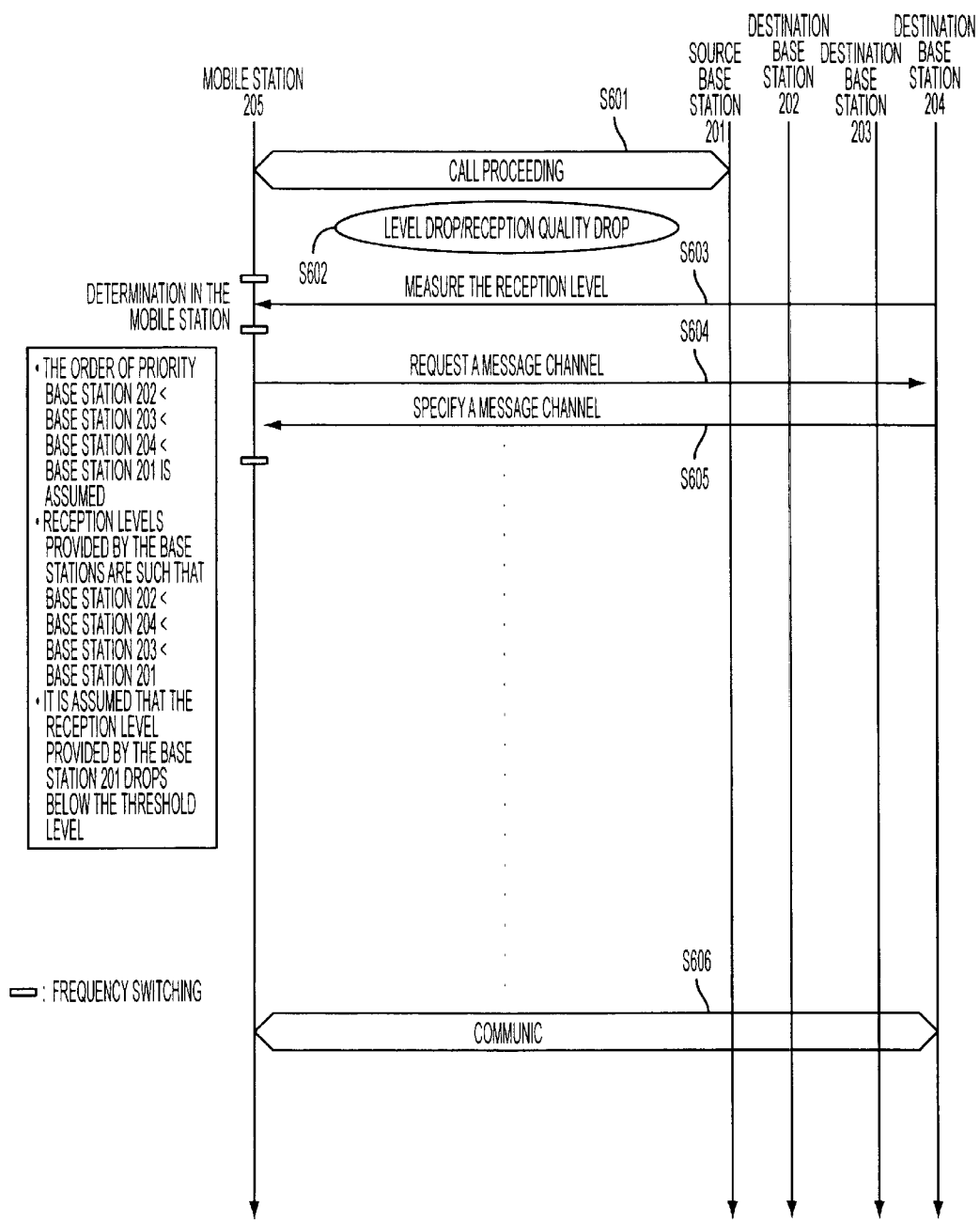
FIG. 30 shows the sequence of the recall channel switching operation according to the present invention.
Figure 31:
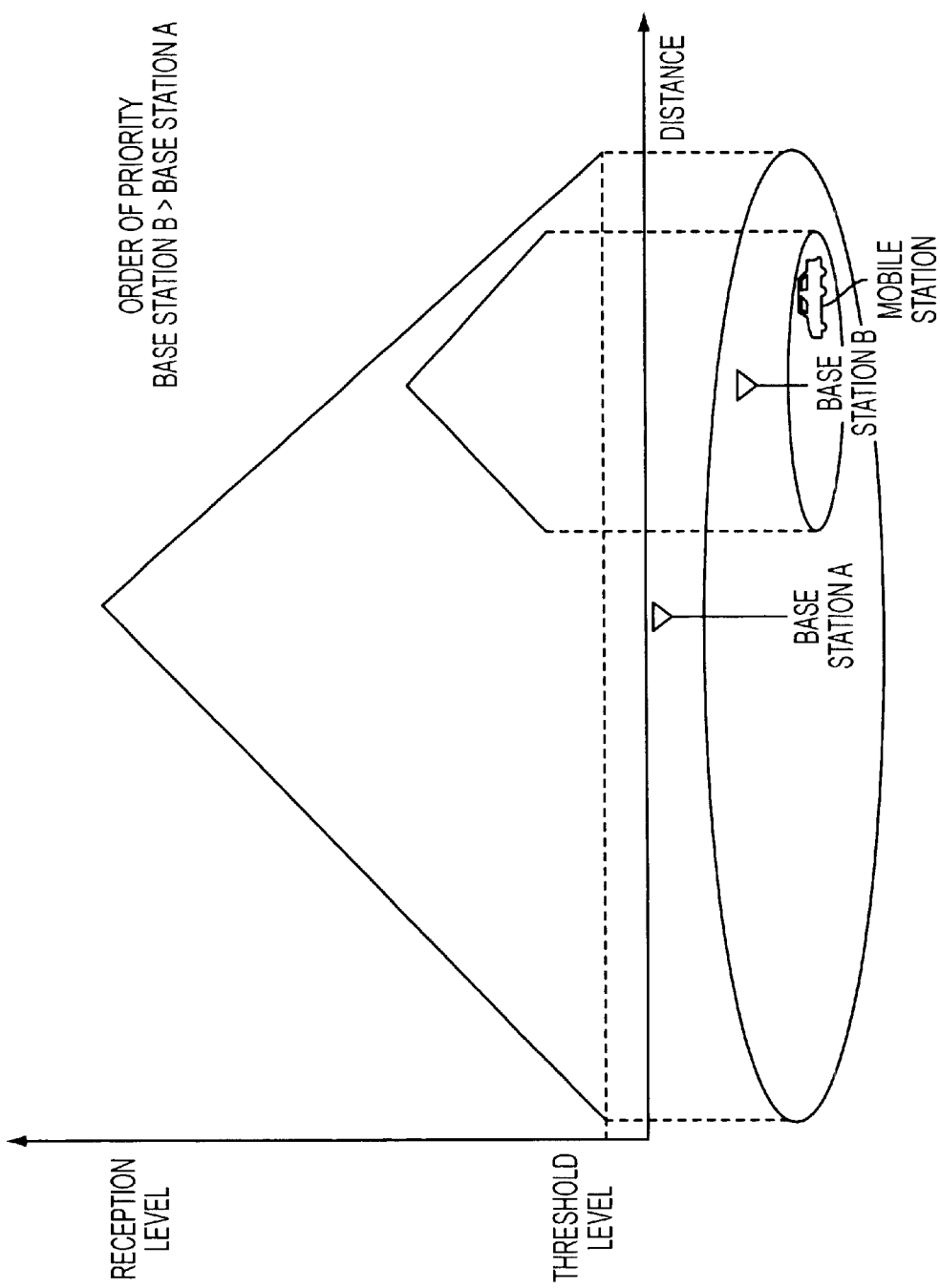
FIG. 31 shows how base stations are ordered.

Referring to FIG. 20, a detailed description will now be given of how a switching from one message channel to another is performed in the event of a handover. It is assumed that the mobile station 205 is located in the service area formed by the base station 201 and making a call via the base station 201. FIG. 29 shows the flow of a recall channel switching operation, and FIG. 30 shows the sequence of the recall channel switching operation. The message channel switching performed when a handover occurs during a conversation is also performed when there is a drop in the reception quality.

It is assumed that, while the mobile 205 is communicating with another mobile station by establishing a message channel with the base station 201 (S601 in FIG. 30), the reception level provided by the base station 201 drops below a predetermined threshold level, necessitating a handover by switching message channels (S602) (S501 in FIG. 29). The message channel control unit 308 determines whether the order of priority is included in the announcement information from the base station 201 (S602). The announcement information obtained when the message channel is set up with respect to the base station 201 and stored in the announcement information storage unit 311 specifies the order such that the base station 201< the base station 202< the base station 203< the base station 204.

If it is determined that the order of priority of the base stations 201, 202, 203 and 204 is included in the announcement information (YES in S502), the reception level measuring unit 312 reads the announcement information from the announcement information storage unit 311 so as to retrieve the order of priority of the base stations 201, 202, 203 and 204 corresponding to the perch channel codes included in the announcement information having the format of, for example, FIG. 23. The reception level measuring unit 312 measures the reception level in the perch channel corresponding to the base station 204 assigned the next highest priority (S603).

The reception level measuring unit 312 transmits the reception level in the perch channel corresponding to the base station 204 to the message channel control unit 308. The message channel control unit 308 determines whether the level is equal to or exceeds a predetermined threshold level that enables a request for a message channel (S503). If the message channel control unit 308 determines that the level is equal to or exceeds the threshold level (YES in S503), the message channel control unit 308 retrieves restriction information from the announcement information transmitted from the base station 204 and stored in the announcement information storage unit 311 so as to determine whether recall is enabled in the zone 224 (S508).

If the message channel control unit 308 determines that the reception level is below the threshold level (NO in S503), the reception level measuring unit 312 determines whether the perch channel corresponding to the base station having the next highest priority next to the base station 204 is available (S504). If no perch channel corresponding to the base station having the next highest priority is available (NO in S504), message channel switching in the mobile station 205 is disabled (S505). In this case, the mobile station 205 is disconnected or switched back to the base station 201 (S506). If a perch channel corresponding to the base station having the next highest priority next to the base station 204 is available (YES in S504), the reception level measuring unit 312 repeats steps S504 and S507 such that it successively measures (NO in S307) the reception level in the perch channels in the descending order of priority until the base station providing a reception level which is equal to or exceeds the threshold level is found (YES in S507) or until all the perch channels have been subject to measurement (NO in S504). If the message channel control unit 308 finds a base station that provides a reception level which is equal to or exceeds the threshold level (YES in S507), the message channel control unit 308 retrieves the restriction information from the announcement information stored in the announcement information storage unit 311 so as to determine if recall is enabled in the zone formed by the base station found in S507 (S508). If it is determined that the order of priority of the base stations is not included in the announcement information (NO in S502), the message channel control unit 308 retrieves the restriction information from the announcement information stored in the announcement information storage unit 311 so as to determine whether recall is enabled in the zone formed by the base station which is the source of the stored announcement information (S508).

If it is determined that recall is disabled in the zone 224 formed by the base station 224 (NO in S504), message channel switching is disabled in the mobile station 205 so that the mobile station 205 is disconnected (S509). If recall is disabled (YES in S508), the message channel control unit 308 retrieves the restriction information from the announcement information transmitted from the base station 204 and stored in the announcement information storage unit 311 so as to determine whether a restriction regarding a preferred mobile station is imposed in the zone 224 formed by the base station 204 (S510).

If there is a restriction regarding a preferred mobile station (YES in S510) and if the mobile station 205 is a preferred mobile station (YES in S511), the message channel control unit 308 determines whether recall is enabled in the mobile station 205 (S512). If it is determined that recall is enabled (YES in S512), the message channel control unit 308 determines that a request for a message channel is to be issued to the base station 204 and causes the transmission unit 310 to transmit a request for a message channel (S604). If recall is disabled (NO in S512), message channel switching in the mobile station 205 is disabled so that the mobile station 205 is disconnected (S513).

If there is a restriction regarding a preferred mobile station (YES in S510) and if the mobile station 205 is not a preferred mobile station (NO in S511), the message channel control unit 308 determines whether a restriction is imposed on the mobile station 205 (S514). If there is no restriction (NO in S514), the message channel control unit 308 determines that a request for a communication is to be issued to the base station 204 and causes the transmission unit 310 to transmit a request for a message channel (S604). If there is a restriction (YES in S514), message channel switching in the mobile station 205 is disabled so that the mobile station 205 is disconnected (S515).

If it is determined that no restriction regarding a preferred mobile station is imposed (NO in S510), the message channel control unit 308 determines that a request for a message channel is to be issued to the base station 204 and causes the transmission unit 310 to transmit a request for a message channel (S604) (S516).

The base station 204 receiving the request assigns an unused message channel to the mobile station 205 and transmits a channel assignment signal thereto (S605). If no unused message channel is available, the mobile station 205 is disconnected.

The mobile station receiving the message channel assignment signal establishes the assigned message channel with the base station 204 so as to continue a call (S606).

As described above, the present invention as applied to a mobile communication system having a hierarchical zone construction enables a mobile station to issue a request for a message channel to a base station that forms a smaller zone and provides a lower reception level, instead of a base station that forms a larger zone and provides a higher reception level. The present invention accomplishes such an arrangement by including in the announcement information the order of priority assigned to each of the base stations constituting the hierarchical zone construction.

The present invention is not limited to the above described embodiments, and variations and modifications may be made without departing from the scope of the present invention.

What is claimed is:

1. A mobile communication system comprising:
a plurality of radio base stations forming respective radio zones and effecting a radio channel setting control in accordance with a predetermined procedure; and
a mobile station selecting, as a wait zone, one of the radio zones that satisfies a criteria demanded by the predetermined procedure, and receiving communication service via the selected wait zone,
each of the radio base stations comprising:
traffic control means for setting a traffic distribution for the plurality of radio zones; and
announcing means for generating announcement information including the order of priority assigned to the plurality of radio zones, the order of priority being assigned in accordance with a probability density given to each of the plurality of radio zones under the distribution set by the traffic control means, and for transmitting announcement information to the radio zone formed by the radio station to which the announcing means belongs, the mobile station comprising:

announcement information receiving means for receiving the announcement information transmitted by the announcing means in accordance with the predetermined procedure; and wait control means for selecting one of the radio zones as a wait zone, the radio zone to which a highest priority is assigned being a first candidate for selection by the wait control means.

2. A mobile communication system comprising:

a plurality of radio base stations forming one or a plurality of radio zones and one or a plurality of small-scale radio zones, resulting in a hierarchy of overlapping radio zones, and effecting a radio channel setting control in accordance with a predetermined procedure; and a mobile station accessing one of the radio zones formed by the respective one of the plurality of radio base stations, in accordance with a predetermined procedure, and receiving communication service via the accessed radio zone, each of the plurality of radio base stations comprising:

announcing means for transmitting announcement information which includes identification information for identifying radio channels assigned to respective radio zones and small-scale radio zones, via the radio channel assigned to the radio zone formed by the radio base station to which the announcing means belongs, the identification information being arranged in the announcement information so as to correspond to the hierarchy of overlapping radio zones, the mobile station comprising:

announcement information receiving means for receiving the announcement information transmitted by the announcing means, in accordance with the procedure for radio channel setting control;

measuring means for measuring an electric field intensity for the radio channel corresponding to the identification information included in the announcement information received by the announcement information receiving means; and wait control means for comparing an electric field intensity measured by the measuring means with a preset threshold level, and designating a radio zone to which the radio channel lowest in the hierarchy is assigned as a wait zone in which to receive the communication service, on the condition that the electric field intensity measured by the measuring means exceeds the preset threshold level.

3. The mobile communication system as claimed in claim 2, wherein said announcing means comprises means for adding, in the announcement information, preset threshold values individually provided for the radio zone formed by the radio base station to which the announcing means belongs and the overlapping radio zones and small-scale radio zones, resulting in a hierarchy that corresponds to the hierarchy of overlapping zones, and said wait control means employs the threshold values added to the announcement information by the announcing means in making comparisons with the electric field intensity.

4. The mobile communication system as claimed in claim 2 wherein announcing means comprises means for adding a relative value indicating the preset threshold value for the zone formed by the radio base station to which the announcing means belongs, in the form of a difference with respect to a reference value for the threshold value, and said announcement information receiving means includes means for determining the relative value added to the announcement information, in relation to the radio zone in which the announcement information is received, and said wait control means compares the electric field intensity measured by the measuring means with a sum of the reference value and the relative value determined by the announcement information receiving means in relation to the radio zone in which the electric field intensity is measured.

5. The mobile communication system as claimed in claim 2, wherein said announcing means comprises means for adding relative values indicating the preset threshold values for the radio zone formed by the radio base station to which the announcing means belongs and the overlapping radio zones and small-scale radio zones, in the form of differences with respect to a reference value common to the threshold values, resulting in a hierarchy that corresponds to the hierarchy of overlapping zones, and said wait control means compares the electric field intensity with a sum of the relative value and the reference value.

6. The mobile communication system as claimed in claim 2, wherein said mobile station comprises zone determination means for performing a cyclic measurement of the electric field intensity of the radio zones in which the mobile station can be located, comparing a measured electric field intensity with a lower acceptance value by which an entry into the radio zone is enabled, stopping processes of measurement and comparison when it is found that the former exceeds the latter, and selecting the associated radio zone as a candidate in which the announcement information receiving means is to receive the announcement information.

7. The mobile communication system as claimed in claim 2, wherein said wait control means compares the electric field intensity measured by the measuring means with the threshold value in the descending order in the hierarchy of the radio zones subject to the measurement, and designates the radio zone for which it is found that the former exceeds the latter as a wait zone.

8. The mobile communication system as claimed in claim 6, wherein said measuring means comprises means which omits a measurement of the radio zone selected by the zone determination means and substitutes therefor the electric field intensity measured by the zone determination means.

9. A mobile communication system comprising:

a plurality of radio base stations forming one or a plurality of radio zones and one or a plurality of small-scale radio zones, resulting in a hierarchy of overlapping zones, and effecting a radio channel setting control in accordance with a predetermined procedure; and a mobile station accessing one of the radio zones formed by the respective one of the plurality of radio base stations, in accordance with a predetermined procedure, and receiving communication service via the accessed radio zone, each of the plurality of radio base stations comprising:

announcing means for transmitting announcement information which includes identification information for identifying the one or the plurality of radio zones and the one or the plurality of small-scale radio zones, via the radio channel assigned to the radio zone formed by the radio base station to which the announcing means belongs, the identification information being arranged in the announcement information according to respective positions in the hierarchy of overlapping zones, the mobile station comprising:

announcement information receiving means for receiving the announcement information transmitted by the announcing means, in accordance with the procedure for radio channel setting control;

measuring means for measuring an electric field intensity for the radio zone corresponding to the identification information included in the announcement information received by the announcement information receiving means; and wait control means for comparing an electric field intensity measured by the measuring means with a preset threshold level, and designating, as a wait zone in which to receive the communication service, a radio zone lowest in the hierarchy of overlapping zones on the condition that the electric field intensity measured by the measuring means exceeds the threshold level.

10. A mobile communication system comprising:

a plurality of radio base stations forming one or a plurality of radio zones and one or a plurality of small-scale radio zones, resulting in a hierarchy of overlapping zones, and effecting a radio channel setting control in accordance with a predetermined procedure; and a mobile station accessing one of the radio zones formed by the respective one of the plurality of radio base stations, in accordance with a predetermined procedure, and receiving communication service via the accessed radio zone, each of the plurality of radio base stations comprising:

announcing means for transmitting announcement information which includes identification information for identifying radio channels for the one or the plurality of radio zones and the one or the plurality of small-scale radio zones, via the radio channel assigned to the radio zone formed by the radio base station to which the announcing means belongs, the identification information being arranged in the announcement information according to respective positions in the hierarchy of overlapping zones, the mobile station comprising:

announcement information receiving means for receiving the announcement information transmitted by the announcing means, in accordance with the procedure for radio channel setting control;

measuring means for measuring an electric field intensity for the radio channel corresponding to the identification information included in the announcement information received by the announcement information receiving means; and wait control means for comparing an electric field intensity measured by the measuring means with a preset threshold level, and designating one of the radio channels, which is assigned to the radio zone lowest in the hierarchy and for which the control means has determined that the electric field intensity measured by the measuring means exceeds the preset threshold level, as a radio channel via which to receive the communication service.

11. A mobile communication system comprising:

a plurality of radio base stations forming one or a plurality of radio zones and one or a plurality of small-scale radio zones, resulting in a hierarchy of overlapping zones, and effecting a radio channel setting control in accordance with a predetermined procedure; and a mobile station accessing one of the radio zones formed by the respective one of the plurality of radio base stations, in accordance with a predetermined procedure, and receiving communication service via the accessed radio zone, each of the plurality of radio base stations comprising:

announcing means for transmitting announcement information which includes identification information for identifying the one or the plurality of radio zones and the one or the plurality of small-scale radio zones, via the radio channel assigned to the radio zone formed by the radio base station to which the announcing means belongs, the identification information being arranged in the announcement information according to respective positions in the hierarchy of overlapping zones, the mobile station comprising:

announcement information receiving means for receiving the announcement information transmitted by the announcing means, in accordance with the procedure for radio channel setting control;

measuring means for measuring an electric field intensity for the radio zone corresponding to the identification information included in the announcement information received by the announcement information receiving means; and wait control means for comparing an electric field intensity measured by the measuring means with a preset threshold level, and designating, as a wait zone in which to receive the communication service, a radio zone identified by the identification information to be lowest in the hierarchy of overlapping zones, on the condition that the electric field intensity measured by the measuring means exceeds the threshold level.

12. A mobile communication system comprising:

a plurality of radio base stations forming one or a plurality of radio zones and one or a plurality of small-scale radio zones, resulting in a hierarchy of overlapping zones, and effecting a radio channel setting control in accordance with a predetermined procedure; and a mobile station accessing one of the radio zones formed by the respective one of the plurality of radio base stations, in accordance with a predetermined procedure, and receiving communication service via the accessed radio zone, each of the plurality of radio base stations comprising:

announcing means for transmitting announcement information which includes first identification information for identifying a radio channel assigned to the radio zone formed by the radio base station to which the announcing means belongs, as well as including second identification information identifying the radio zones and the small-scale radio zones which overlap the radio zone formed by the radio base station to which the announcing means belongs, via the radio channel assigned to the radio zone formed by the radio base station to which the announcing means belongs, the second identification information being arranged in the announcement information according to respective positions in the hierarchy of overlapping zones, the mobile station comprising:

announcement information receiving means for receiving the announcement information transmitted by the announcing means, in accordance with the procedure for radio channel setting control;

measuring means for measuring an electric field intensity for the radio channel corresponding to the identification information included in the announcement information received by the announcement information receiving means; and wait control means for comparing an electric field intensity measured by the measuring means with a preset threshold level, determining the radio channel which is identified by the associated second identification information, if available, to have a lowest hierarchical order, and designating, as a wait zone in which to receive the communication service, the radio zone to which the determined radio channel is assigned, on the condition that the electric field intensity measured by the measuring means exceeds the threshold level.

13. A mobile communication system comprising:

a plurality of radio base stations forming one or a plurality of radio zones and one or a plurality of small-scale radio zones, resulting in a hierarchy of overlapping zones, and effecting a radio channel setting control in accordance with a predetermined procedure; and a mobile station accessing one of the radio zones formed by the respective one of the plurality of radio base stations, in accordance with a predetermined procedure, and receiving communication service via the accessed radio zone, each of the plurality of radio base stations comprising:

announcing means for transmitting announcement information which includes first identification information for identifying a radio channel assigned to a radio zone formed by the radio base station to which the announcing means belongs, as well as including second identification information identifying the radio zones and the small-scale radio zones which overlap the radio zone formed by the radio base station to which the announcing means belongs, over the radio zone formed by the radio base station to which the announcing means belongs, the second identification information being arranged in the announcement information according to respective positions in the hierarchy of overlapping zones, the mobile station comprising:

announcement information receiving means for receiving the announcement information transmitted by the announcing means, in accordance with the procedure for radio channel setting control;

measuring means for measuring an electric field intensity for the radio zone corresponding to the identification information included in the announcement information received by the announcement information receiving means; and wait control means for comparing an electric field intensity measured by the measuring means with a preset threshold level, determining the radio zone corresponding to the radio channel which is identified by the associated second identification information, if available, to have a lowest hierarchical order, and designating the determined radio zone as a wait zone in which to receive the communication service on the condition that the electric field intensity measured by the measuring means exceeds the threshold level.

14. A mobile communication system comprising:

a plurality of radio base stations forming one or a plurality of radio zones and one or a plurality of small-scale radio zones, resulting in a hierarchy of overlapping zones, and effecting a radio channel setting control in accordance with a predetermined procedure; and a mobile station accessing one of the radio zones formed by the respective one of the plurality of radio base stations, in accordance with a predetermined procedure, and receiving communication service via the accessed radio zone, each of the plurality of radio base stations comprising:

announcing means for transmitting announcement information which includes a hierarchical (equal or subordinate) order of the radio zone formed by the radio base station to which the announcing means belongs with respect to the overlapping radio zones and small-scale radio zones, and which also includes identification information for identifying radio channels assigned to the radio zone formed by the radio base station to which the announcing means belongs and the overlapping radio zones and small-scale radio zones, via the radio channel assigned to the radio zone formed by the radio base station to which the announcing means belongs, the mobile station comprising:

announcement information receiving means for receiving the announcement information transmitted by the announcing means, in accordance with the procedure for radio channel setting control, for extracting the identification information from the announcement information, and for determining the hierarchy of the radio zones to which the radio channels identified by the identification information are assigned;

measuring means for measuring an electric field intensity for the radio channel corresponding to the identification information obtained by the announcement information receiving means; and wait control means for comparing an electric field intensity measured by the measuring means with a preset threshold level, and designating a radio zone to which the radio channel lowest in the hierarchy is assigned as a wait zone in which to receive the communication service, on the condition that the electric field intensity measured by the measuring means for the radio channel lowest in the hierarchy exceeds the preset threshold level.

15. A mobile communication system comprising:

a plurality of radio base stations forming one or a plurality of radio zones and one or a plurality of small-scale radio zones, resulting in a hierarchy of overlapping zones, and effecting a radio channel setting control in accordance with a predetermined procedure; and a mobile station accessing one of the radio zones formed by the respective one of the plurality of radio base stations, in accordance with a predetermined procedure, and receiving communication service via the accessed radio zone, each of the plurality of radio base stations comprising:

announcing means for transmitting announcement information which includes a hierarchical (equal or subordinate) order of the radio zone formed by the radio base station to which the announcing means belongs with respect to the overlapping radio zones and small-scale radio zones, and which also includes identification information for identifying the radio zone formed by the radio base station to which the announcing means belongs and the overlapping radio zones and small-scale radio zones, over the radio zone formed by the radio base station to which the announcing means belongs, the mobile station comprising:

announcement information receiving means for receiving the announcement information transmitted by the announcing means, in accordance with the procedure for radio channel setting control, for extracting the identification information from the announcement information, and for determining the hierarchy of the radio zones corresponding to the identification information;

measuring means for measuring an electric field intensity for the radio zone corresponding to the identification information extracted by the announcement information receiving means 14g; and wait control means for comparing an electric field intensity measured by the measuring means with a preset threshold level, and designating a radio zone lowest in the hierarchy determined by the announcement information receiving means as a wait zone in which to receive the communication service, on the condition that the electric field intensity measured by the measuring means for the radio zone lowest in the hierarchy exceeds the preset threshold level.

16. A mobile station comprising:

announcement information receiving means for receiving announcement information including orders of priority assigned to radio zones formed by a plurality of radio base stations, the reception by the announcement information receiving means being conducted according to a descending order of preset traffic distribution and in accordance with a radio channel setting control procedure;

wait means for determining whether the radio zone associated with the order of priority included in the announcement information received by the announcement information receiving means satisfies a criteria adapted for the radio channel setting control procedure, and for designating the radio zone for which an affirmative answer is given as a wait zone; and communication control means which receives communication service from the radio base station forming the radio zone designated by the wait means.

17. A mobile communication system comprising:

a plurality of base stations forming respective radio zones that overlap each other;

a mobile station transportable between said radio zones; wherein each of said plurality of base stations having:

announcing means for sending announcement information including an order of priority of said plurality of base stations to the mobile station located in one of said radio zones, and said mobile station having:

a control means for selecting a base station from among said plurality of base stations, to which a request for a message channel is to be issued, based on the order of priority of said plurality of base stations included in the announcement information transmitted from said plurality of base stations, rather than based on an order of respective received electric field intensities provided by the plurality of base stations and being equal to or greater than a predetermined received electric field intensity.

18. The mobile communication system as claimed in claim 17, wherein said mobile station further comprises:

announcement information receiving means for receiving the announcement information including the order of priority of said plurality of base stations and transmitted from said plurality of base stations; and transmission means for issuing a request for a message channel to the base station selected by said control means.

19. The mobile communication system as claimed in claim 18, wherein said transmission means includes first transmission means for issuing a request for a message channel to the base station selected by the control means when a call is originated.

20. The mobile communication system as claimed in claim 18, wherein said transmission means includes second transmission means for issuing a request for a message channel to the base station selected by the control means when a call is incoming.

21. The mobile communication system as claimed in claim 18, wherein said transmission means includes third transmission means for transmitting a request for a communication to the base station selected by the control means when a message channel is switched from one to another in the event of a handover of a call.

22. The mobile communication system as claimed in claim 17, wherein said mobile station further comprises:

storage means for storing the announcement information;

measuring means for measuring a reception level in reception-level determining channels in a descending order of priority of said plurality of base stations, based on the announcement information stored in said storage means and including the order of priority and based on information relating to the reception-level determining channels.

23. The mobile communication system as claimed in claim 22, wherein said control means includes determining means for determining whether the reception level in a reception-level determining channel is equal to or exceeds a predetermined level that enables a request for a message channel.

24. The mobile communication system as claimed in claim 17, wherein said announcing means includes first arranging means for ordering the announcement information so as to arrange information relating to reception-level determining channels in a descending order of priority.

25. The mobile communication system as claimed in claim 17, wherein said announcing means includes second arranging means for ordering the announcement information so as to couple information relating to each reception-level determining channel to an order of priority associated therewith.

26. A mobile station for use in a mobile communication system, comprising:

control means for selecting a base station from among a plurality of base stations, to which a request for a message channel is to be issued, based on an order of priority of said plurality of base stations included in announcement information from said plurality of base stations, rather than based on an order of respective received electric field intensities provided by the plurality of base stations and being equal to or greater than a predetermined received electric field intensity.

27. The mobile station as claimed in claim 26, further comprising:

announcement information receiving means for receiving, from said plurality of base stations, the announcement information including the order of priority of said plurality of base stations; and transmission means for transmitting a request for a message channel to the base station selected by said control means.

28. The mobile station as claimed in claim 27, wherein said transmission means includes first transmission means for issuing a request for a message channel to the base station selected by the control means when a call is originated.

29. The mobile station as claimed in claim 27, wherein said transmission means includes second transmission means for issuing a request for a message channel to the base station selected by the control means when a call is incoming.

30. The mobile station as claimed in claim 27, wherein said transmission means includes third transmission means for transmitting a request for a communication to the base station selected by the control means when a message channel is switched from one to another in the event of a handover of a call.

31. The mobile station as claimed in claim 26, further comprising:

storage means for storing the announcement information;

measuring means for measuring a reception level in reception-level determining channels in a descending order of priority of said plurality of base stations, based on the announcement information stored in said storage means and including the order of priority and based on information relating to the reception-level determining channels.

32. The mobile station as claimed in claim 31, wherein said control means includes determining means for determining whether the reception level in a reception-level determining channel is equal to or exceeds a predetermined level that enables a request for a message channel.

33. A base station forming a radio zone that overlaps radio zones formed by other base stations of a plurality of base stations in a mobile communication system; comprising:

announcing means for sending announcement information including an order of priority of said plurality of base stations constituting the mobile communication system to a mobile station located in one of the radio zones, a sending base station being selected by a mobile station from among the plurality of base stations, to which a request for a message channel is to be issued, based on the order of priority of the plurality of base stations included in the announcement information, rather than based on an order of respective received electric field intensities provided by the plurality of base stations and being equal to or greater than a predetermined received electric field intensity.

34. The base station as claimed in claim 33, wherein said announcing means includes first arranging means for ordering the announcement information so as to arrange information relating to reception-level determining channels in a descending order of priority.

35. The base station as claimed in claim 33, wherein said announcing means includes second arranging means for ordering the announcement information so as to couple information relating to each reception-level determining channel to an order of priority associated therewith.

36. A mobile station for use in a mobile communication system including a plurality of base stations which respectively transmit announcement information including an order of priority of said plurality of base stations, said mobile station comprising:

control means for selecting a base station from among the plurality of base stations, to which a request for a message channel is to be issued, based on said order of priority of said plurality of base stations included in said announcement information from said plurality of base stations, rather than based on an order of respective received electric field intensities provided by the plurality of base stations and being equal to or greater than a predetermined received electric field intensity.

* * * * *